United States Patent
Wang et al.

(10) Patent No.: US 10,674,522 B2
(45) Date of Patent: Jun. 2, 2020

(54) SCHEDULING REQUEST FOR ONE OR MORE UPLINK TRANSMISSIONS USING NARROWBAND COMMUNICATIONS

(71) Applicant: QUALCOMM Incorporated, San Diego, CA (US)

(72) Inventors: Xiao feng Wang, San Diego, CA (US); Alberto Rico Alvarino, San Diego, CA (US); Kapil Bhattad, Bangalore (IN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/718,418

(22) Filed: Sep. 28, 2017

(65) Prior Publication Data

US 2018/0279324 A1    Sep. 27, 2018

(30) Foreign Application Priority Data

Mar. 23, 2017  (IN) .............................. 201741010253
May 11, 2017  (IN) .............................. 201741016601

(51) Int. Cl.
    *H04W 72/12*        (2009.01)
    *H04L 1/18*         (2006.01)
    (Continued)

(52) U.S. Cl.
    CPC ............... *H04W 72/12* (2013.01); *H04L 1/18* (2013.01); *H04L 1/1854* (2013.01);
    (Continued)

(58) Field of Classification Search
    None
    See application file for complete search history.

(56) References Cited

U.S. PATENT DOCUMENTS 9,036,622 B2 * 5/2015 Xie ..................... H04L 65/1016
                                                   370/352
9,271,278 B2 * 2/2016 Heo ................... H04W 72/0413
(Continued)

FOREIGN PATENT DOCUMENTS

KR    20170017010 A    2/2017
WO    2012061257 A1    5/2012

OTHER PUBLICATIONS

Partial International Search Report—PCT/US2018/019535—ISA/EPO—dated Jun. 4, 2018.
(Continued)

*Primary Examiner* — Bunjob Jaroenchonwanit
(74) *Attorney, Agent, or Firm* — Arent Fox, LLP

(57) ABSTRACT

The present disclosure may support dedicated scheduling request resources in a NPUSCH format resource structure, a NPRACH, and/or an ACK/NACK transmission associated with a downlink transmission received at the UE. In addition, the present disclosure may provide various techniques to mitigate collisions between scheduling requests transmitted by a UE, uplink transmissions sent by different UEs, and/or downlink transmissions sent by a base station. In an aspect of the disclosure, a method, a computer-readable medium, and an apparatus are provided. The apparatus may receive one or more downlink transmissions from a base station. The apparatus may determine to transmit an uplink transmission to the base station. The apparatus transmit, to the base station, a scheduling request for the uplink transmission with an ACK/NACK associated with the one or more downlink transmissions using a narrowband NPUSCH format resource structure.

40 Claims, 47 Drawing Sheets

(51) Int. Cl.
*H04L 5/00* (2006.01)
*H04W 28/06* (2009.01)
*H04L 1/16* (2006.01)
*H04W 76/27* (2018.01)
*H04L 27/18* (2006.01)
*H04W 88/02* (2009.01)

(52) U.S. Cl.
CPC .......... *H04L 1/1861* (2013.01); *H04L 1/1896* (2013.01); *H04L 5/0053* (2013.01); *H04L 5/0055* (2013.01); *H04W 28/06* (2013.01); *H04W 72/1284* (2013.01); *H04L 1/1671* (2013.01); *H04L 5/0007* (2013.01); *H04L 27/18* (2013.01); *H04W 76/27* (2018.02); *H04W 88/02* (2013.01)

(56) References Cited

U.S. PATENT DOCUMENTS

| | | | | |
|---|---|---|---|---|
| 10,091,816 | B2* | 10/2018 | Zhao | H04W 56/004 |
| 10,218,474 | B2* | 2/2019 | Wu | H04L 5/0035 |
| 2010/0246491 | A1* | 9/2010 | Bae | H04L 1/1845 370/328 |
| 2012/0134305 | A1* | 5/2012 | Damnjanovic | H04L 1/1607 370/280 |
| 2012/0294204 | A1 | 11/2012 | Chen et al. | |
| 2014/0161086 | A1* | 6/2014 | Tamura | H04W 72/14 370/329 |
| 2015/0288503 | A1* | 10/2015 | Earnshaw | H04L 1/1671 370/280 |
| 2016/0183309 | A1 | 6/2016 | Zhang et al. | |
| 2016/0226630 | A1* | 8/2016 | Zhang | H04L 1/1861 |
| 2018/0323910 | A1* | 11/2018 | Maattanen | H04L 1/1671 |
| 2018/0367278 | A1* | 12/2018 | Chatterjee | H04W 4/70 |
| 2019/0014601 | A1* | 1/2019 | Kim | H04L 1/18 |
| 2019/0104565 | A1* | 4/2019 | Park | H04L 1/1822 |

OTHER PUBLICATIONS

International Search Report and Written Opinion—PCT/US2018/019535—ISA/EPO—dated Aug. 6, 2018.

* cited by examiner

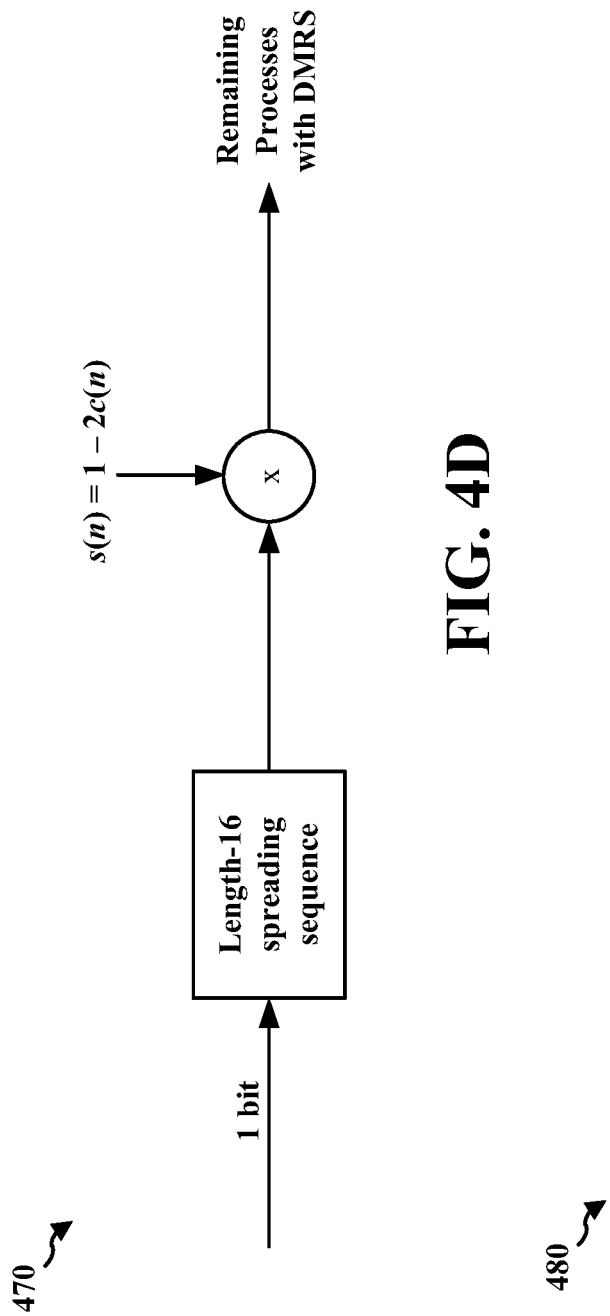
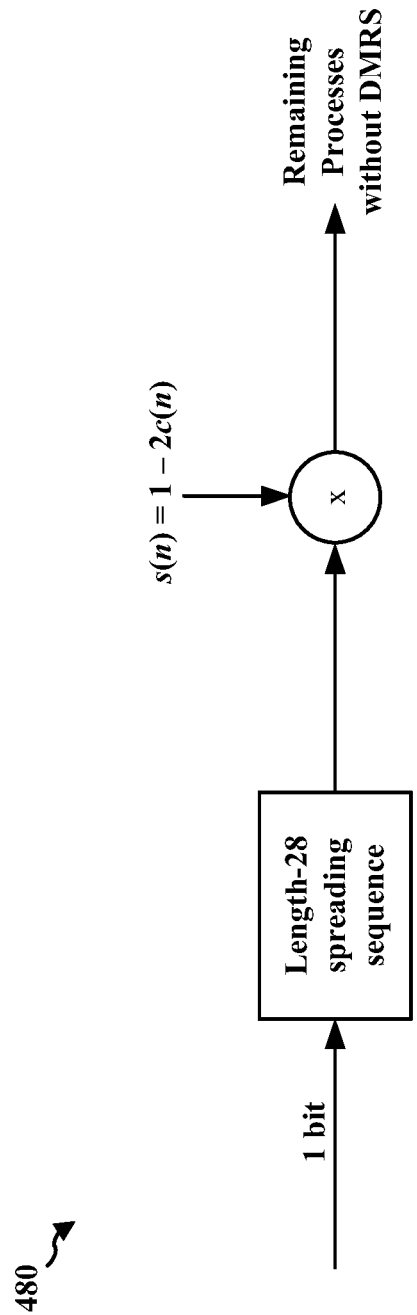
FIG. 4D
FIG. 4E

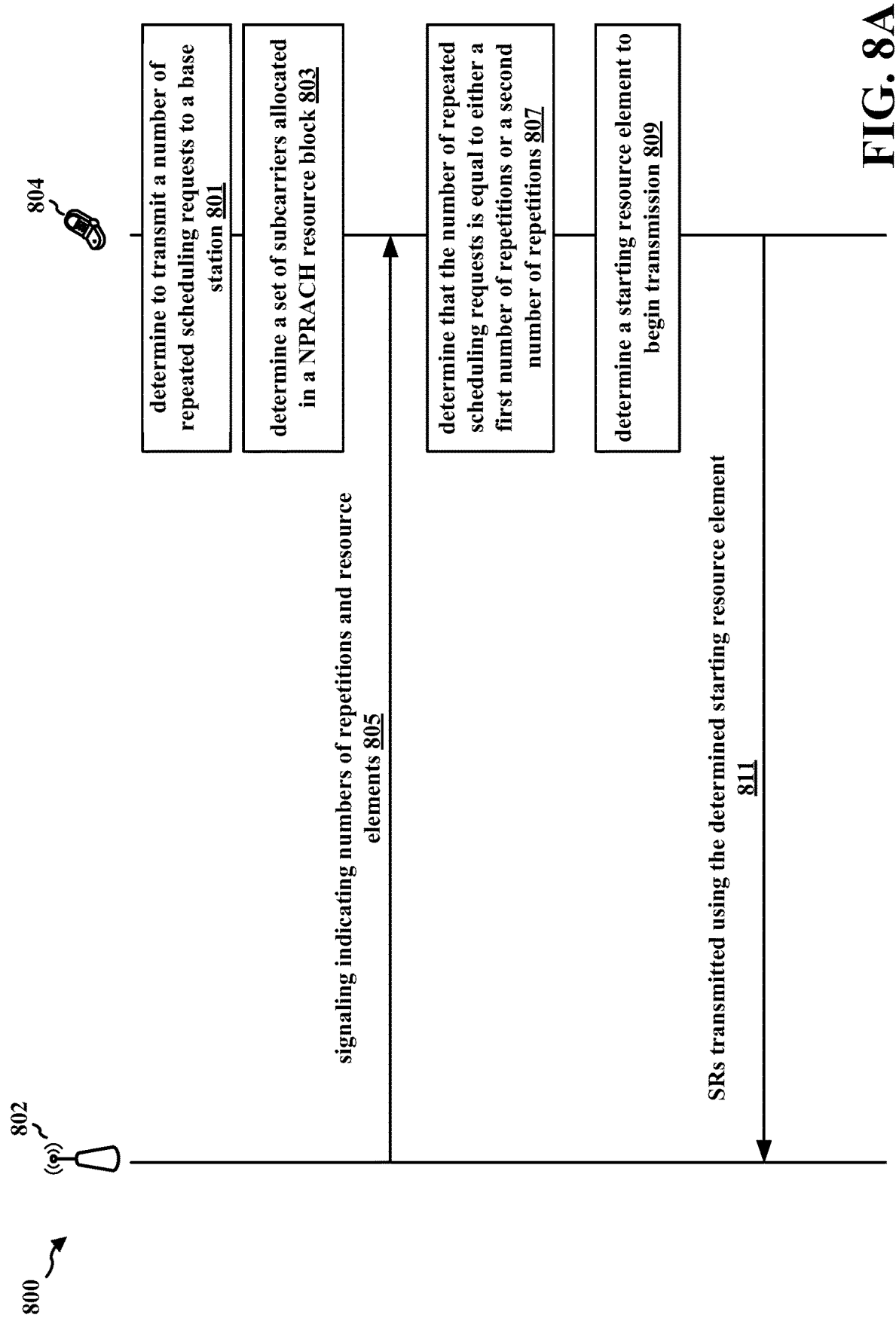

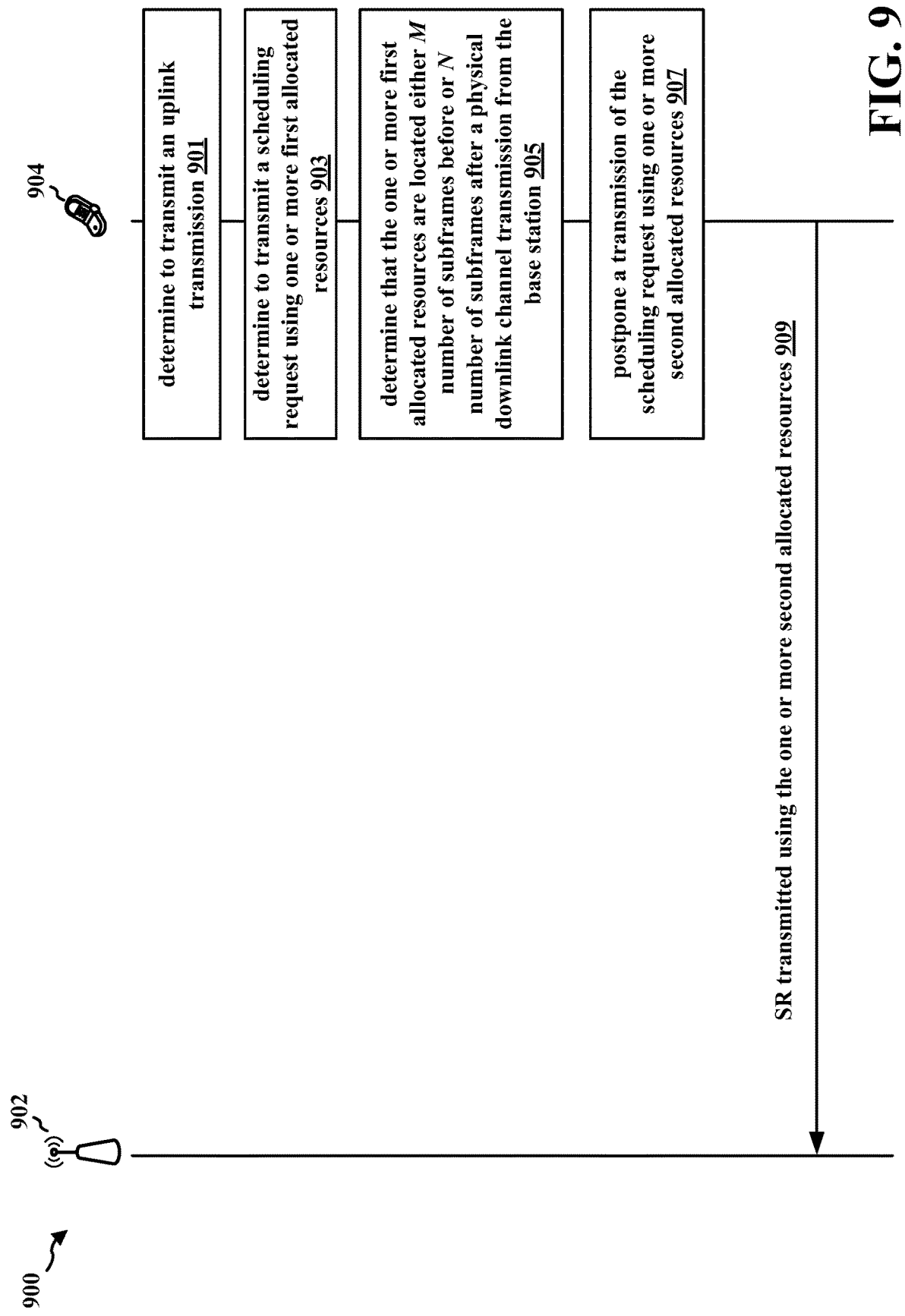

SCHEDULING REQUEST FOR ONE OR MORE UPLINK TRANSMISSIONS USING NARROWBAND COMMUNICATIONS

CROSS-REFERENCE TO RELATED APPLICATIONS

This application claims the benefit of Indian Patent Application No. 201741010253, entitled "SCHEDULING REQUEST FOR ONE OR MORE UPLINK TRANSMISSIONS USING NARROWBAND COMMUNICATIONS" and filed on Mar. 23, 2017, which is expressly incorporated by reference herein in its entirety. This application also claims the benefit of Indian Patent Application No. 201741016601, entitled "SCHEDULING REQUEST FOR ONE OR MORE UPLINK TRANSMISSIONS USING NARROWBAND COMMUNICATIONS" and filed on May 11, 2017, which is expressly incorporated by reference herein in its entirety.

BACKGROUND

Field

The present disclosure relates generally to communication systems, and more particularly, to a scheduling request for one or more uplink transmissions using narrowband communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4GP Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which is limited to a single resource block (RB) of system bandwidth, e.g., 180 kHz. Another example of narrowband communication is enhanced machine-type communication (eMTC), which is limited to six RBs of system bandwidth, e.g., 1.4 MHz.

NB-IoT communication and eMTC may reduce device complexity, enable multi-year battery life, and provide deeper coverage to reach challenging locations such as deep inside buildings. Legacy narrowband communication systems may not provide dedicated scheduling request resources when a connected-mode user equipment (UE) has an uplink transmission to send to a base station.

Thus, there is a need to provide dedicated scheduling request resources in narrowband communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Legacy narrowband communication systems may not provide dedicated scheduling request resources when a connected-mode UE has an uplink transmission to send to a base station. Instead, a connected-mode UE in a legacy narrowband communication system may rely on a random access channel (RACH) procedure to request uplink resources for an uplink transmission. However, relying on a RACH procedure to request uplink resources may increase the time needed to receive an uplink grant allocating uplink resources as compared to the time needed to receive an uplink grant by first sending a scheduling request.

Thus, there is a need to provide dedicated scheduling request resources in narrowband communication systems in order to reduce the latency associated with relying on a RACH procedure to request uplink resources.

The present disclosure may provide a solution by supporting dedicated scheduling request resources in a narrowband physical uplink shared channel (NPUSCH) format resource structure, a narrowband physical RACH (NPRACH), and/or by including the scheduling request in an acknowledgement (ACK)/negative ACK (NACK) transmission associated with a downlink transmission received at the UE. In addition, the present disclosure may provide various techniques to mitigate collisions between scheduling requests transmitted by a UE, uplink transmissions sent by different UEs, and/or downlink transmissions sent by a base station.

In an aspect of the disclosure, a method, a computer-readable medium, and an apparatus are provided. The apparatus may determine to transmit an uplink transmission to a base station. The apparatus may also transmit a scheduling request for the uplink transmission using a resource unit (RU) allocated in a NPUSCH format resource structure. In one aspect, the RU may include a single subcarrier and a first number of symbols in each of N slots in the NPUSCH format resource structure.

In another aspect, the apparatus may determine to transmit an uplink transmission to a base station. In another aspect, the apparatus may transmit, to the base station, a scheduling request for the uplink transmission using a first symbol group allocated in a NPRACH. In one aspect, the first symbol group may include a first number of symbols in a first subcarrier.

In another aspect, the apparatus may receive one or more downlink transmissions from a base station. The apparatus may also determine to transmit an uplink transmission to the base station. Further, the apparatus may transmit, to the base station, a scheduling request for the uplink transmission with an ACK/NACK associated with the one or more downlink transmissions using a NPUSCH format resource structure.

In a further aspect, the apparatus may determine four symbol groups allocated in an NPRACH for a scheduling request based on signaling received from a base station. The apparatus may also transmit the scheduling request using the four symbol groups allocated in the NPRACH. In one aspect, the scheduling request may be retransmitted in each of the four symbol groups allocated in the NPRACH.

In one aspect, the apparatus may determine to transmit a number of repeated scheduling requests to a base station. In another aspect, the apparatus may determine a set of subcarriers allocated in a NPRACH resource block. In a further aspect, the apparatus may receive signaling indicating a first number of repetitions associated with a resource elements in a first subcarrier in the set of subcarriers, and a second number of repetitions associated with a resource elements in a second subcarrier in the set of subcarriers. The apparatus may also determine that the number of repeated scheduling requests is equal to either the first number of repetitions or the second number of repetitions. The apparatus may further determine a starting resource element to begin transmission of the first number of scheduling requests based on whether the first number of scheduling requests is equal to the first number of repetitions or the second number of repetitions. In another aspect, the apparatus may transmit the number of repeated scheduling requests using the determined starting resource element.

In another aspect, the apparatus may determine to transmit an uplink transmission to a base station. The apparatus may also determine to transmit a scheduling request using one or more first allocated resources. In a further aspect, the apparatus may determine that the one or more first allocated resources are located eitherMsubframes before or N subframes after a physical downlink channel transmission from the base station. The apparatus may also postpone a transmission of the scheduling request using one or more second allocated resources. In one aspect, the one or more second allocated resources may be allocated later in the time domain that the one or more first allocated resources. Further, the apparatus may transmit the scheduling request using the one or more second allocated resources.

In a further aspect, the apparatus may determine to transmit an uplink transmission to a base station. The apparatus may also determine to transmit a scheduling request using one or more first allocated resources. In another aspect, the apparatus may determine that a first number of the one or more first allocated resources are located more than M subframes before a physical downlink channel transmission from the base station. The apparatus may transmit a first portion of the scheduling request using the first number of the one or more first allocated resources. In another aspect, the apparatus may transmit a second portion of the scheduling request using one or more second allocated resources. In one aspect, the one or more second allocated resources may be located more than N subframes after the physical downlink channel transmission in a time domain.

In one aspect, the apparatus may determine to transmit an uplink transmission to a base station. In another aspect, the apparatus may determine to transmit a scheduling request using one or more first allocated resources. In an further aspect, the apparatus may determine that the one or more first allocated resources are located either M subframes before or N subframes after a physical downlink channel transmission from the base station. The apparatus may postpone a transmission of the scheduling request until a subsequent physical uplink channel transmission or an ACK/NACK transmission associated with the physical downlink channel transmission from the base station. In one aspect, the subsequent physical uplink channel transmission or the ACK/NACK transmission may be located before one or more second allocated resources for the scheduling request. In another aspect, the apparatus may transmit the scheduling request with the subsequent physical uplink channel transmission or with the ACK/NACK transmission associated with the physical downlink channel transmission from the base station.

In another aspect, the apparatus may determine to transmit an uplink transmission to a base station. The apparatus may determine to transmit a scheduling request using one or more first allocated resources. In addition, the apparatus may determine that the one or more first allocated resources are located either M subframes before or N subframes after a physical downlink channel transmission from the base station. Further, the apparatus may transmit the scheduling request using the one or more first allocated resources. The apparatus may also receive the physical downlink channel transmission in one or more second allocated resources located after the one or more first allocated resources in the time domain.

In a further aspect, the apparatus may determine to transmit an uplink transmission to a base station. In one aspect, the apparatus may determine to transmit a scheduling request using one or more first allocated resources. In another aspect, the apparatus may determine that the one or more first allocated resources collide with M number of resources of one or more second allocated resources used to receive a physical downlink channel transmission from the base station. In addition, the apparatus may transmit the scheduling request using the one or more first allocated resources. Further, the apparatus may receive the physical downlink channel transmission with M number of resources of the one or more second allocated resources punctured.

In another aspect, the apparatus may determine to transmit an uplink transmission to a base station. In addition, the apparatus may determine to transmit a scheduling request using one or more first allocated resources. Further, the apparatus may determine that the one or more first allocated resources collide with an ACK/NACK transmission. The apparatus may transmit the ACK/NACK transmission with the scheduling request using the one or more first allocated resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4D is a diagram illustrating the application of one of the length-sixteen orthogonal spreading sequences in accordance with certain aspects of the disclosure.

FIG. 4E is a diagram illustrating the application of one of the length-twenty-eight orthogonal spreading sequences in accordance with certain aspects of the disclosure.

FIG. 8A illustrates a data flow for a narrowband communication system(s) that may provide dedicated scheduling request resources in accordance with certain aspects of the present disclosure.

FIG. 9 illustrates a data flow for a narrowband communication system(s) that may provide dedicated scheduling request resources in accordance with certain aspects of the present disclosure.

DETAILED DESCRIPTION

Figure 1:
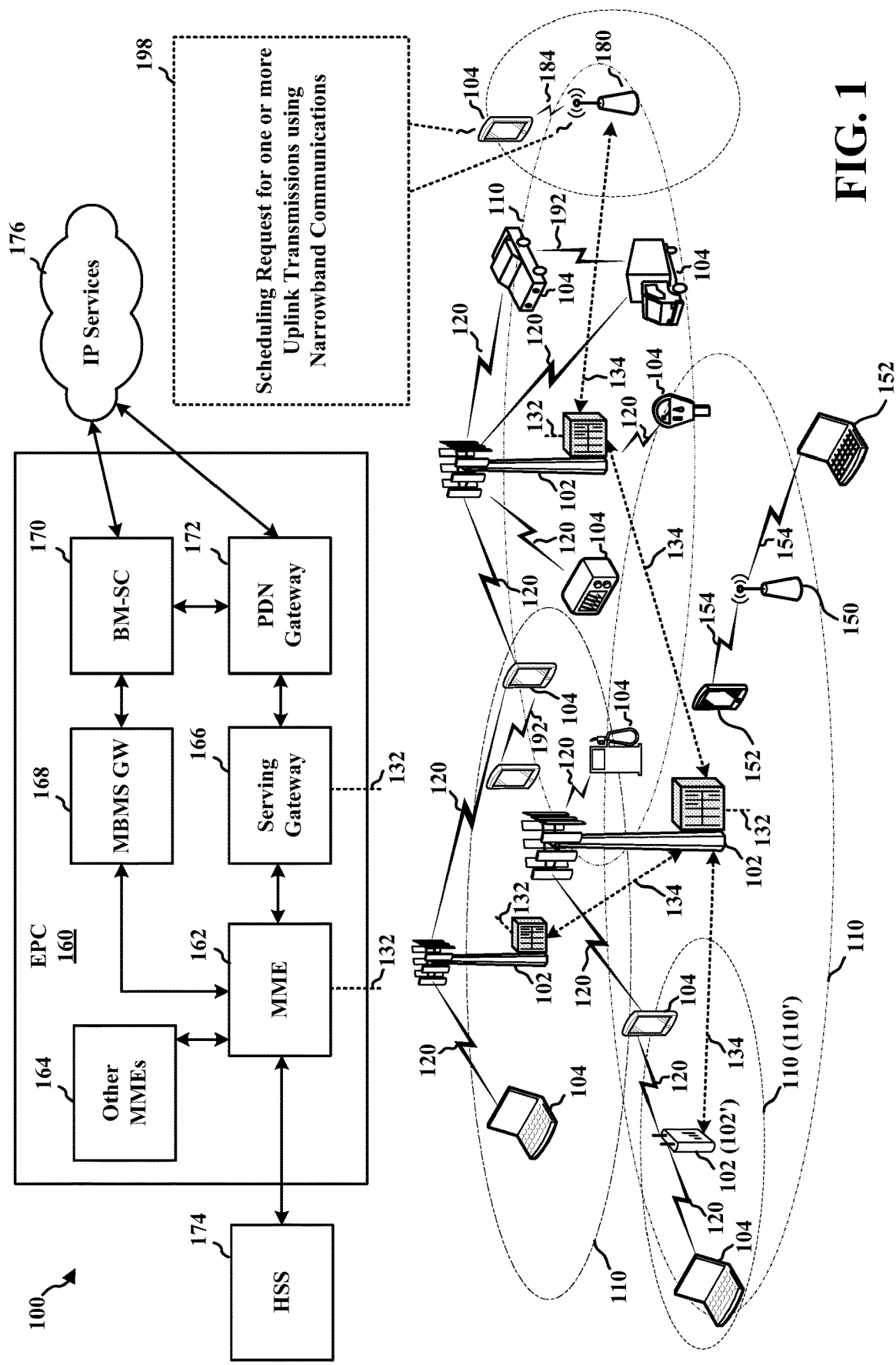
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to use dedicated resources to send a scheduling request for one or more uplink transmissions using narrowband communications (198), e.g., as described in connection with any of FIGS. 4A-37.

Figure 2:
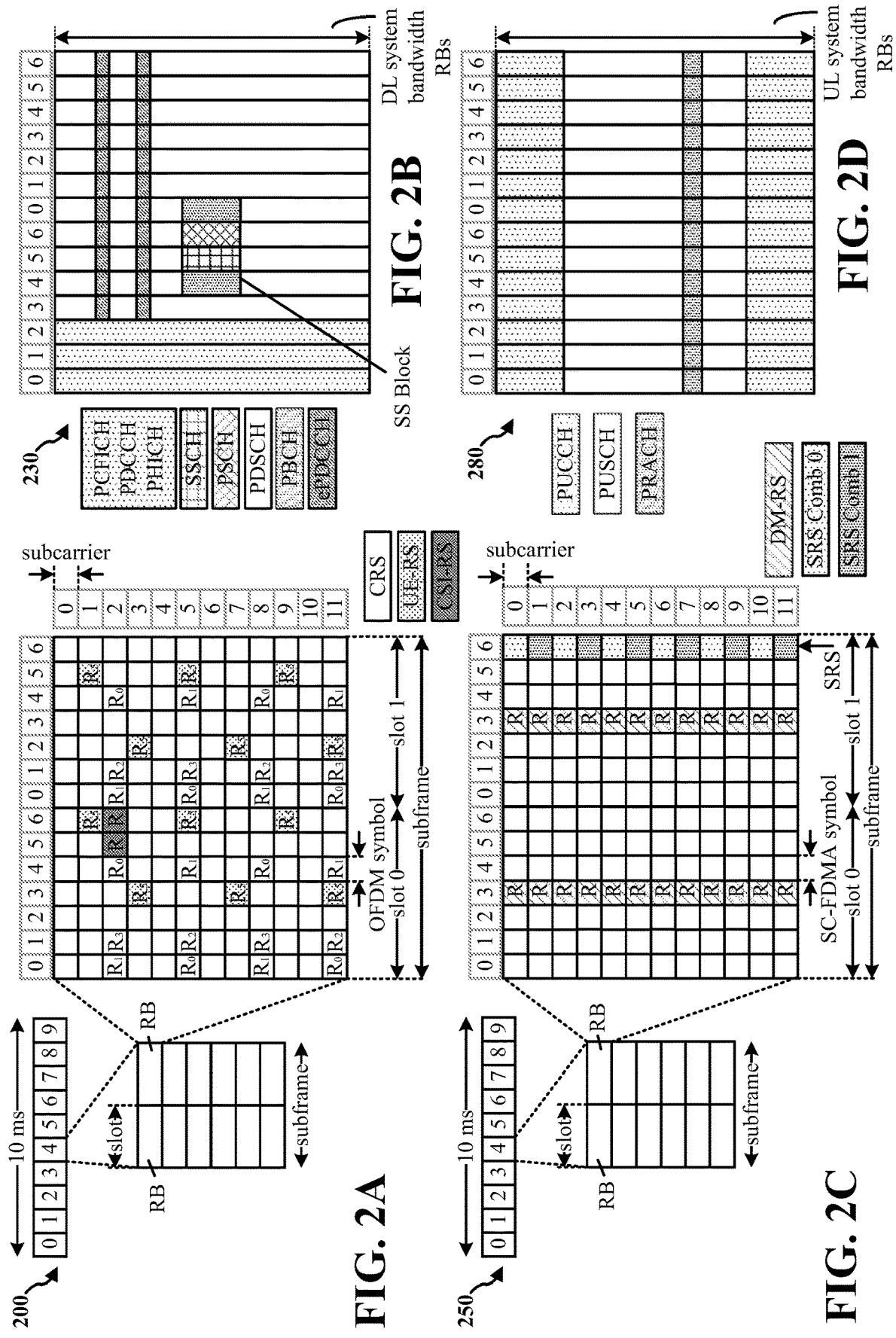
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/negative NACK feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
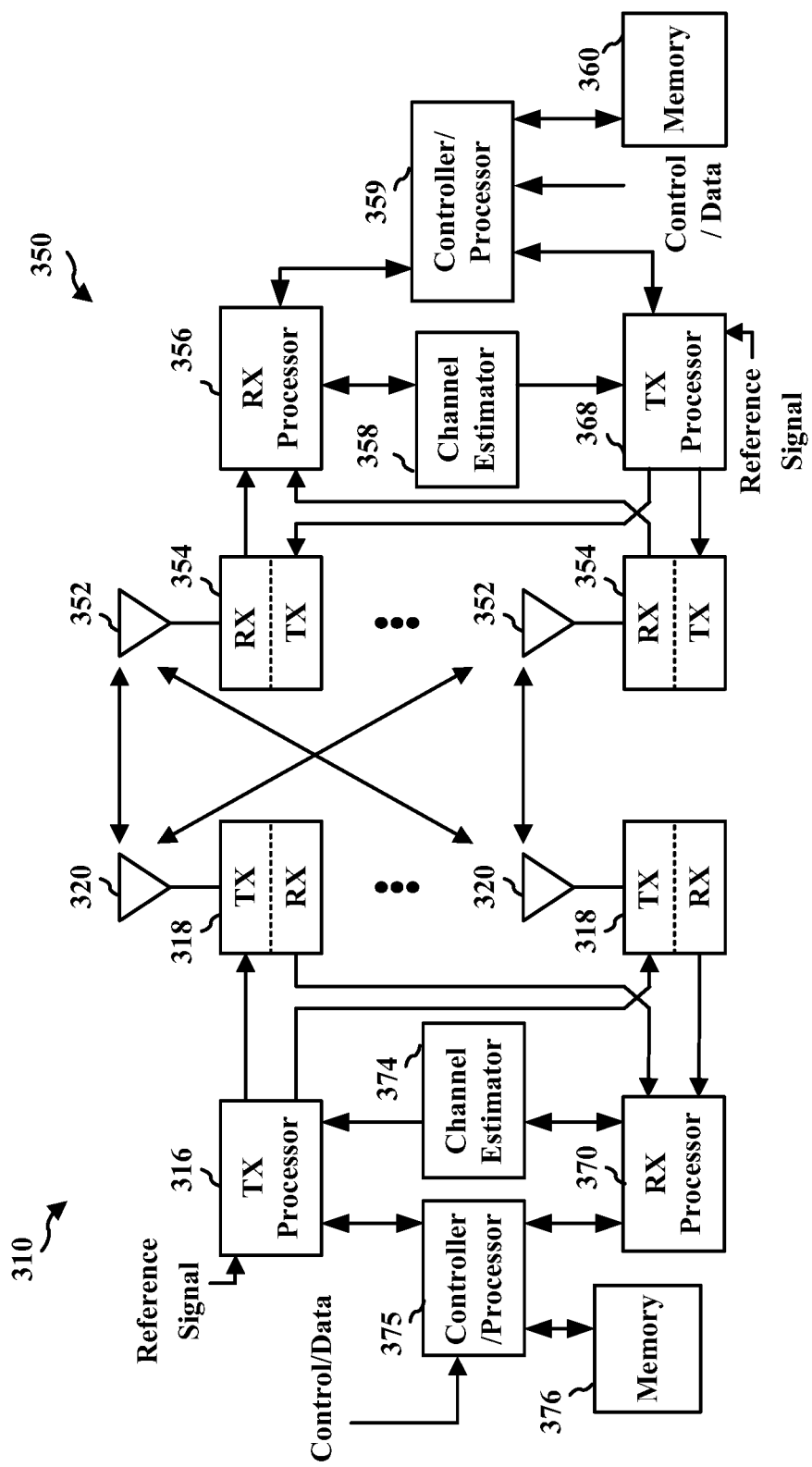
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Legacy narrowband communication systems may not provide dedicated scheduling request resources when a connected-mode UE has an uplink transmission to send to a base station. Instead, a connected-mode UE in a legacy narrowband communication system may rely on a RACH procedure to request uplink resources for an uplink transmission. However, relying on a RACH procedure to request uplink resources may increase the time needed to receive an uplink grant for the uplink resources as compared to the time needed to receive an uplink grant by first sending a scheduling request. Thus, there is a need to provide dedicated scheduling request resources in narrowband communication systems in order to reduce the latency associated with relying on a RACH procedure to request uplink resources.

The present disclosure may provide a solution to the problem by supporting dedicated scheduling request resources in a NPUSCH format resource structure (e.g., as described below with respect to FIGS. 4A and 4B), in a NPRACH (e.g., as described below with respect to FIGS. 5A, 5B, 7, 8A, and 8B), and/or by including the scheduling request in an ACK/NACK transmission associated with a downlink transmission received at the UE (e.g., as described below with respect to FIGS. 6A, 6B, and 6C). In addition, the present disclosure may provide various techniques to mitigate collisions between scheduling requests transmitted by a UE, uplink transmissions sent by different UEs, and/or downlink transmissions sent by a base station (e.g., as described below with respect to FIGS. 9-13).

Figure 4A:
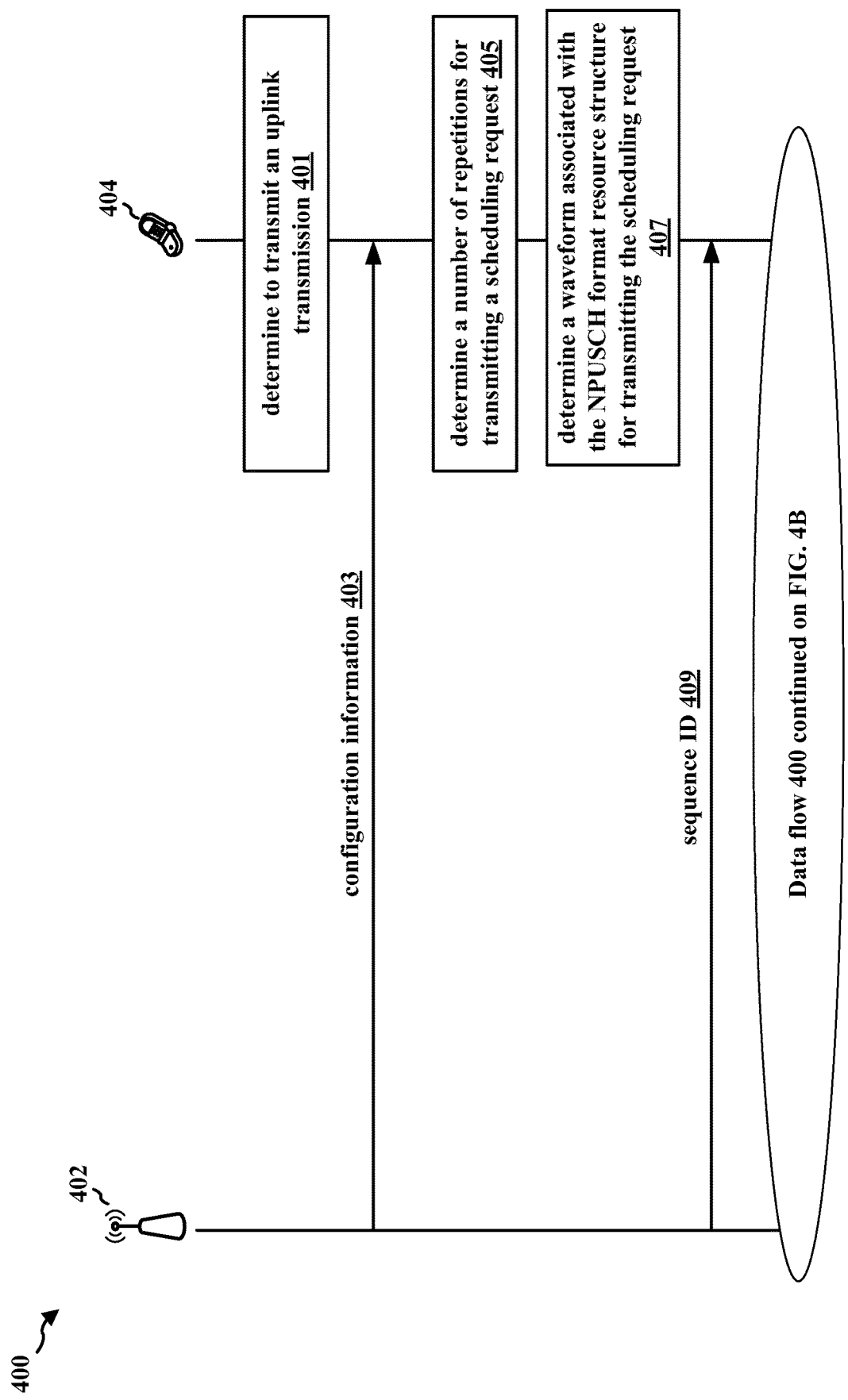
FIGS. 4A and 4B illustrate a data flow for a narrowband communication system(s) that may provide dedicated scheduling request resources in accordance with certain aspects of the present disclosure.
Figure 4B:
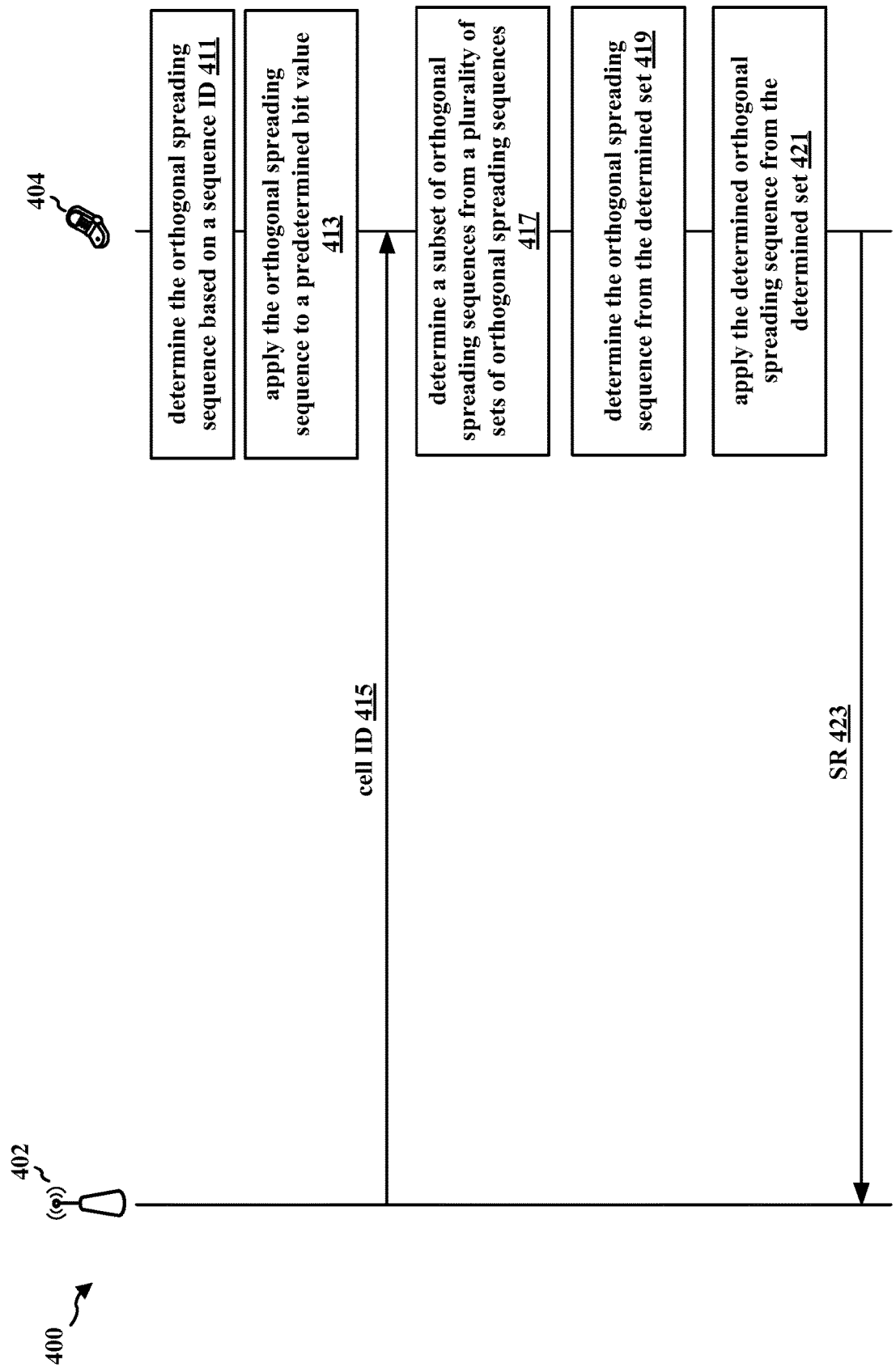

FIGS. 4A and 4B illustrate a data flow 400 for a UE 404 to send a scheduling request to a base station 402 for an uplink grant in accordance with certain aspects of the disclosure. Base station 402 may correspond to, e.g., base station 102, 180, 1550, 1850, 2150, 2450, 2750, 3450, eNB 310. UE 404 may correspond to, e.g., UE 104, 350, apparatus 1502/1502', 1802/1802', 2102/2102', 2402/2402', 2702/2702', 3602/3602'. In addition, the base station 402 and the UE 404 may be configured to communicate using narrowband communications (e.g., NB-IoT and/or eMTC). For example, the UE 404 may be an NB-IoT device and/or an eMTC device.

Figure 4C:
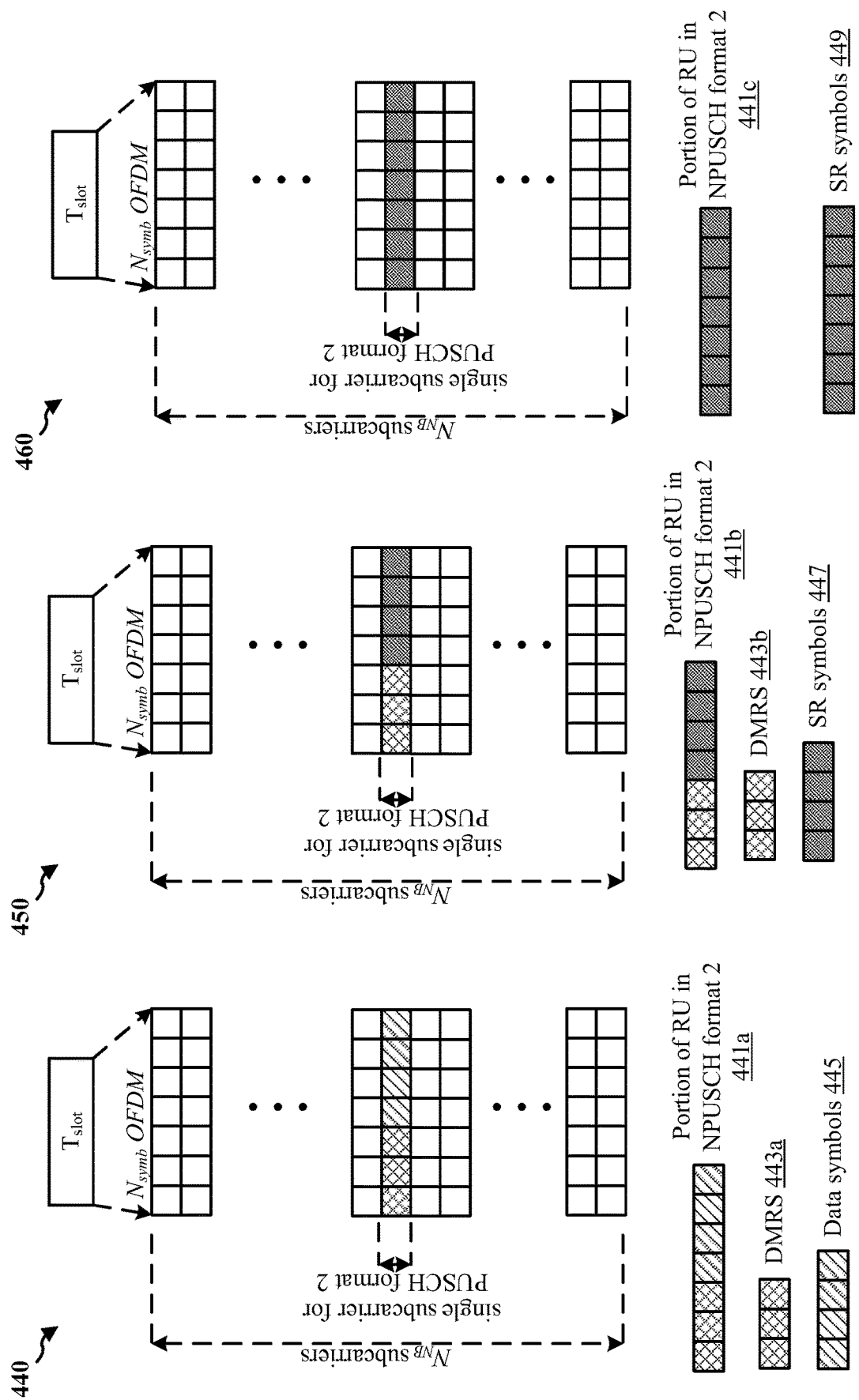
FIG. 4C is a diagram illustrating various NPUSCH format resource structures in accordance with certain aspects of the present disclosure.

FIG. 4C is a diagram illustrating NPUSCH format 2 resource structures 440, 450, 460 that may be used for transmitting one or more scheduling resources in a narrowband communication system in accordance with certain aspects of the disclosure.

FIG. 4D illustrates the application 470 of one of the length-sixteen orthogonal spreading sequences in accordance with certain aspects of the disclosure.

FIG. 4E is a diagram illustrating the application 480 of one of the length-sixteen orthogonal spreading sequences in accordance with certain aspects of the disclosure.

Figure 4F:
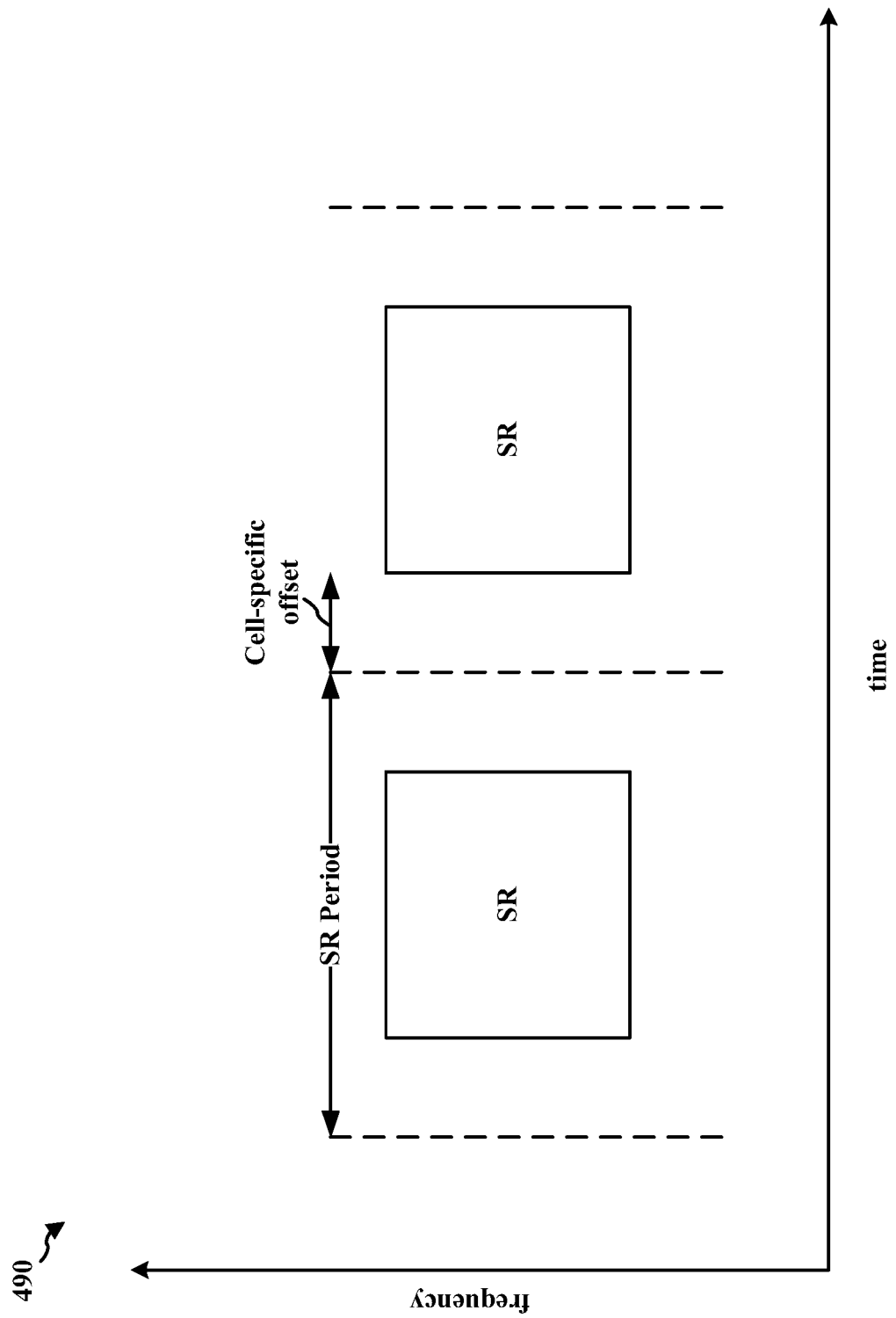
FIG. 4F is a diagram illustrating a cell-specific time offset included in the periodicity associated with the at least one RU in accordance with certain aspects of the present disclosure.

FIG. 4F is a diagram illustrating a cell-specific time offset 490 included in the periodicity associated with the at least one RU in accordance with certain aspects of the present disclosure.

Referring to FIG. 4A, the UE 404 may determine 401 to transmit an uplink transmission to the base station 402. For example, the UE 404 may determine 401 to transmit the uplink transmission when the UE 404 is in connected-mode.

In another aspect, the UE 404 may receive configuration information 403 from the base station 402 either before or after the UE 404 determines 401 to transmit the uplink transmission to the base station 402. For example, the configuration information 403 may include first information that the UE 404 may use to determine 405 a number of repetitions for transmitting the scheduling request. Alternatively, the UE 404 may determine 405 the number of repetitions for transmitting the scheduling request based on predetermined information configured at the UE 404.

As seen in FIG. 4C, various NPUSCH waveforms may be used to allocate resources to the UE 404 for use in sending uplink transmissions (e.g., scheduling request(s), narrowband uplink control channel (NPUCCH) transmissions, ACK/NACK, and/or NPUSCH transmissions) to the base station 402. For example, the base station 402 may use NPUSCH format 1 (not illustrated in FIG. 4C) to allocate resources for uplink data transmissions (e.g., NPUSCH). When resources for an acknowledgement (e.g., NPUCCH or ACK/NACK) to a downlink transmission are allocated to the UE 404, NPUSCH format 2 may be used. For example, when the base station 402 transmits an NPDCCH transmission to the UE 404, the UE 404 may use NPUSCH format 2 to transmit an ACK/NACK response associated with the NPDCCH transmission to base station 402. Additionally, UE 404 may use NPUSCH format 2 to transmit a scheduling request to the base station 402. The smallest unit the base station 402 may use to map a transport block (TB) for either an NPUSCH, NPUCCH, ACK/NACK, and/or a scheduling request may be a RU (e.g., a portion of an RU 441a, 441b, or 441c is illustrated in FIG. 4C).

In each NPUSCH format 2 resource structure 440, 450, 460 illustrated in FIG. 4C, the RU may be composed of a single subcarrier with a length of N slots (e.g., 4 slots, 6, slots, 8 slots, etc.). Only one slot for each of the RU in the respective NPUSCH format 2 resource structures 440, 450, 460 is illustrated in FIG. 4C for simplicity. In the first NPUSCH format 2 resource structure 440 illustrated in FIG. 4C, the portion of the RU 441a allocated in each of the four slots may include three demodulation reference signal (DMRS) symbols 443a and four data symbols 445. The scheduling request may be transmitted using the data symbols 445 in the first NPUSCH format 2 resource structure. In the second NPUSCH format 2 resource structure 450 illustrated in FIG. 4C, the portion of the RU 441b allocated in each of the four slots may include three DMRS symbols 443b and four scheduling request symbols 447. In the third NPUSCH format 2 resource structure 460 illustrated in FIG. 4C, the portion of the RU 441c allocated in each of the four slots may include seven scheduling request symbols 449. The configuration in which N=4 (e.g., 4 slots) is described below for simplicity. However, the RU may be composed of a single subcarrier with a length of N=6 (e.g., 6 slots) or a length of N=8 (e.g., 8 slots) without departing from the scope of the present disclosure.

Referring again to FIG. 4A, the configuration information 403 may also include second information that indicates a waveform associated with the NPUSCH format resource structure that the UE 404 may use to transmit the scheduling request to the base station 402.

In a first configuration, the UE 404 may determine 407 (e.g., based on the second information) to transmit the scheduling request using the data symbols 445 in the first NPUSCH format 2 resource structure 440 illustrated in FIG. 4C. Alternatively, the UE 404 may determine 407 to transmit the scheduling request using the data symbols 445 in the first NPUSCH format 2 resource structure 440 illustrated in FIG. 4C based on predetermined information.

Using the first NPUSCH format 2 resource structure 440, a bit value of 0 or a bit value of 1 may be input into the channel coding by UE 404 to transmit using the portion of the RU 441a in each of the four slots. In addition, the UE 404 may omit any constellation mapping of scrambled data (e.g., in data symbols 445) from the first NPUSCH format 2 resource structure 440 or replace the constellation mapping with a multiplication of an any-unit valued constant. When the first NPUSCH format 2 resource structure 440 is used, UE 404 may be the only UE allocated to the RU.

In a second configuration, the UE 404 may determine 407 (e.g., based on the second information) to transmit the scheduling request using the data symbols (e.g., depicted as scheduling request symbols 447) in the second NPUSCH format 2 resource structure 450 illustrated in FIG. 4C. Alternatively, the UE 404 may determine 407 to transmit the scheduling request using the data symbols in the second NPUSCH format 2 resource structure 450 illustrated in FIG. 4C based on predetermined information.

In one aspect, the UE 404 may receive signaling 409 indicating the sequence identification (ID) associated with one of a set of predefined orthogonal spreading sequences to apply to a predetermined bit value associated with the scheduling request, and the UE 404 may determine 411 the orthogonal spreading sequence based on the sequence ID.

In another aspect, the UE 404 may apply 413 the orthogonal spreading sequence (e.g., one of sixteen different orthogonal spreading sequences) to the bit value associated with the scheduling request. The UE 404 may sequentially fill each of the four data symbols with scheduling request symbols 447 in each of the four slots in the RU, as illustrated in FIG. 4D. For example, the UE 404 may replace channel coding with a length-sixteen Walsh code (e.g., or length-twenty-four for 6 slots or length-thirty-two for 8 slots) or length-sixteen Zadoff-Chu sequence (e.g., or length-twenty-four for 6 slots or length-thirty-two for 8 slots). In one aspect, constellation mapping may be omitted and the scrambling may be performed as $y(n)=x(n) \cdot s(n)$, where $x(n)$ is the n-th sample of the orthogonal spreading sequence (e.g., the second of the sixteen orthogonal spreading sequences), $s(n)=1$ if $c(n)=0$ and $s(n)=-1$ if $c(n)=0$, and $c(n)$ is the scrambling sequence. Using the second NPUSCH format 2 resource structure 450, up to sixteen different UEs may be multiplexed in a given RU.

In a third configuration, the UE 404 may determine 407 (e.g., based on the second information) to transmit the scheduling request using the data resource elements in the third NPUSCH format 2 resource structure 460 illustrated in FIG. 4C. Alternatively, the UE 404 may determine 407 to transmit the scheduling request using the data resource elements in the third NPUSCH format 2 resource structure 460 illustrated in FIG. 4C based on predetermined information.

As seen in FIGS. 4A and 4B, the UE 404 may receive signaling 415 indicating a cell ID associated with the base station 402. The cell ID may be used by the UE 404 to determine 417 a subset of orthogonal spreading sequences from a plurality of sets of orthogonal spreading sequences, and determine 419 the orthogonal spreading sequence from the subset of orthogonal spreading sequences. In one aspect, the subset of orthogonal spreading sequences may include, e.g., a subset of seven orthogonal spreading sequences of twenty-eight orthogonal spreading sequences for four slots, a subset of seven orthogonal spreading sequences of forty-two orthogonal spreading sequences for six slots, or a subset of seven orthogonal spreading sequences of fifty-six orthogonal spreading sequences for eight slots. In certain other aspects, the plurality of sets of orthogonal spreading sequences may include, e.g., four sets of seven orthogonal spreading sequences.

In another aspect, the UE 404 may apply 421 an orthogonal spreading sequence (e.g., one of twenty-eight different orthogonal spreading sequences) to the bit value associated with the scheduling request to sequentially fill each of the seven symbols with scheduling request symbols 449 in each of the four slots in the RU by omitting DMRS from the first three symbols in each slot, as illustrated in FIG. 4C.

For example, referring to FIG. 4E, the UE 404 may replace channel coding with a length-twenty-eight Walsh code (e.g., or length-forty-two Walsh code for six slots or a length-fifty-six Walsh code for eight slots) or length-twentyeight Zadoff-Chu sequence (e.g., or length-forty-two Zadoff-Chu sequence for six slots or a length-fifty-six Zadoff-Chu sequence for eight slots). In one aspect, twenty-eight cyclic shifts may correspond to twenty-eight orthogonal spreading sequences in the length-twenty-eight Zadoff-Chu sequence, forty-two cyclic shifts may correspond to forty-two orthogonal spreading sequences in the length-forty-two Zadoff-Chu sequence, and/or fifty-six shifts may correspond to fifty-six orthogonal spreading sequences in the length-fifty-six Zadoff-Chu sequence Still referring to FIG. 4E, constellation mapping may be omitted and the scrambling may be performed as y(n)=x(n)·s(n), where x(n) is the n-th sample of the orthogonal spreading sequence (e.g., the second of the sixteen orthogonal spreading sequences), s(n)=1 if c(n)=0 and s(n)=−1 if c(n)=0, and c(n) is the scrambling sequence. Using the third NPUSCH format 2 resource structure 460 in FIG. 4C, up to twenty-eight different UEs may be multiplexed in a given RU for the four slot scenario. In the six slot scenario, up to forty-two different UEs may be multiplexed in a given RU. In the eight slot scenario, up to fifty-six different UEs may be multiplexed in a given RU.

Using either the first NPUSCH format 2 resource structure 440, the second NPUSCH format 2 resource structure 450, or the third NPUSCH format 2 resource structure 460 in FIG. 4C, the UE 404 may transmit the scheduling request 423 for the uplink transmission using at least one RU, as seen in FIG. 4B.

In one aspect, the RU may include a single subcarrier and a first number of symbols in each of N slots (e.g., 4 slots, 6 slots, in the NPUSCH format resource structure. In one aspect, a periodicity associated 8 slots, etc.) with the at least one RU allocated for the scheduling request may be associated with a repetition level for transmitting the scheduling request. In another aspect, a first duration of the periodicity associated with the at least one RU may be greater than a second duration associated with the at least one RU (e.g., a time duration of the scheduling request). In a further aspect, at least one of a cell-specific time offset or a UE-specific offset (e.g., used to increase the amount of the RU) may be included in the periodicity associated with the at least one RU, as illustrated in FIG. 4F.

Figure 5A:
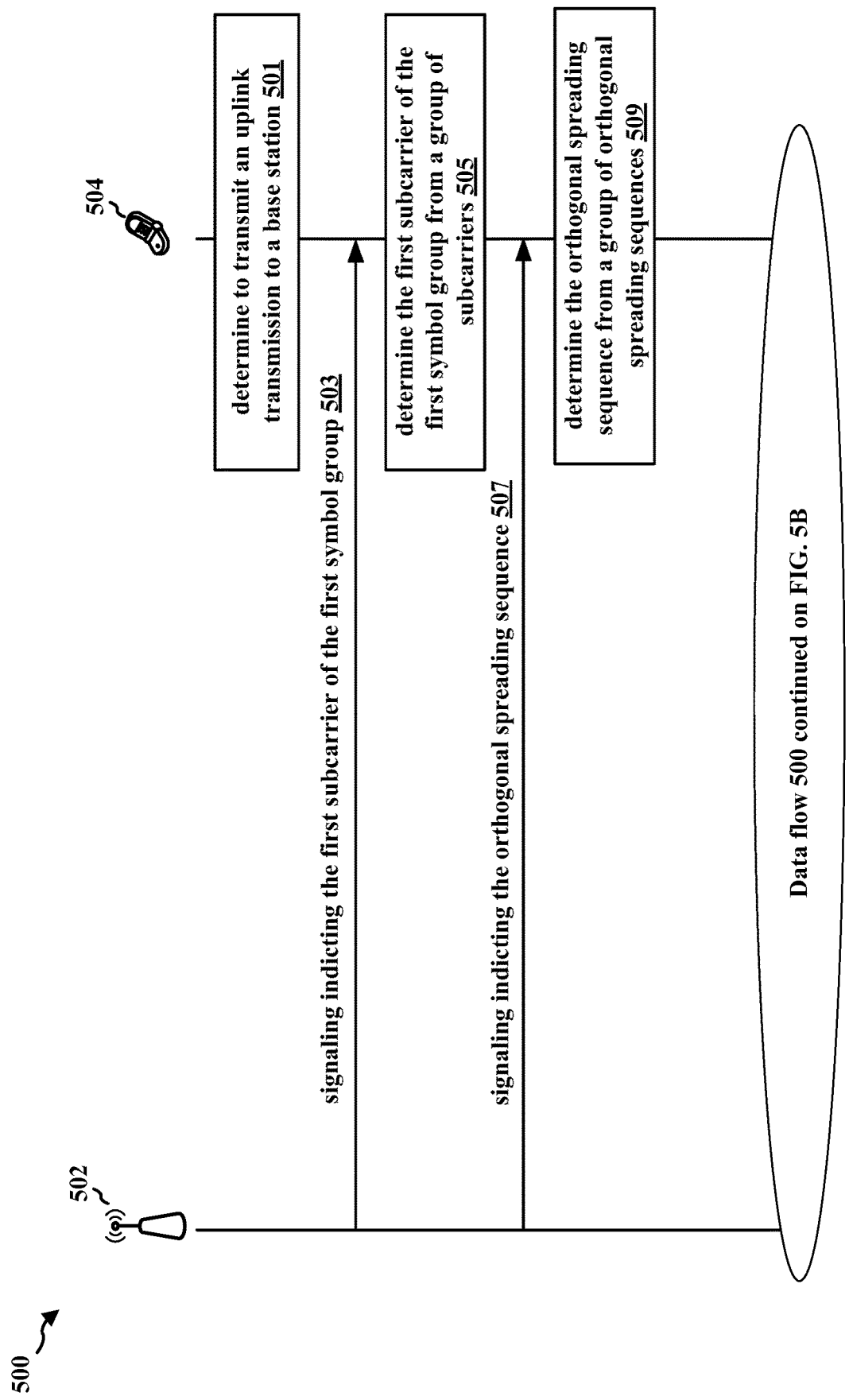
FIGS. 5A and 5B illustrate a data flow for a narrowband communication system(s) that may provide dedicated scheduling request resources in accordance with certain aspects of the present disclosure.
Figure 5B:
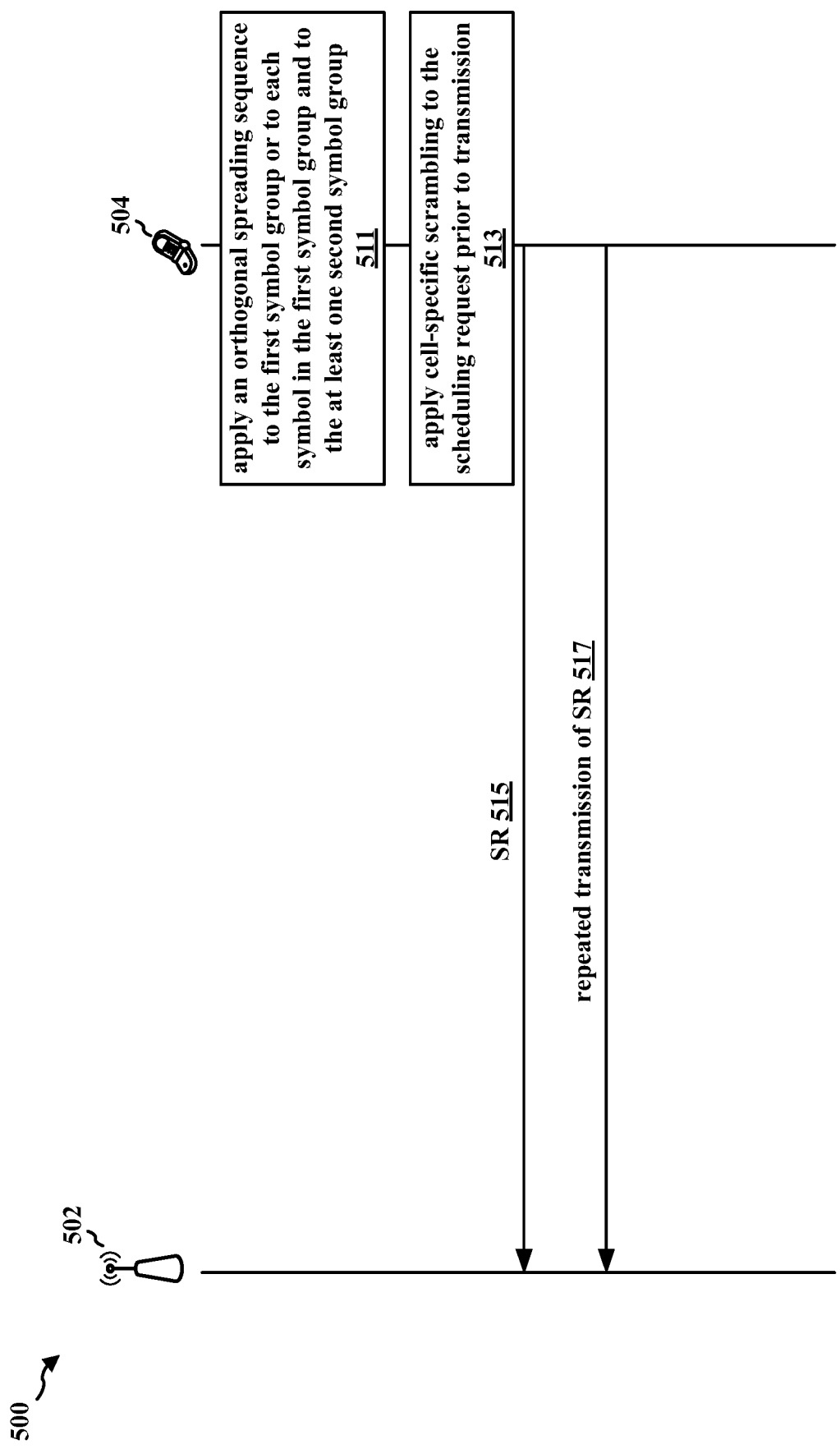

FIGS. 5A and 5B are a diagram illustrating a flow diagram 500 for a UE 504 to send a scheduling request to a base station 502 for an uplink grant in accordance with certain aspects of the disclosure. Base station 502 may correspond to, e.g., base station 102, 180, 1550, 1850, 2150, 2450, 2750, 3450, eNB 310. UE 504 may correspond to, e.g., UE 104, 350, apparatus 1502/1502', 1802/1802', 2102/2102', 2402/2402', 2702/2702', 3602/3602'. In addition, the base station 502 and the UE 504 may be configured to communicate using narrowband communications (e.g., NB-IoT and/or eMTC). For example, the UE 504 may be an NB-IoT device and/or an eMTC device.

Figure 5C:
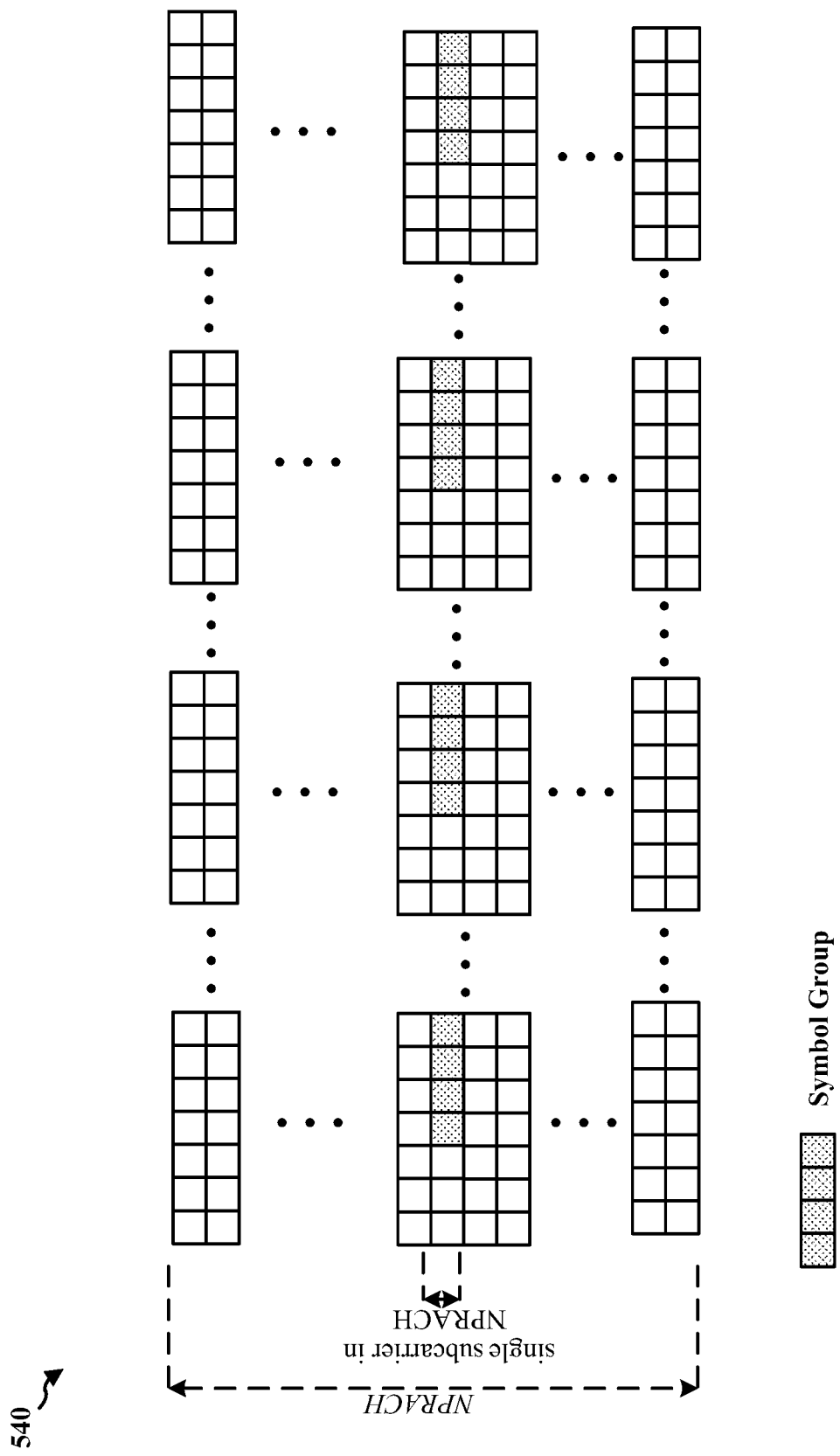
FIG. 5C is a diagram illustrating NPRACH resource structure without frequency hopping that may be used for transmitting one or more scheduling resources in a narrowband communication system in accordance with certain aspects of the disclosure.

FIG. 5C is a diagram illustrating aNPRACH resource structure 540 without frequency hopping that may be used for transmitting one or more scheduling resources in a narrowband communication system in accordance with certain aspects of the disclosure.

Figure 5D:
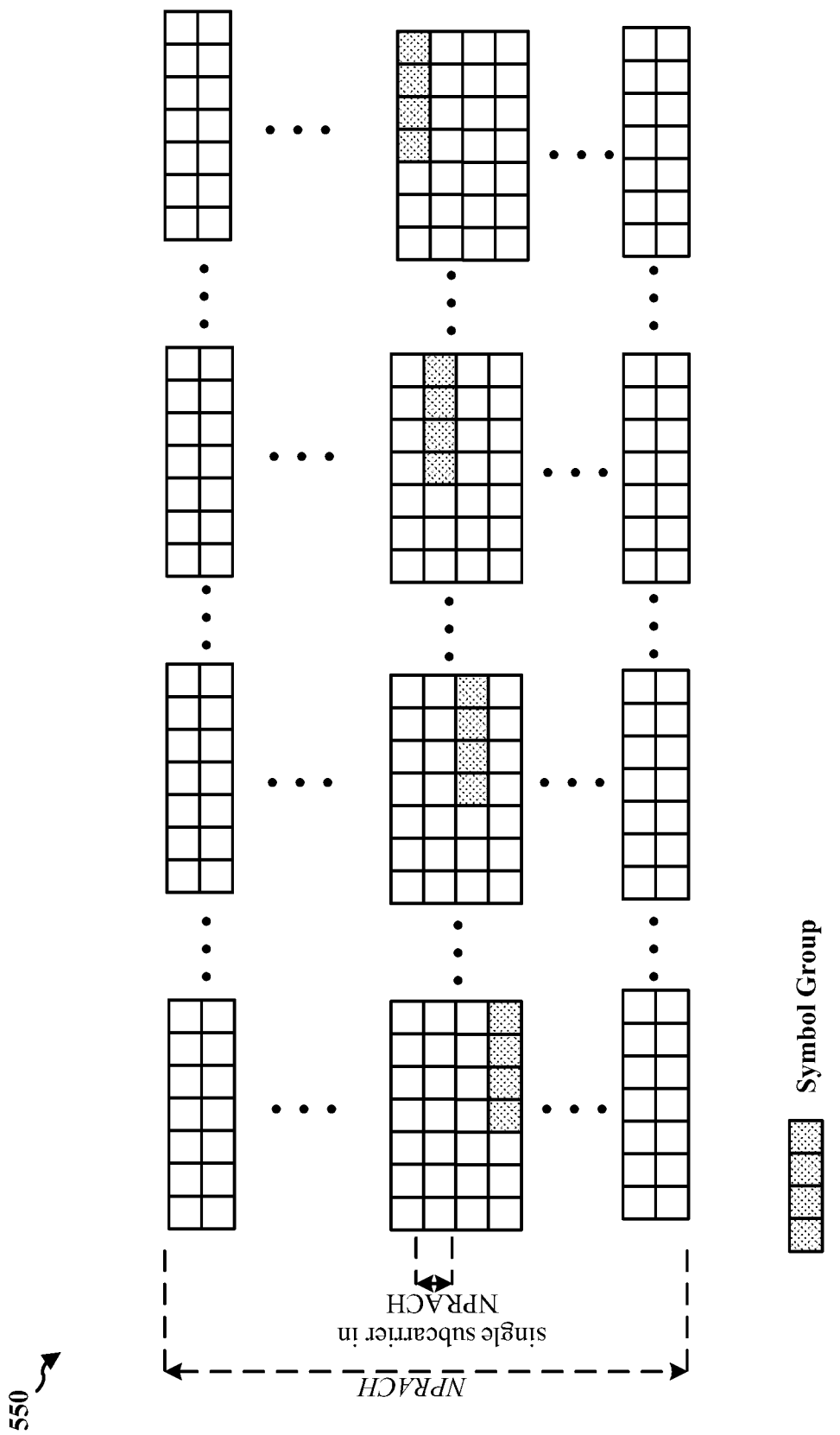
FIG. 5D is a diagram illustrating NPRACH resource structure with frequency hopping that may be used for transmitting one or more scheduling resources in a narrowband communication system in accordance with certain aspects of the disclosure.

FIG. 5D is a diagram illustrating a NPRACH resource structure 550 with frequency hopping that may be used for transmitting one or more scheduling resources in a narrowband communication system in accordance with certain aspects of the disclosure.

Referring to FIG. 5A, the UE 504 may determine 501 to transmit an uplink transmission to the base station 502. For example, the UE 504 may determine 501 to transmit the uplink transmission when the UE 504 is in connected-mode.

In another aspect, the UE 504 may receive signaling 503 from the base station 502 that indicates a first subcarrier of a first symbol group of four symbol groups to use in transmitting a scheduling request. In a further aspect, the UE 504 may determine 505 the first subcarrier of the first symbol group from a group of subcarriers based on the signaling 503.

In another aspect, the UE 504 may receive signaling 507 from the base station 502 indicating an orthogonal spreading sequence the UE 504 may apply to each of the four symbol groups, and the UE 504 may determine 509 the orthogonal spreading sequence based on the signaling 507. Alternatively, the UE 504 may determine 509 the orthogonal spreading sequence based on a UE-ID associated with the UE 504.

Referring to FIG. 5B, the UE 504 may apply 511 the determined orthogonal spreading sequence to each symbol group in the four symbol groups.

In one configuration, each of the first symbol group, the second symbol group, the third symbol group, and the fourth symbol group may be associated with a different data sample of the orthogonal spreading sequence or each symbol in all symbol groups may be associated with a different data sample.

In another configuration, each of the first symbol group, the second symbol group may be associated with a different data sample of a spreading sequence.

In a further configuration, each repetition includes four symbol groups. In one aspect, the orthogonal spreading sequence may include a length-four Walsh code or a length-twenty Walsh Code. In another aspect, each of the first symbol group, the second symbol group, the third symbol group, and the fourth symbol group may be allocated to four or fewer different UEs or to twenty or fewer different UEs (e.g., depending on the length of the Walsh code used as the orthogonal spreading sequence). In another aspect, a length-five spreading sequence may be applied within one of the four symbol groups. In a further aspect, the length-five spreading sequence may be applied to the other symbol groups in the four symbol groups, or a different spreading sequence may be applied to the other symbol groups in the four symbol groups. In yet another aspect, a data sample may be applied to each symbol in the one of the four symbol groups.

The UE 504 may transmit the scheduling request 515 for the uplink transmission using the first symbol group allocated in the NPRACH. In one aspect, the first symbol group may include a first number of symbols in the first subcarrier. The first subcarrier may have a subcarrier spacing of 3.75 kHz.

In certain configurations, the UE 504 may apply 513 cell-specific scrambling to the scheduling request prior to transmission. In addition, the UE 504 may repeat a transmission of the scheduling request 517 using each of the second symbol group, the third symbol group, and the fourth symbol group allocated in the NPRACH. In one aspect, each symbol group of the four symbol groups may include the same number of symbols (e.g., more than two symbols). In one aspect, each of the four symbol groups may be allocated in the same subcarrier (e.g., no frequency hopping), as illustrated in FIG. 5C. In another aspect, each of the four symbol groups may be allocated in different subcarriers (e.g., frequency hopping), as illustrated in FIG. 5D.

Although four symbol groups are described above with respect to FIGS. 5A and 5B, the number of symbol groups may not be limited to four. In other words, more than or less than four symbol groups per scheduling request repetition may be used without departing from the scope of the present disclosure. For example, the number of symbol groups may be based on an NPRACH repetition level or a NPUSCH format 2 repetition level that may be less than four symbol groups, four symbol groups, or more than four symbol groups.

Additionally, a periodicity associated with the symbol groups allocated for the scheduling request may be associated with a repetition level for transmitting the scheduling request. In another aspect, a first duration of the periodicity associated with the symbol groups may be greater than a second duration associated with one of the symbol groups (e.g., a time duration of the scheduling request). In a further aspect, at least one of a cell-specific time offset or a UE-specific offset (e.g., used to increase the amount of the resource(s) in the symbol groups) may be included in the periodicity associated with the symbol groups, as illustrated in FIG. 4F.

Figure 6A:
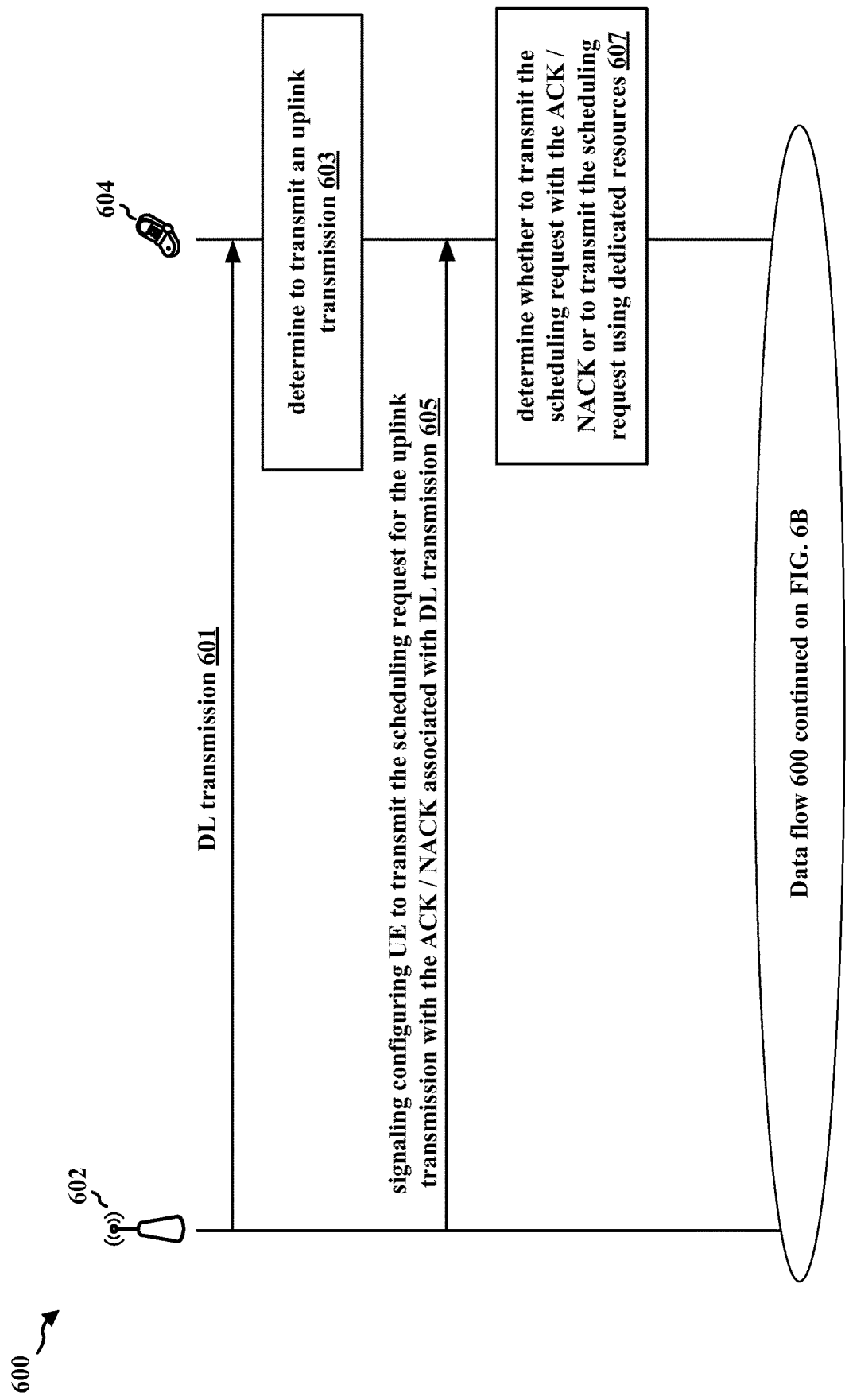
FIGS. 6A, 6B, and 6C illustrate a data flow for a narrowband communication system(s) that may provide dedicated scheduling request resources in accordance with certain aspects of the present disclosure.
Figure 6B:
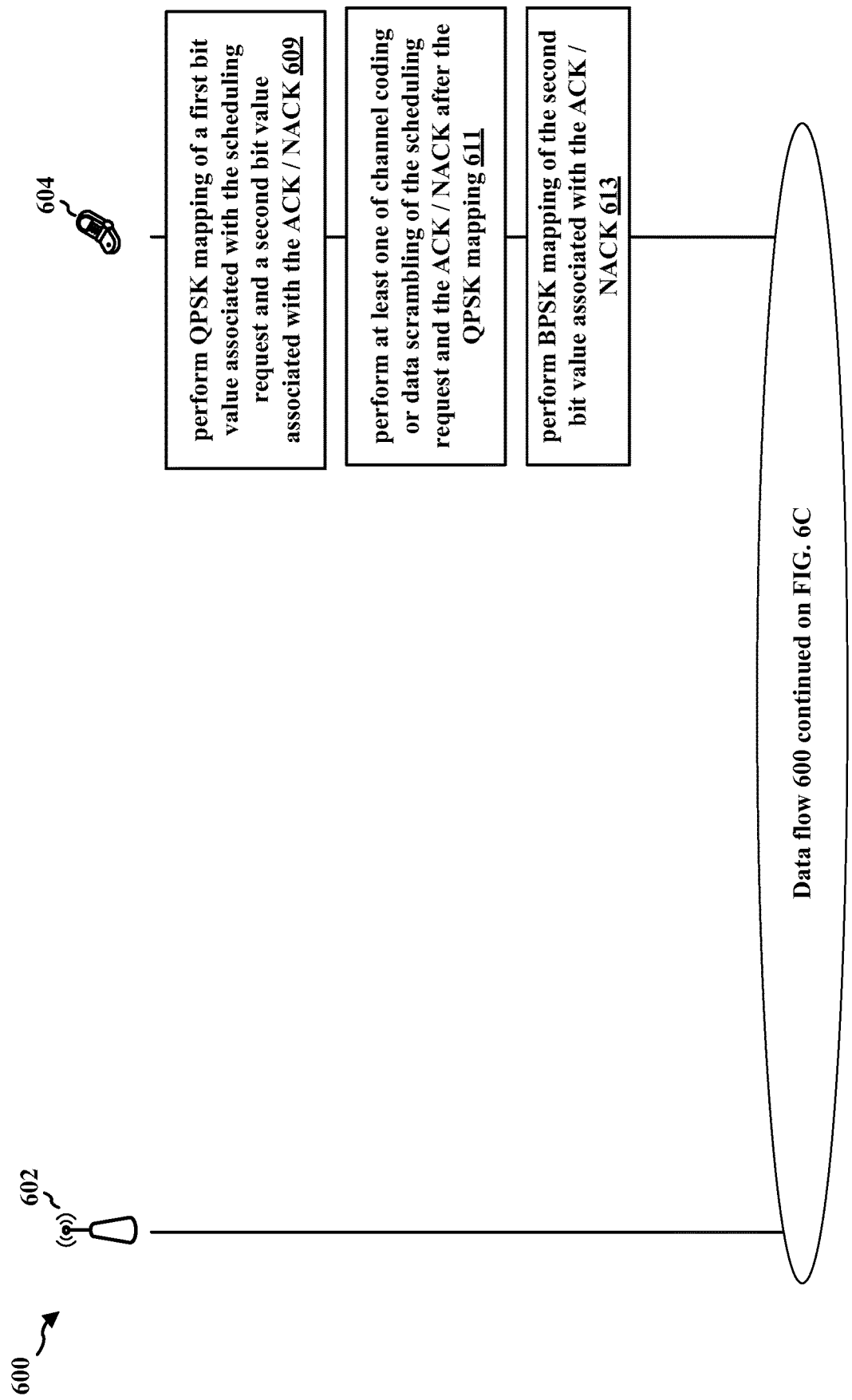
Figure 6C:
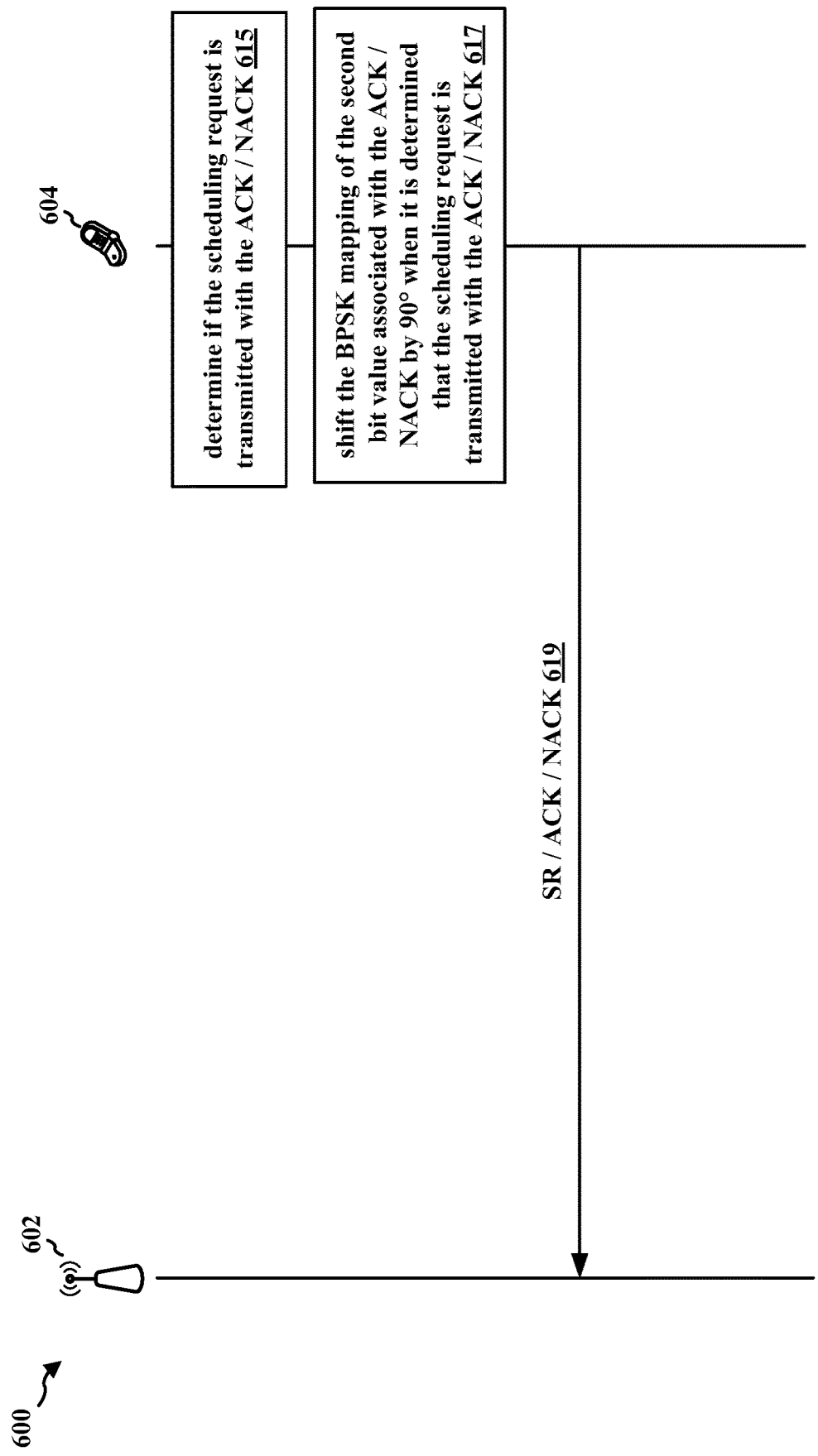

FIGS. 6A-6C are a diagram illustrating a flow diagram 600 for a UE 604 to send a scheduling request to a base station 602 for an uplink grant in accordance with certain aspects of the disclosure. Base station 602 may correspond to, e.g., base station 102, 180, 1550, 1850, 2150, 2450, 2750, 3450, eNB 310. UE 604 may correspond to, e.g., UE 104, 350, apparatus 1502/1502', 1802/1802', 2102/2102', 2402/2402', 2702/2702', 3602/3602'. In addition, the base station 602 and the UE 604 may be configured to communicate using narrowband communications (e.g., NB-IoT and/or eMTC). For example, the UE 604 may be an NB-IoT device and/or an eMTC device.

In one aspect, the UE 604 may receive one or more downlink transmissions 601 from the base station 602. For example, the downlink transmissions 601 may include narrowband physical downlink control channel (NPDCCH) transmissions and/or narrowband physical downlink shared channel (NPDSCH) transmissions.

In another aspect, the UE 604 may determine 603 to transmit an uplink transmission to the base station 602. For example, the UE 604 may determine 603 to transmit the uplink transmission while the UE 604 is in connected-mode.

In a further aspect, the UE 604 may receive first signaling 605 from the base station 602. The first signaling 605 may configure the UE 604 to transmit a scheduling request for the uplink transmission with an ACK/NACK associated with the one or more downlink transmissions 601. For example, the first signaling 605 may configure the UE 604 to append (e.g., piggyback) the scheduling request to an ACK/NACK transmission associated with the one or more downlink transmissions 601. In one configuration, the UE 604 may receive the first signaling 605 in a MAC command or RRC reconfiguration signaling. In one aspect, any dedicated scheduling request resources (e.g., in NPUSCH format 2 or NPRACH) may be release (e.g., no longer allocated to UE 604) when the first signal 605 is received by the UE 604. In certain configurations, the first signaling 605 or different signaling (e.g., not illustrated in FIGS. 6A-6C) may be used configure an increase in a first number of repeated transmissions of the scheduling request transmitted by the UE 604.

In another aspect, the UE 604 may determine 607 whether to transmit the scheduling request with the ACK/NACK when the first signaling 605 is received. For example, the UE 604 may determine 607 to transmit the scheduling request for the uplink transmission with the ACK/NACK associated with the one or more downlink transmissions after the first signaling 605 is received and a counter at the UE 604 reaches a threshold number. In one configuration, information associated with the threshold number may be included in the first signaling 605. In another configuration, information associated with the threshold number may be preconfigured at the UE 604.

The base station 602 may reset the counter at the UE 604 at any time. When the base station 602 resets the counter to a specific value (e.g., signaling not illustrated in FIGS. 6A-6C may be used by the base station 602 to indicate to the UE 604 that the counter has been reset), the UE 604 may determine to not transmit scheduling request(s) with ACK/NACK transmissions. In addition, the UE 604 may increment the counter by a predetermined number (e.g., "1") whenever an ACK/NACK is transmitted without a scheduling request, and reset the counter to an initial value (e.g., "0") whenever a scheduling request is appended to an ACK/NACK. In addition, the UE 604 may determine to not transmit scheduling request(s) with ACK/NACK transmissions when a downlink transmission has not been received within a threshold period (e.g., when a timer at the UE 604 expires).

Referring to FIG. 6B, the UE 604 may perform 609 quadrature phase-shift keying (QPSK) mapping of a first bit value associated with the scheduling request and a second bit value associated with the ACK/NACK. In one implementation, the QPSK mapping of the first bit value associated with the scheduling request and the second bit value associated with the ACK/NACK may include four non-uniformly spaced constellation points if the scheduling request and ACK/NACK have different error performance requirements.

For example, if a signal transmitted by the UE 609 is shifted by 60° instead of by 90°, a larger scheduling request missed detection rate may be achieved while maintaining a smaller error rate when deciding on an ACK while no discontinuous transmission (DTX) signal or NACK is transmitted. In certain implementations, the introduction of a scheduling request with an ACK/NACK may cause performance degradation unless an increased signal power is used by the UE 609 for a scheduling request and ACK/NACK transmission.

In a first scenario in which the repetition level of the scheduling request is not increased, a predetermined number of bit(s) associated with ACK/NACK (e.g., 1 bit) and a predetermined number of bit(s) associated with the scheduling request (e.g., 1 bit) may be mapped together onto a QPSK constellation before the UE 604 may perform 611 at least one of channel coding or data scrambling of the scheduling request and the ACK/NACK.

Further, the UE 604 may perform 613 binary phase-shift keying (BPSK) mapping of the second bit value associated with the ACK/NACK, and determine 615 if the scheduling request is transmitted with the ACK/NACK, as seen in FIG. 6C. When it is determined that the scheduling request is transmitted with the ACK/NACK, the UE 604 may shift 617 the BPSK mapping of the second bit value associated with the ACK/NACK by 90° or any other predetermined angle (e.g., 20°, 45°, 60°, 120°, etc.). In one aspect, the shift angle may be determined by the network 602 and signaled to UE 604.

In a further aspect, the UE 604 may transmit the scheduling request 619 for the uplink transmission with the ACK/NACK associated with the one or more downlink transmissions using a NPUSCH format resource structure (e.g., NPUSCH format 2 resource structure).

In a second scenario in which the repetition level of the scheduling request is increased, the UE 604 may use the QPSK constellation described above. Additionally and/or alternatively, the UE 604 may transmit the scheduling request 619 with the ACK/NACK multiple times (e.g., a second number of transmissions). In one aspect, the second number of transmissions may be associated with a number of repetitions for the NPUSCH format resource structure.

Further, the UE 604 may transmit the scheduling request 619 using allocated resources without the ACK/NACK a third number of transmissions. For example, the third number of transmissions may be sent using the NPUSCH format 2 resource structure 440 described above and illustrated in FIG. 4C. In one aspect, the third number of transmissions may be the difference between the first number of repeated transmissions and the second number of transmissions associated with the NPUSCH format resource structure.

Figure 7:
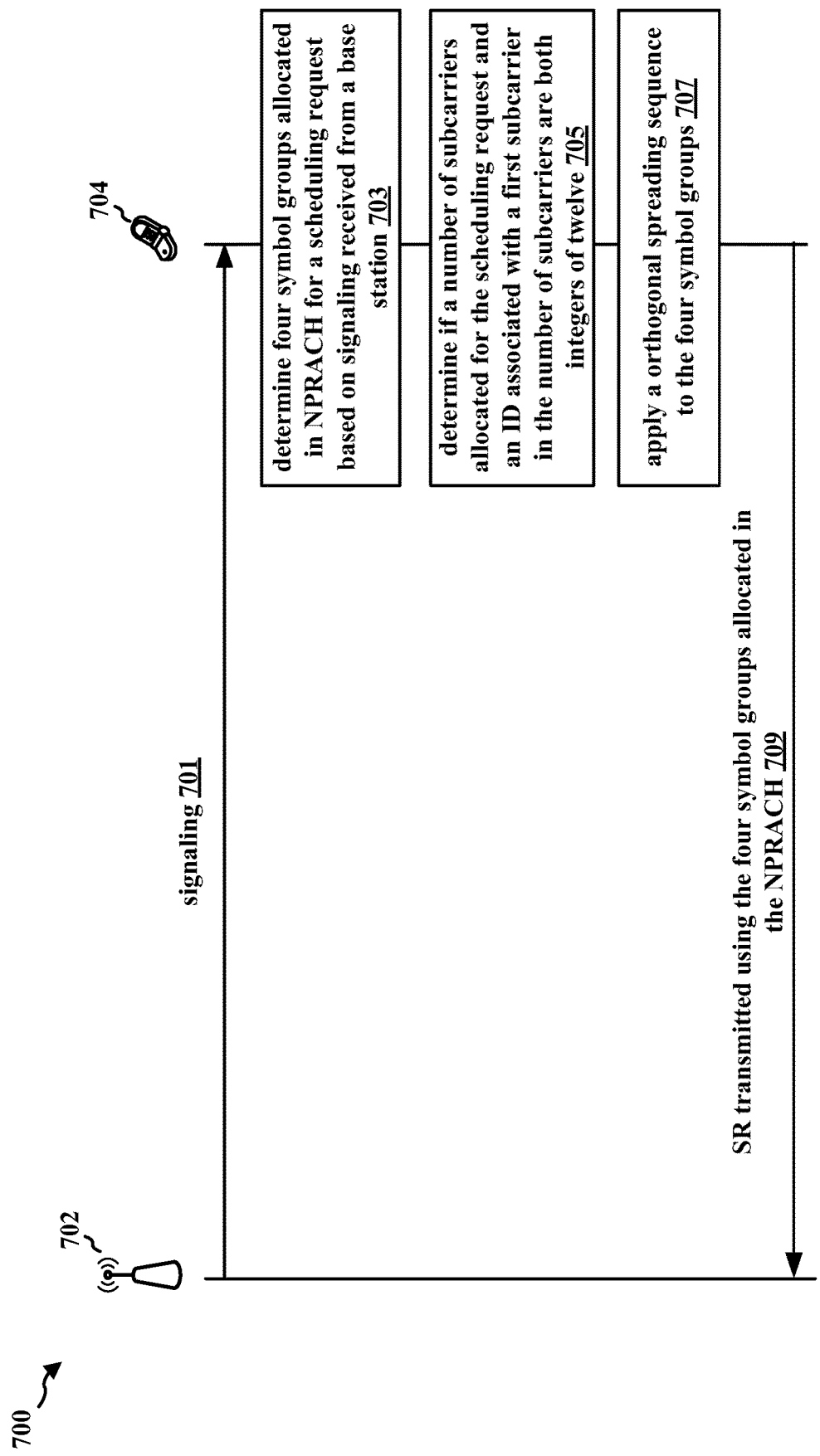
FIG. 7 illustrates a data flow for a narrowband communication system(s) that may provide dedicated scheduling request resources in accordance with certain aspects of the present disclosure.

FIG. 7 is a diagram illustrating a flow diagram 700 for a UE 704 to send a scheduling request to a base station 702 for an uplink grant in accordance with certain aspects of the disclosure. Base station 702 may correspond to, e.g., base station 102, 180, 1550, 1850, 2150, 2450, 2750, 3450, eNB 310. UE 704 may correspond to, e.g., UE 104, 350, apparatus 1502/1502', 1802/1802', 2102/2102', 2402/2402', 2702/2702', 3602/3602'. In addition, the base station 702 and the UE 704 may be configured to communicate using narrowband communications (e.g., NB-IoT and/or eMTC). For example, the UE 704 may be an NB-IoT device and/or an eMTC device.

In one aspect, the UE 704 may receive signaling 701 from the base station 702 that the UE 704 may use to determine 703 four symbol groups allocated in an NPRACH for a scheduling request. For example, the scheduling request may use part or all of reserved NPRACH starting subcarriers. Legacy UEs may have preconfigured knowledge of which resources in the NPRACH are reserved for scheduling requests, and may postpone any uplink transmission that will collide with the reserved resources.

In another aspect, the UE 704 may determine 705 if a number of subcarriers allocated for the scheduling request and an ID associated with a first subcarrier in the number of subcarriers are both integers of twelve. In one aspect, each of the four symbol groups may be located in a same subcarrier when the number of subcarriers and the ID associated with the first subcarrier are both integers of twelve (e.g., see FIG. 5C). In another aspect, the scheduling request may be transmitted using a frequency hopping pattern between each of the four symbol groups when one or more of the number of subcarriers or the ID associated with the subcarrier are not an integer of twelve (e.g., see FIG. 5D).

In a further aspect, the UE 704 may apply 707 an orthogonal spreading sequence to the four symbol groups. For example, the orthogonal spreading sequence may be applied but with less multiplexing gain. The UE 704 may transmit the scheduling request 709 using the four symbol groups allocated in the NPRACH. In addition, the scheduling request may be retransmitted in each of the four symbol groups allocated in the NPRACH.

FIG. 8A is a diagram illustrating a flow diagram 800 for a UE 804 to send a scheduling request to a base station 802 for an uplink grant in accordance with certain aspects of the disclosure. Base station 802 may correspond to, e.g., base station 102, 180, 1550, 1850, 2150, 2450, 2750, 3450, eNB 310. UE 804 may correspond to, e.g., UE 104, 350, apparatus 1502/1502', 1802/1802', 2102/2102', 2402/2402', 2702/2702', 3602/3602'. In addition, the base station 802 and the UE 804 may be configured to communicate using narrowband communications (e.g., NB-IoT and/or eMTC). For example, the UE 804 may be an NB-IoT device and/or an eMTC device.

Figure 8B:
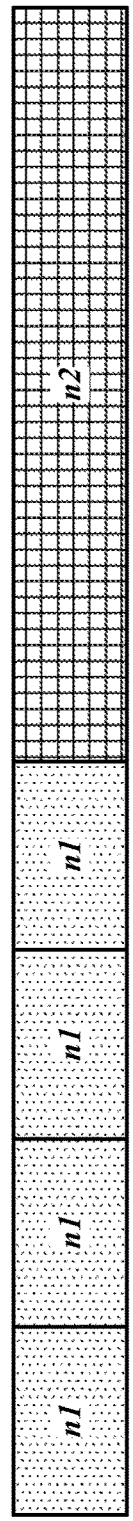
FIG. 8B is a diagram illustrating a NPRACH resource block that may be further divided into several regions, and each region may be associated with a scheduling request repetition level comprising one or multiple scheduling request time resource elements in accordance with certain aspects of the present disclosure.

FIG. 8B is a diagram illustrating a NPRACH resource block 815 that may be further divided into several regions, and each region may be associated with a scheduling request repetition level including one or multiple scheduling request time resource elements.

Referring to FIG. 8A, the UE 804 may determine 801 to transmit a number of repeated scheduling requests to the base station 802. In another aspect, the UE 804 may determine 803 a set of subcarriers allocated in a NPRACH resource block.

In a further aspect, the UE 804 may receive signaling 805 indicating a first number of repetitions associated with resource elements in a first subcarrier in the set of subcarriers, and a second number of repetitions associated with resource elements in a second subcarrier in the set of subcarriers.

For example, one NPRACH resource block (e.g., indicated by a starting subcarrier associated with a repetition level N) may be further divided into several regions, and each region may be associated with a scheduling request repetition level including one or multiple scheduling request time resource elements.

Referring to FIG. 8B, if $N = n1 \cdot k1 + n2 \cdot k2$, then the N repetition level may be divided into two regions 820, 830. The first region 820 may be further divided into n1 resource elements (e.g., $n1 \geq 1$) with each element having k1 repetitions (e.g., k1=4) and the second region 830 may be further divided into n2 resource elements (e.g., $n2 \geq 1$) with each element having k2 repetitions (e.g., k2=1).

Referring again to FIG. 8A, the UE 804 may determine 807 that the number of repeated scheduling requests is equal to either the first number of repetitions or the second number of repetitions.

In another aspect, the UE 804 may determine 809 a starting resource element to begin transmission of the number of scheduling requests based on whether the number of scheduling requests is equal to the first number of repetitions or the second number of repetitions. As an illustrative example, assume the UE 804 determines 807 that the number of repeated scheduling requests is 1, which is equal to k2. Hence, the UE 804 may determine a starting resource element associated with the second region 830 illustrated in FIG. 8B to begin transmitting the scheduling request 811.

A scheduling request may collide with another downlink transmission (e.g., NPDCCH transmission and/or NPDSCH transmission) and/or search space if subframes allocated for the scheduling request are located within M subframes prior to the downlink transmission and/or search space.

In addition, a scheduling request may collide with another downlink transmission (e.g., NPDCCH transmission and/or NPDSCH transmission) and/or search space if subframes allocated for the scheduling request include the same subframes used for the downlink transmission and/or search space.

Further, a scheduling request may collide with another downlink transmission (e.g., NPDCCH transmission and/or NPDSCH transmission) and/or search space if subframes allocated for the scheduling request are located within N subframes after the end of the downlink transmission and/or search space. The exact value of M and N may depend on the type of physical channel that carries the transmission and the content of the search space.

There is a need to avoid collisions between a scheduling request and a downlink transmission and/or search space. Each of FIGS. 9-13 described below provide a technique that may be used to avoid collisions between a scheduling request and a downlink transmission and/or search space, in accordance with certain aspects of the present disclosure.

FIG. 9 is a diagram illustrating a flow diagram 900 for a UE 904 to send a scheduling request to a base station 902 for an uplink grant in accordance with certain aspects of the disclosure. Base station 902 may correspond to, e.g., base station 102, 180, 1550, 1850, 2150, 2450, 2750, 3450, eNB 310. UE 904 may correspond to, e.g., UE 104, 350, apparatus 1502/1502', 1802/1802', 2102/2102', 2402/2402', 2702/2702', 3602/3602'. In addition, the base station 902 and the UE 904 may be configured to communicate using narrowband communications (e.g., NB-IoT and/or eMTC). For example, the UE 904 may be an NB-IoT device and/or an eMTC device.

In one aspect, the UE 904 may determine 901 to transmit an uplink transmission to the base station 902. For example, the UE 904 may determine 901 to transmit the uplink transmission while in connected-mode.

In another aspect, the UE 904 may determine 903 to transmit a scheduling request using one or more first allocated resources. In a further aspect, the UE 904 may determine 905 that the one or more first allocated resources are located within either M subframes before or N subframes after a physical downlink channel transmission from the base station.

In another aspect, the UE 904 may postpone 907 a transmission of the scheduling request using one or more second allocated resources. In one aspect, the one or more second allocated resources may be allocated later in the time domain than the one or more first allocated resources. The UE 904 may transmit the scheduling request 909 using the one or more second allocated resources.

As an illustrative example, assume that M is equal to 2 and N is equal to 2. Then, if the one or more first allocated resources for the scheduling request are allocated two or fewer subframes before the start of a downlink transmission, or two or fewer subframes after the completion of the downlink transmission, the UE 904 may postpone 907 the scheduling request until a subsequence set of allocated resources to avoid a potential collision with the physical channel downlink transmission.

Figure 10:
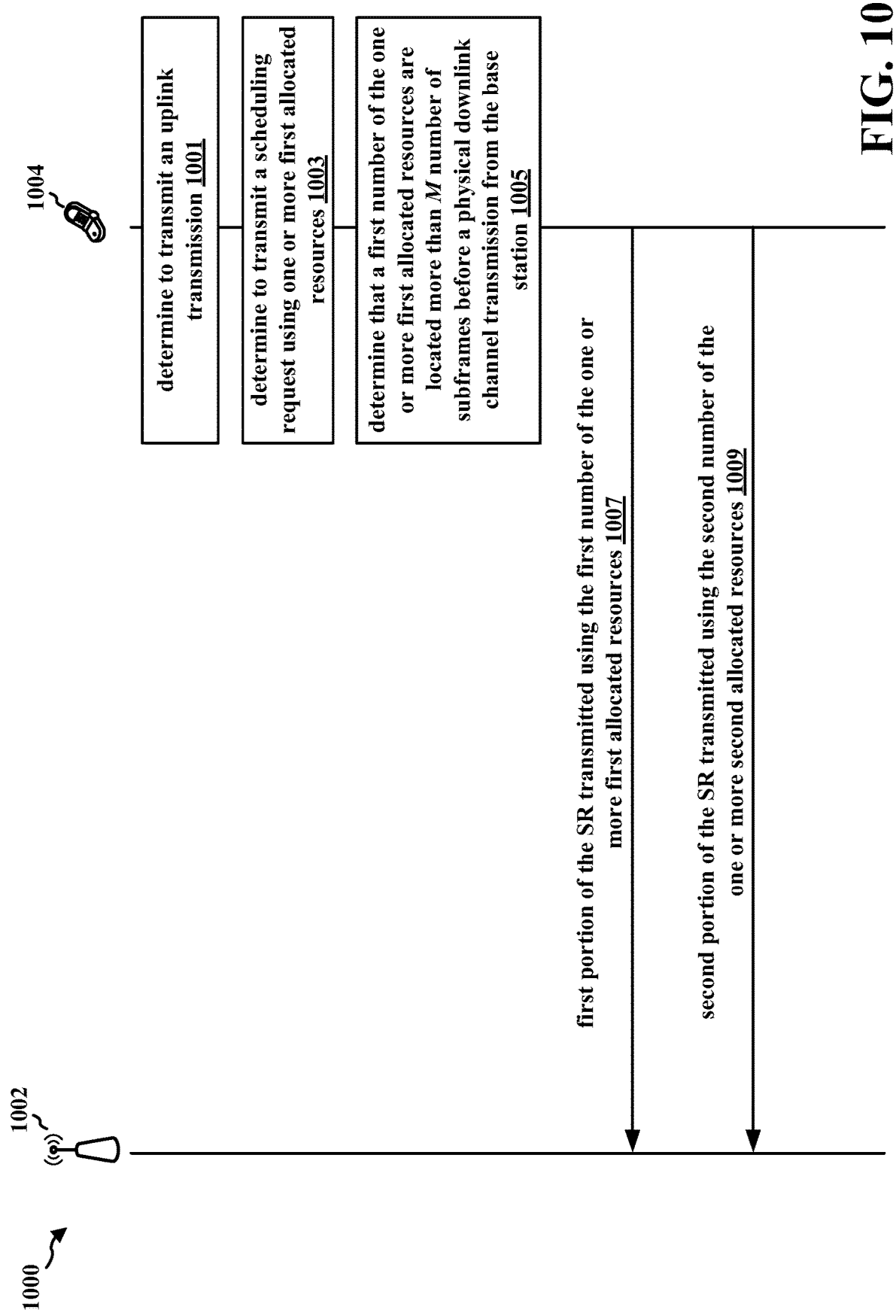
FIG. 10 illustrates a data flow for a narrowband communication system(s) that may provide dedicated scheduling request resources in accordance with certain aspects of the present disclosure.

FIG. 10 is a diagram illustrating a flow diagram 1000 for a UE 1004 to send a scheduling request to a base station 1002 for an uplink grant in accordance with certain aspects of the disclosure. Base station 1002 may correspond to, e.g., base station 102, 180, 1550, 1850, 2150, 2450, 2750, 3450, eNB 310. UE 1004 may correspond to, e.g., UE 104, 350, apparatus 1502/1502', 1802/1802', 2102/2102', 2402/2402', 2702/2702', 3602/3602'. In addition, the base station 1002 and the UE 1004 may be configured to communicate using narrowband communications (e.g., NB-IoT and/or eMTC). For example, the UE 1004 may be an NB-IoT device and/or an eMTC device.

In one aspect, the UE 1004 may determine 1001 to transmit an uplink transmission to the base station 1002. For example, the UE 1004 may determine 1001 to transmit the uplink transmission while in connected-mode.

In another aspect, the UE 1004 may determine 1003 to transmit a scheduling request using one or more first allocated resources. In a further aspect, the UE 1004 may determine 1005 that a first number of the one or more first allocated resources are located more thanMsubframes before a physical downlink channel transmission from the base station.

In another aspect, the UE 1004 may transmit a first portion 1007 of the scheduling request using the first number of the one or more first allocated resources, and transmit a second portion 1009 of the scheduling request using one or more second allocated resources. In a further aspect, the one or more second allocated resources may be located more than N subframes after the physical downlink channel transmission in a time domain.

As an illustrative example, assume that M is equal to 2 and N is equal to 2, that the one or more first allocated resources are located in subframes 2, 3, and 4 in a radio frame, and that the physical channel downlink transmission is transmitted in subframes 6 and 7 of the same radio frame.

Hence, UE 1004 may transmit the first portion 1007 of the scheduling request using the first allocated resources in subframes 2 and 3, but not the first allocated resources in subframe 4. The second portion of the scheduling request may be transmitted using the allocated resources in a subsequent radio frame.

Figure 11:
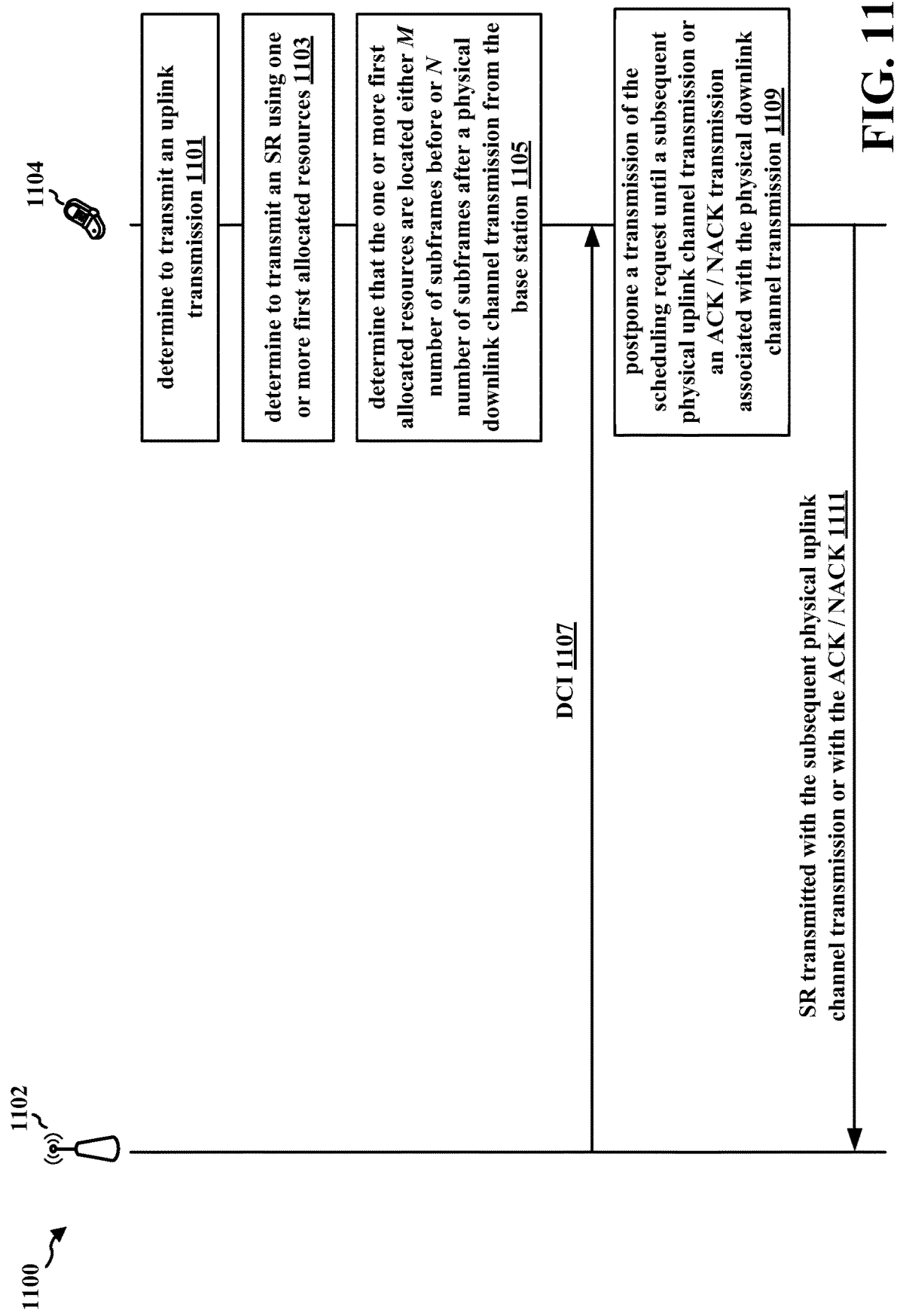
FIG. 11 illustrates a data flow for a narrowband communication system(s) that may provide dedicated scheduling request resources in accordance with certain aspects of the present disclosure.

FIG. 11 is a diagram illustrating a flow diagram 1100 for a UE 1104 to send a scheduling request to a base station 1102 for an uplink grant in accordance with certain aspects of the disclosure. Base station 1102 may correspond to, e.g., base station 102, 180, 1550, 1850, 2150, 2450, 2750, 3450, eNB 310. UE 1104 may correspond to, e.g., UE 104, 350, apparatus 1502/1502', 1802/1802', 2102/2102', 2402/2402', 2702/2702', 3602/3602'. In addition, the base station 1102 and the UE 1104 may be configured to communicate using narrowband communications (e.g., NB-IoT and/or eMTC). For example, the UE 1104 may be an NB-IoT device and/or an eMTC device.

In one aspect, the UE 1104 may determine 1101 to transmit an uplink transmission to the base station 1102. For example, the UE 1104 may determine 1101 to transmit the uplink transmission while in connected-mode. In another aspect, the UE 1104 may determine 1103 to transmit a scheduling request using one or more first allocated resources.

In a further aspect, the UE 1104 may determine 1105 that the one or more first allocated resources are located either M subframes before or N subframes after a physical downlink channel transmission from the base station 1102. In addition, the UE 1104 may receive DCI 1107 indicating that the transmission of the scheduling request is postponed until the subsequent physical uplink channel transmission or the ACK/NACK transmission.

Further, the UE 1104 may postpone 1109 a transmission of the scheduling request until a subsequent physical uplink channel transmission or an ACK/NACK transmission associated with the physical downlink channel transmission based on the DCI 1107. In an aspect, the subsequent physical uplink channel transmission or the ACK/NACK transmission may be located before one or more second allocated resources for the scheduling request.

The UE 1104 may transmit the scheduling request 1111 with the subsequent physical uplink channel transmission or with the ACK/NACK transmission that is transmitted in response to the physical downlink channel transmission received from the base station 1102.

In one configuration, the scheduling request 1111 may be multiplexed with the ACK/NACK based on channel selection. In another configuration, the scheduling request 1111 may be transmitted immediately after ACK/NACK. In a further configuration, the scheduling request 1111 may transmitted immediately prior to the ACK/NACK by delaying ACK/NACK.

The resources used to transmit the scheduling request 1111 with the ACK/NACK may be a) the same resources allocated for the scheduling request, b) the same resources as those allocated for the ACK/NACK, and/or c) signaled in DCI (e.g., DCI 1107 or in DCI that is received subsequently to DCI 1107). The DCI may include one bit of information that may indicate the resources allocated for the scheduling request, and another bit through the payload that indicates the repetition level corresponding to ACK/NACK and/or scheduling request.

As an illustrative example, assume that M is equal to 2 and N is equal to 2. Then, if the one or more first allocated resources for the scheduling request are allocated two or fewer subframes before the start of a downlink transmission, or two or fewer subframes after the completion of the downlink transmission, the UE 904 may postpone 1109 the scheduling request until the subsequent physical uplink channel transmission or with the ACK/NACK transmission associated with the physical downlink channel transmission to avoid a potential collision with the downlink transmission.

Figure 12:
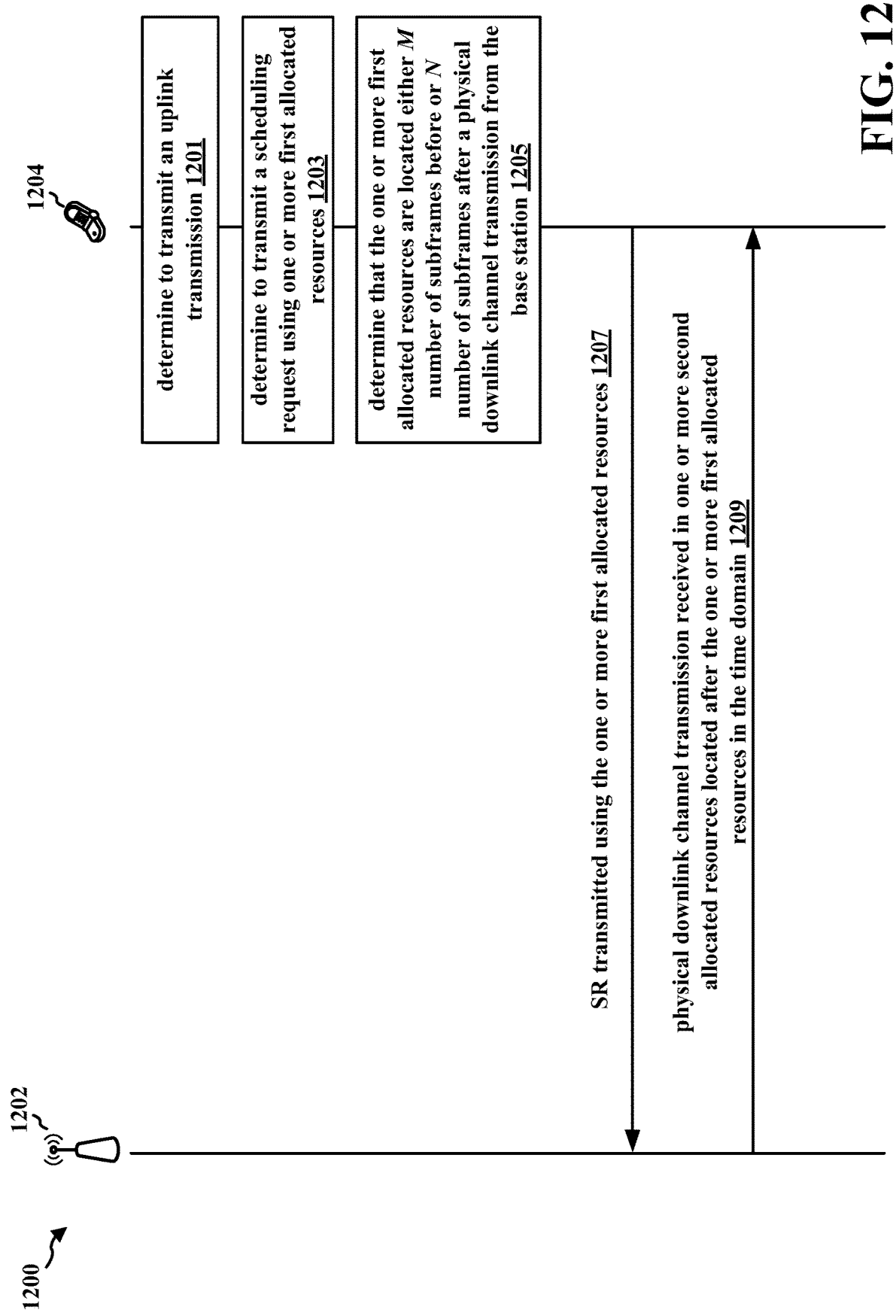
FIG. 12 illustrates a data flow for a narrowband communication system(s) that may provide dedicated scheduling request resources in accordance with certain aspects of the present disclosure.

FIG. 12 is a diagram illustrating a flow diagram 1200 for a UE 1204 to send a scheduling request to a base station 1202 for an uplink grant in accordance with certain aspects of the disclosure. Base station 1202 may correspond to, e.g., base station 102, 180, 1550, 1850, 2150, 2450, 2750, 3450, eNB 310. UE 1204 may correspond to, e.g., UE 104, 350, apparatus 1502/1502', 1802/1802', 2102/2102', 2402/2402', 2702/2702', 3602/3602'. In addition, the base station 1202 and the UE 1204 may be configured to communicate using narrowband communications (e.g., NB-IoT and/or eMTC). For example, the UE 1204 may be an NB-IoT device and/or an eMTC device.

In one aspect, the UE 1204 may determine 1201 to transmit an uplink transmission to the base station 1202. The UE 1204 may determine 1201 to transmit the uplink transmission when the UE 1204 is in connected-mode. In another aspect, the UE 1204 may determine 1203 to transmit a scheduling request using one or more first allocated resources.

In a further aspect, the UE 1204 may determine 1205 that the one or more first allocated resources are located within either M subframes before or N subframes after a physical downlink channel transmission from the base station 1202. In addition, the UE 1204 may transmit the scheduling request 1207 using the one or more first allocated resources. The UE 1204 may receive the physical downlink channel transmission 1209 in one or more second allocated resources located after the one or more first allocated resources in the time domain.

As an illustrative example, assume that M is equal to 2 and N is equal to 2. Then, if the one or more first allocated resources for the scheduling request are allocated two or fewer subframes before the start of a downlink transmission or two or fewer subframes after the completion of the downlink transmission, the UE 1204 may transmit the scheduling request 1207 using the one or more first allocated resources, and the base station 1202 may postpone the physical downlink channel transmission 1209 until one or more second allocated resources allocated for downlink channel transmissions that are located subsequent to the one or more first allocated resources in the time domain.

Figure 13:
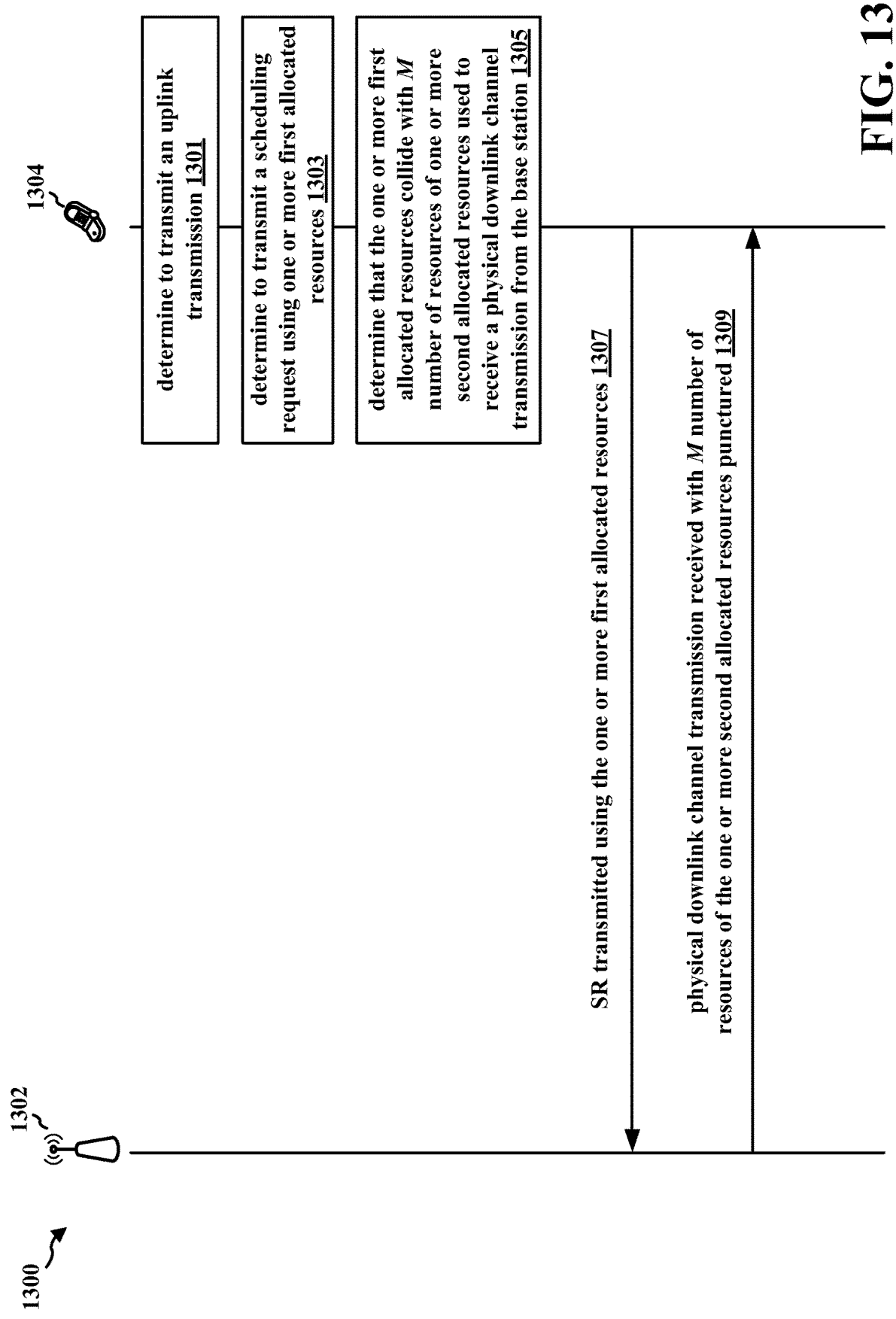
FIG. 13 illustrates a data flow for a narrowband communication system(s) that may provide dedicated scheduling request resources in accordance with certain aspects of the present disclosure.

FIG. 13 is a diagram illustrating a flow diagram 1300 for a UE 1304 to send a scheduling request to a base station 1302 for an uplink grant in accordance with certain aspects of the disclosure. Base station 1302 may correspond to, e.g., base station 102, 180, 1550, 1850, 2150, 2450, 2750, 3450, eNB 310. UE 1304 may correspond to, e.g., UE 104, 350, apparatus 1502/1502', 1802/1802', 2102/2102', 2402/2402', 2702/2702', 3602/3602'. In addition, the base station 1302 and the UE 1304 may be configured to communicate using narrowband communications (e.g., NB-IoT and/or eMTC). For example, the UE 1304 may be an NB-IoT device and/or an eMTC device.

In one aspect, the UE 1304 may determine 1301 to transmit an uplink transmission to the base station 1302. For example, the UE 1304 may determine 1301 to transmit the uplink transmission while in connected-mode. In another aspect, the UE 1304 may determine 1303 to transmit a scheduling request using one or more first allocated resources.

In a further aspect, the UE 1304 may determine 1305 that the one or more first allocated resources collide with M number of resources of one or more second allocated resources used to receive a physical downlink channel transmission from the base station 1302.

The UE 1304 may transmit the scheduling request 1307 using the one or more first allocated resources. The UE 1304 may receive the physical downlink channel transmission 1309 with M number of resources of the one or more second allocated resources punctured.

As an illustrative example, assume that the one or more first allocated resources collide with the first three (e.g., M=3) of ten resources used to receive the physical downlink channel transmission. Hence, the UE 1304 may receive the physical downlink channel transmission in the ten resources with the first three resources punctured.

Figure 14:
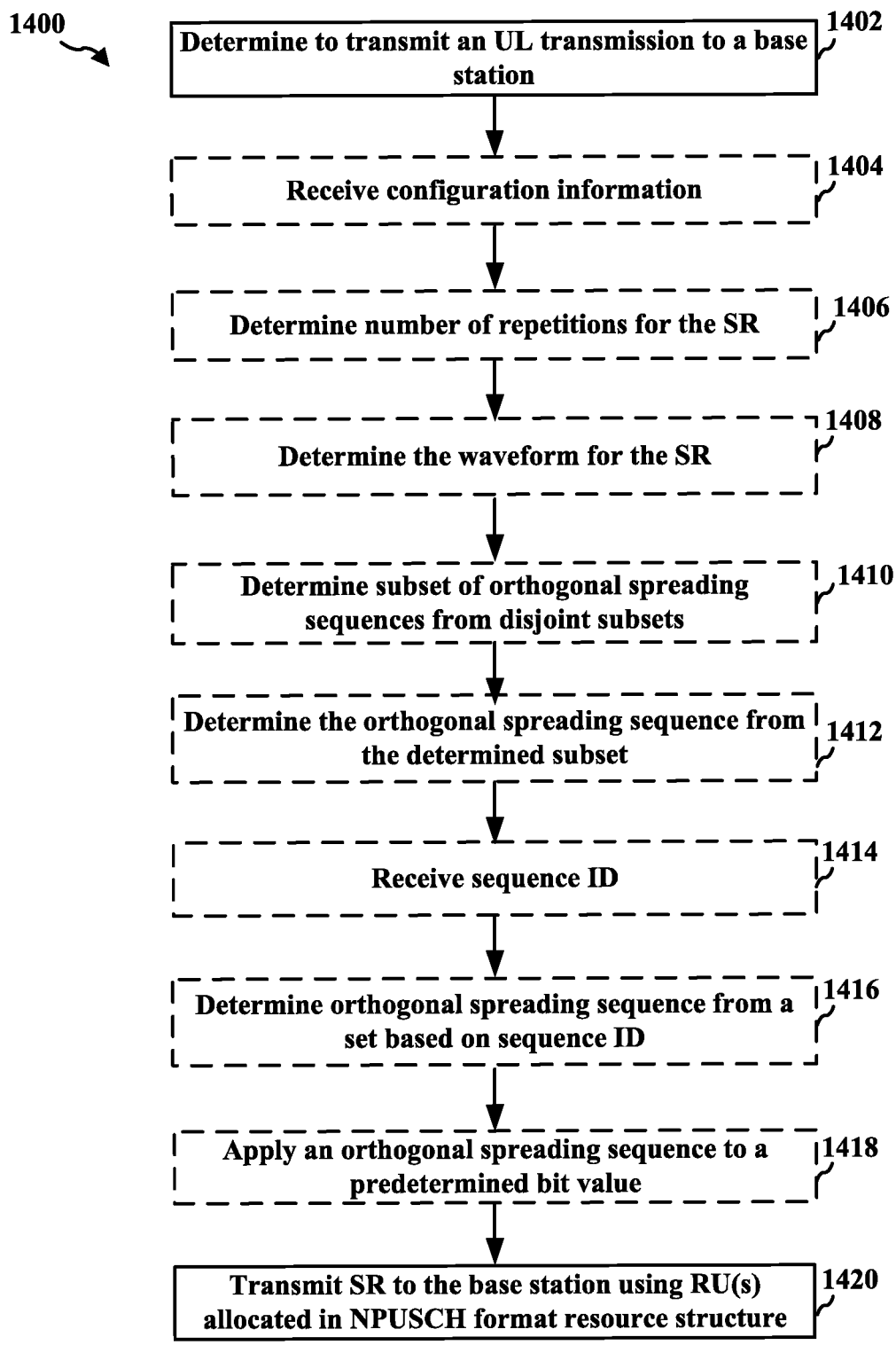
FIG. 14 is a flowchart of a method of wireless communication.

FIG. 14 is a flowchart 1400 of a method of wireless communication. The method may be performed by a UE (e.g., the UE 104, 350, 404, 504, 604, 704, 804, 904, 1004, 1104, 1204, 1304, the apparatus 1502/1502') wirelessly communicating with a base station (e.g., base station 102, 180, 402, 502, 602, 702, 802, 902, 1002, 1102, 1202, 1302, 1550, eNB 310). In FIG. 14, optional operations are indicated with dashed lines.

At 1402, the UE determines to transmit an uplink transmission to a base station. In order to transmit the uplink transmission, at 1420, the UE may transmit to the base station, a scheduling request for the uplink transmission using at least one RU allocated in a NPUSCH format resource structure, the RU including a single subcarrier and a first number of symbols in each of four slots in the NPUSCH format resource structure. The NPUSCH format resource structure may include an NPUSCH format 2 resource structure.

The UE may determine a number of repetitions for transmitting the scheduling request at 1406. The UE may receive configuration information at 1404, and the configuration information may include first information for determining the number of repetitions for transmitting the scheduling request. Thus, the UE may determine the number of repetitions at 1406 based on the configuration information received at 1404. In other aspects, the number of repetitions may be predefined. For example, the number of repetitions for transmitting the scheduling request may be determined based on predetermined information associated with the NPUSCH format resource structure, e.g., a repetition level of an NPUSCH format 2 resource structure.

The configuration information may further include second information indicating a waveform associated with the NPUSCH format resource structure for transmitting the scheduling request to the base station. At 1408, the UE may determine the waveform associated with the NPUSCH format resource structure for transmitting the scheduling request based on the second information.

The scheduling request may be transmitted using the allocated RU includes a predetermined bit value (e.g., a constant bit value). For example, a 1 or 0 may be input to the channel coding. The scheduling request may be transmitted at 1420 without a constellation mapping associated with the predetermined bit value. The scheduling request may be transmitted at 1420 with a multiplication of a unit-valued constant associated with the predetermined bit value. For example, scrambling may be performed as scrambling is performed as $y(n)=x(n) \cdot s(n)$, as described above.

The UE may apply an orthogonal spreading sequence to the predetermined bit value at 1418. For example, channel coding may be replaced by length-16 orthogonal spreading, e.g., one of 16 orthogonal sequences of length 16 may be used to sequentially fill the 16 data symbols in a resource unit. For example, the orthogonal spreading sequence may comprise a length-sixteen Walsh code or a Zadoff-Chu sequence. The first number of symbols may include four symbols in each of four slots allocated for the RU in the NPUSCH format resource structure, and the orthogonal spreading sequence, applied at 1418, may have a length of sixteen.

The RU allocated for the scheduling request may be only allocated to the UE. Thus, there may be only one UE per a time/frequency RU. The RU allocated for the scheduling request may also be allocated to a plurality of different UEs. The scheduling request may be allocated to sixteen or fewer different UEs. Thus, up to 16 UEs may be multiplexed in a given time and frequency resource allocation.

At 1416, the UE may determine the orthogonal spreading sequence from a set of orthogonal spreading sequences based on a sequence ID associated with the UE. The UE may receive signaling indicating the sequence ID from the base station at 1414. The sequence ID of a UE may be signaled, e.g., explicitly or implicitly by the base station, or may be determined based on a predefined formula based on UE ID. Thus, the sequence ID may be associated with a UE ID of the UE.

In another example, instead of a length-16 orthogonal sequence, an RU may be filled with one of the length-28 orthogonal sequences without DMRS. Thus, the first number of symbols may include seven symbols in each of four slots allocated for the RU in the NPUSCH format resource structure, and the orthogonal spreading sequence may have a length of twenty-eight. The orthogonal spreading sequence may comprise one of a length-twenty-eight Walsh code or a length-twenty-eight Zadoff-Chu sequence. Twenty-eight cyclic shifts may correspond to twenty-eight orthogonal spreading sequences in the length-twenty-eight Zadoff-Chu sequence.

Up to 28 UEs may be multiplexed in a given time/frequency resource allocation. Thus, the RU allocated for the scheduling request is allocated to twenty-eight or fewer different UEs.

Determining the orthogonal spreading sequence to apply at 1418 may include determining a subset of one or multiple orthogonal spreading sequences from a plurality of disjoint subsets partitioned from the total set orthogonal spreading sequences at 1410. At 1412, the UE may determine the orthogonal spreading sequence from the determined subset. For example, the 28 sequences may be divided into several groups, such as 4 groups with 7 sequences each. The group to be used may depend on cell ID, tone location, etc.

The subset of orthogonal spreading sequences may be determined based on at least one of a cell ID associated with the base station or a location of the single subcarrier in a frequency domain. The UE may receive signaling indicating the sequence ID within the subset from the base station, e.g., at 1414. As described in connection with the length-16 orthogonal spreading sequence, the sequence ID of a UE may be signaled, explicitly or implicitly, by the base station or may be determined based on a predefined formula based on UE ID. Thus, the UE may receive signaling indicating the sequence ID from the base station at 1414. The sequence ID may be associated with a UE ID of the UE. Thus, the sequence ID may be determined based on predetermined information.

A periodicity associated with the at least one RU allocated for the scheduling request may be associated with a repetition level for transmitting the scheduling request. Thus, the SR time resource may be defined periodically. A first duration of the periodicity associated with the at least one RU may be greater than a second duration associated with the at least one RU. The SR periodicity may depend on the SR repetition levels. A periodicity of a SR may be larger than the time duration of the SR. A cell-specific time offset or a UE-specific offset may be included in the periodicity associated with the at least one RU.

Figure 15:
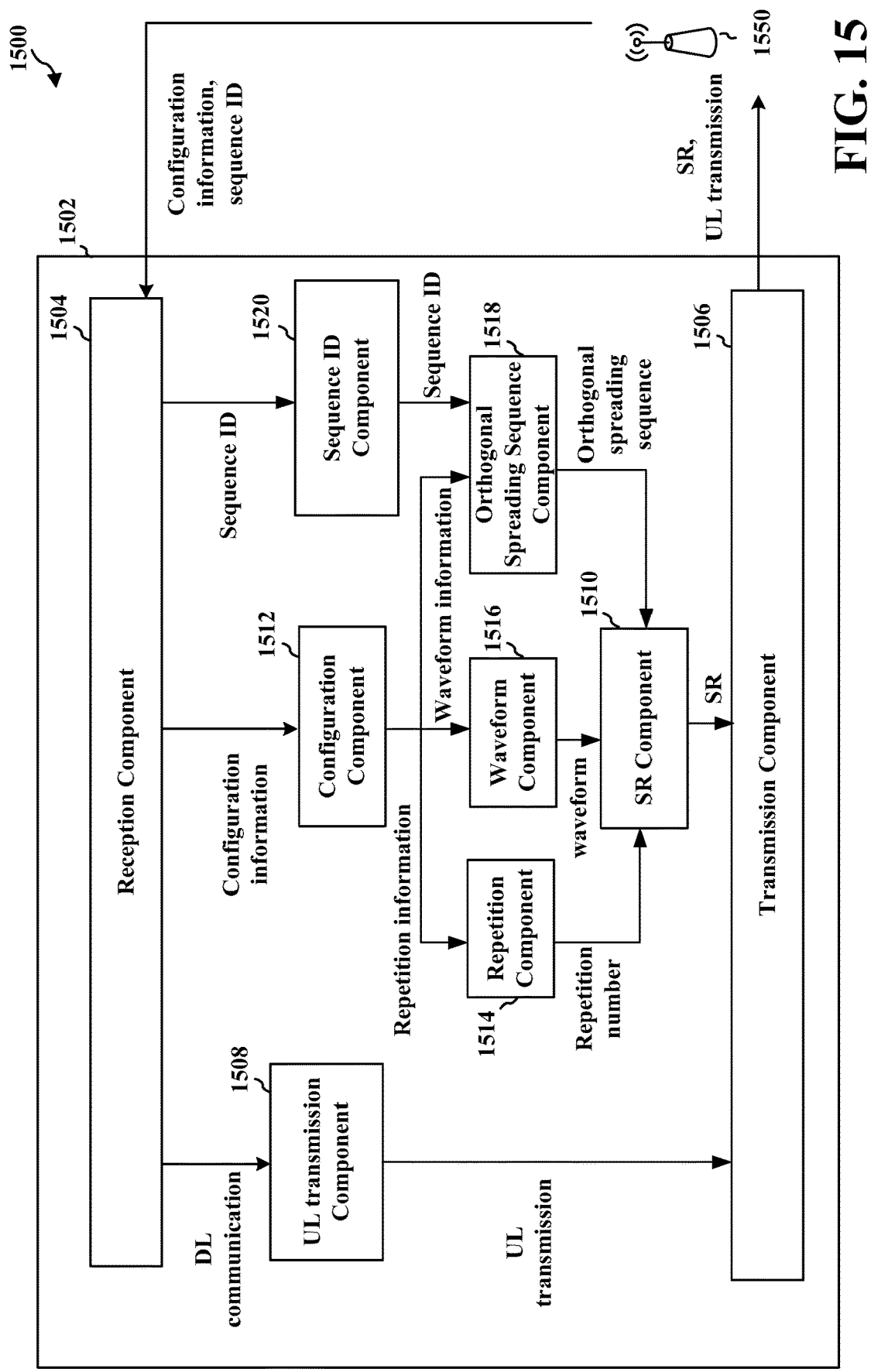
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE (e.g., the UE 104, 350, 404, 504, 604, 704, 804, 904, 1004, 1104, 1204, 1304, the apparatus 1502') wirelessly communicating with base station 1550 (e.g., base station 102, 180, 402, 502, 602, 702, 802, 902, 1002, 1102, 1202, 1302, eNB 310). The apparatus includes a reception component 1504 that receives DL communication from base station 1550, including configuration information and sequence ID information. The apparatus includes a transmission component 1506 that transmits UL communication to base station 1550, including SRs. The apparatus may comprise an UL transmission component 1508 configured to determine to transmit an uplink transmission to a base station, and an SR component 1510 configured to transmit, to the base station 1550, a scheduling request for the uplink transmission using at least one RU allocated in a NPUSCH format resource structure, the RU including a single subcarrier and a first number of symbols in each of four slots in the NPUSCH format resource structure. The apparatus may include a repetition component 1514 configured to determine a number of repetitions for transmitting the scheduling request, a waveform component 1516 configured to determine waveform associated with the NPUSCH format resource structure for transmitting the scheduling request based on the second information, and an orthogonal spreading sequence component 1518 configured to apply an orthogonal spreading sequence, e.g., to a predetermined bit value used to transmit the SR. The apparatus may comprise a configuration component 1512 configured to receive configuration information, e.g., including any of first information for determining the number of repetitions for transmitting the scheduling request, second information indicating a waveform associated with the NPUSCH format resource structure for transmitting the scheduling request to the base station, information for determining the orthogonal spreading sequence, etc. The orthogonal spreading sequence may be determined by the orthogonal spreading sequence component 1518 in any of a number of ways, e.g., by performing any of 1410, 1412, 1414, or 1416. The apparatus may include a sequence ID component 1520 configured to receive signaling indicating a sequence ID for the UE from the base station 1550. The sequence ID component 1520 may provide the sequence ID information to the orthogonal spreading sequence component 1518 for use in determining the orthogonal spreading sequence to be applied as part of transmitting the SR.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
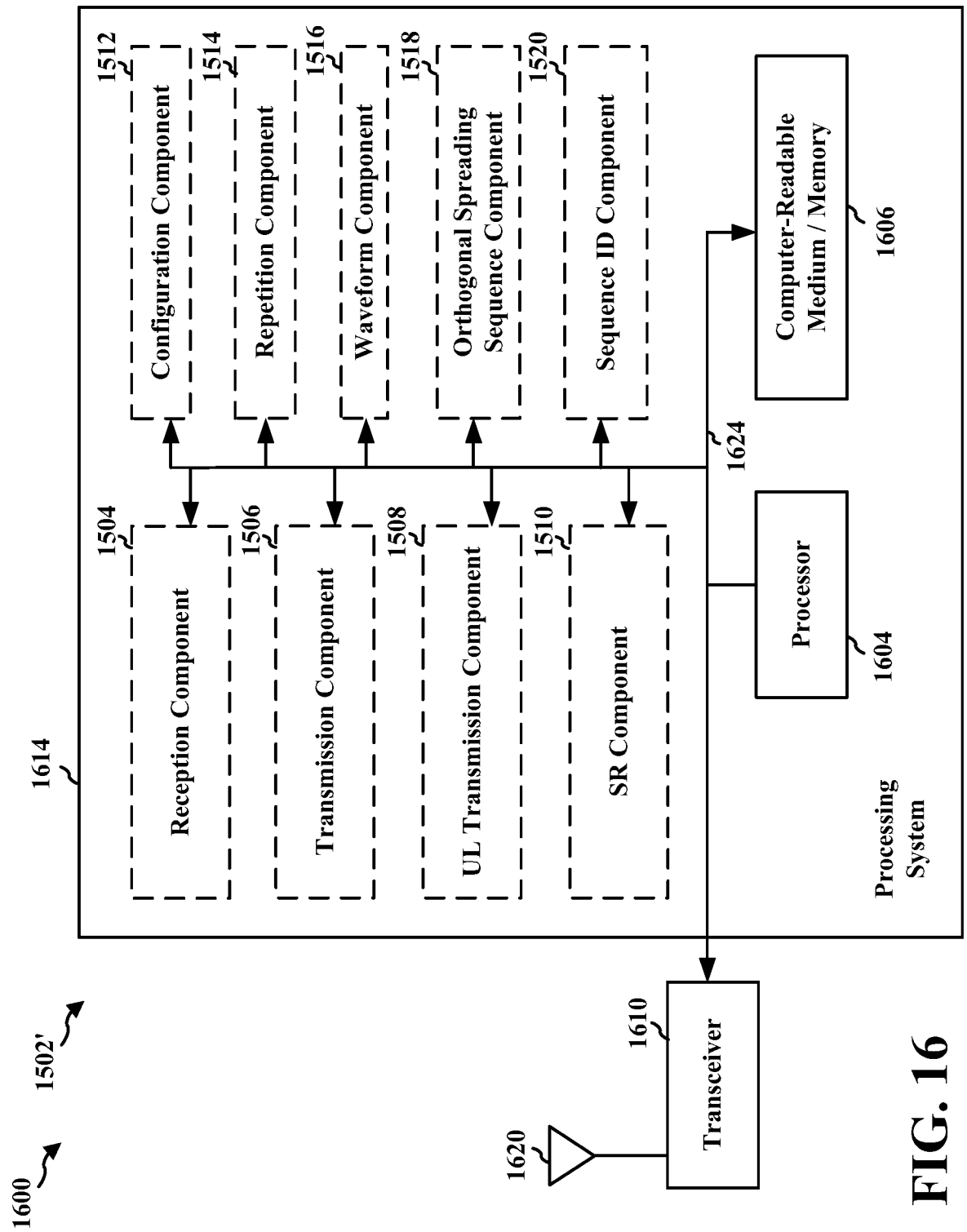
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, 1518, 1520, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described above for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516, 1518, 1520. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for determining to transmit an uplink transmission to a base station, means for transmitting, to the base station, a scheduling request for the uplink transmission using at least one RU allocated in an NPUSCH format resource structure, the RU including a single subcarrier and a first number of symbols in each of four slots in the NPUSCH format resource structure, means for determining a number of repetitions for transmitting the scheduling request, means for receiving configuration information, means for determining the waveform associated with the NPUSCH format resource structure for transmitting the scheduling request based on the second information, means for applying an orthogonal spreading sequence to the predetermined bit value, means for determining the orthogonal spreading sequence from a set of orthogonal spreading sequences based on a sequence ID associated with the UE, means for receiving signaling indicating the sequence ID from the base station, means for determining a subset of one or multiple orthogonal spreading sequences from a plurality of disjoint subsets partitioned from the total set orthogonal spreading sequences, and means for determining the orthogonal spreading sequence from the determined subset. The aforementioned means may be one or more of the aforementioned components of the apparatus 1502 and/or the processing system 1614 of the apparatus 1502' configured to perform the functions recited by the aforementioned means. As described above, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
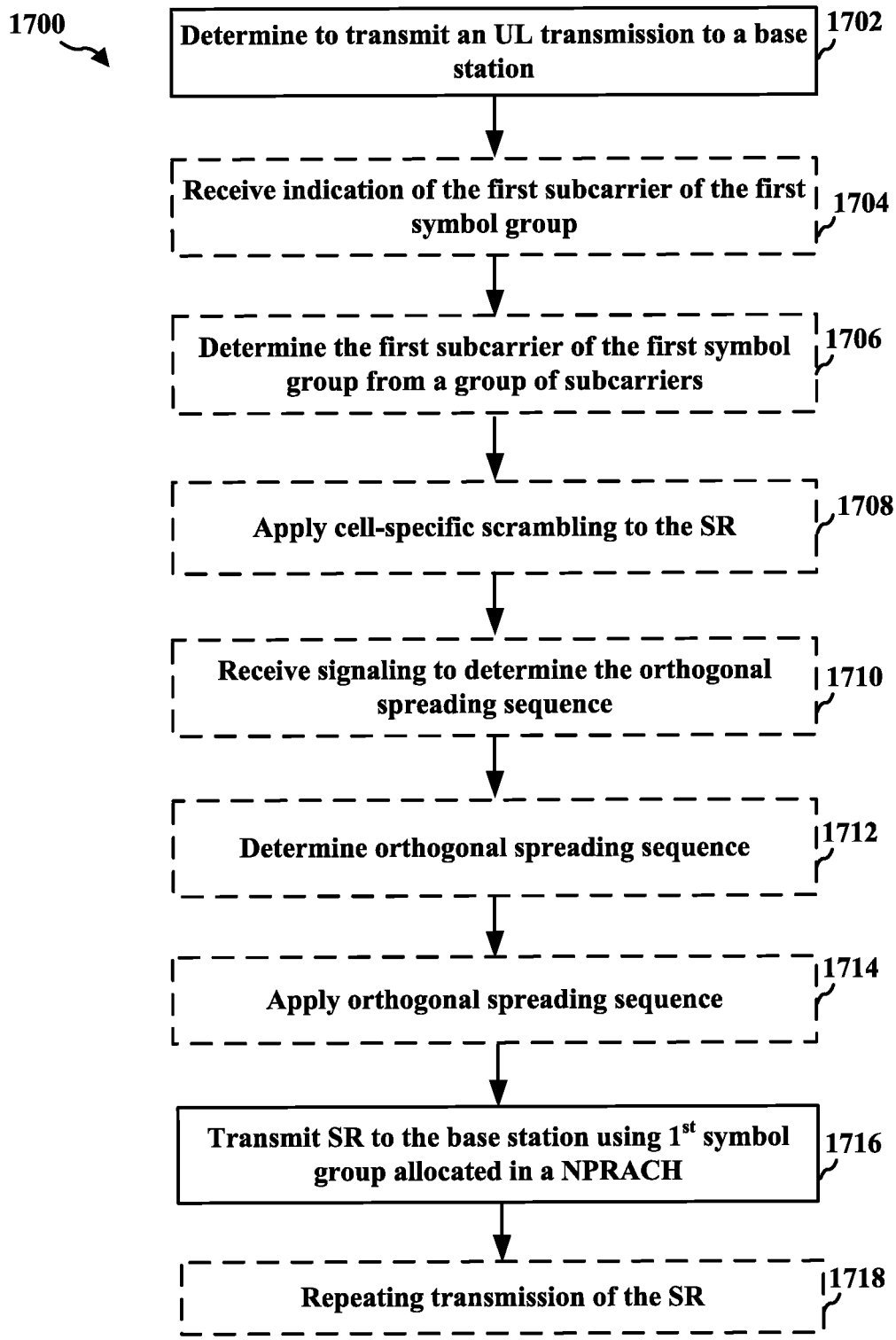
FIG. 17 is a flowchart of a method of wireless communication.

FIG. 17 is a flowchart 1700 of a method of wireless communication. The method may be performed by a UE (e.g., the UE 104, 350, 404, 504, 604, 704, 804, 904, 1004, 1104, 1204, 1304, the apparatus 1802/1802') wirelessly communicating with a base station (e.g., base station 102, 180, 402, 502, 602, 702, 802, 902, 1002, 1102, 1202, 1302, 1850, eNB 310). In FIG. 17, optional operations are indicated with dashed lines.

At 1702, the UE determines to transmit an uplink transmission to a base station. At 1716, the UE transmits, to the base station, a scheduling request for the uplink transmission using a first symbol group allocated in an NPRACH the first symbol group including a first number of symbols in a first subcarrier. The first subcarrier may have a subcarrier spacing of 3.75 kHz, for example, and may comprise four symbol groups per repetition.

At 1718, the UE may repeat a transmission of the scheduling request. The UE may repeat the transmission of the scheduling request, e.g., using a second symbol group, a third symbol group, and a fourth symbol group allocated in the NPRACH, wherein each of the three symbol groups includes a second number of symbols, and the second number of symbols being equal to the first number of symbols. The second symbol group, the third symbol group, and the fourth symbol group may be in the first subcarrier of the first symbol group. The four symbol groups may be in different subcarriers.

At 1714, the UE may apply an orthogonal spreading sequence to symbol groups or to symbols within the four symbol groups. Each of the four symbol groups may be associated with one data sample of a spreading sequence. For example, each symbol may carry, e.g., be associated with, a number in a spreading sequence. There may be 5 symbols per symbol group. Four symbol groups together may form a repetition, e.g., a minimal time unit. The four symbol groups in a repetition may carry different data. The orthogonal spreading sequence may include a length-four Walsh code, e.g., and the UE may use one of the four length-4 orthogonal sequences to modulate the four symbol groups, respectively. The four symbol groups allocated for the scheduling request may be allocated to four or fewer different UEs so that up to four UEs may be multiplexed in one tone. Each symbol in the four symbol groups may be associated with one data sample of a spreading sequence. The orthogonal spreading sequence may include a length-twenty Walsh code. The four symbol groups allocated for the scheduling request may be allocated to twenty or fewer different UEs.

At 1712, the UE may determine the orthogonal spreading sequence from a group of orthogonal spreading sequences.

At 1710, the UE may receive signaling from the base station indicating the orthogonal spreading sequence, the signaling being used to determine the orthogonal spreading sequence. Thus, the determination at 1712 may be based on the signaling received at 1710. A sequence ID and/or subcarrier ID may be signaled, explicitly or implicitly, by a base station, or predefined based on UE ID. Thus, rather than using signaling received at 1710, the orthogonal spreading sequence may also be determined based on a UE ID associated with the UE.

At 1706, the UE may determine the first subcarrier of the first symbol group from a group of subcarriers.

At 1704, the UE may receive signaling from the base station indicating the first subcarrier of the first symbol group, the signaling being used to determine the first subcarrier. Thus, the determination at 1706 may be based on the signaling received at 1704. In another example, the first subcarrier may be determined based on a UE ID associated with the UE. A subcarrier ID may be signaled, explicitly or implicitly, by eNB, or predefined based on UE ID.

At 1708, the UE may apply cell-specific scrambling to the scheduling request prior to transmission.

The transmission of the scheduling request may be repeated, e.g., at 1718, using a predetermined number of symbol groups. The predetermined number of symbol groups may be based on an NPRACH repetition level or an NPUSCH format 2 repetition level.

A periodicity associated with symbol groups allocated for the scheduling request may be based on a repetition level for transmitting the scheduling request. A first duration of the periodicity associated with the symbol groups may be greater than a second duration associated with the first symbol group. A cell-specific time offset or a UE-specific offset may be included in the periodicity associated with the symbol groups.

Figure 18:
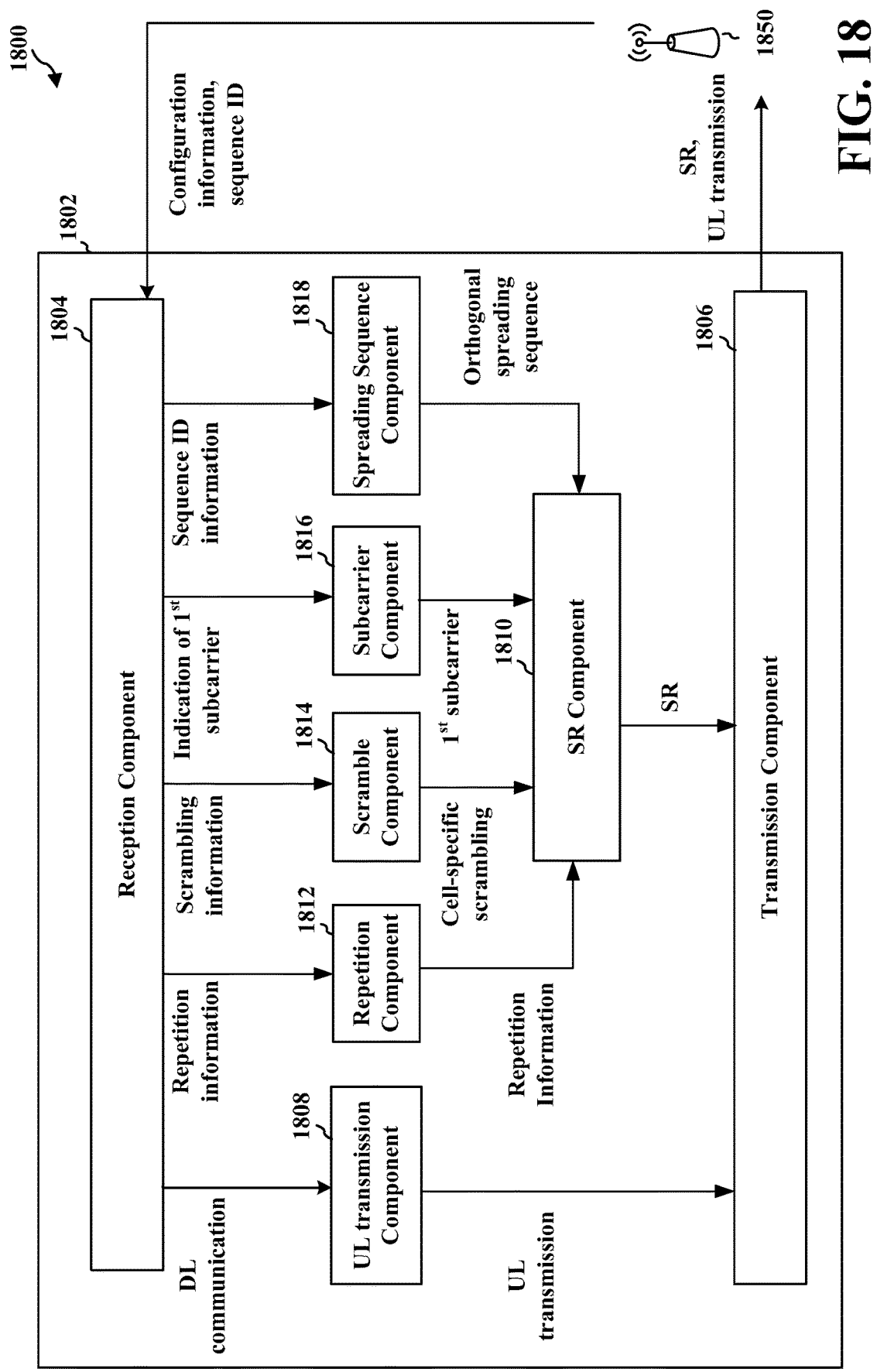
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a UE (e.g., the UE 104, 350, 404, 504, 604, 704, 804, 904, 1004, 1104, 1204, 1304, the apparatus 1802') wirelessly communicating with a base station 1850 (e.g., base station 102, 180, 402, 502, 602, 702, 802, 902, 1002, 1102, 1202, 1302, eNB 310). The apparatus includes a reception component 1804 that receives DL communication including signaling information for an SR from base station 1850. The apparatus includes a transmission component 1806 for transmitting UL communication with base station 1850, including an SR and an UL transmission. The apparatus may include an UL transmission component 1808 configured to determine to transmit an uplink transmission to a base station and an SR component 1810 configured to transmit, to the base station 1850 via transmission component 1806, a scheduling request for the uplink transmission using a first symbol group allocated in an NPRACH, the first symbol group including a first number of symbols in a first subcarrier.

The apparatus may include a repetition component 1812 configured to repeat a transmission of the scheduling request, e.g., using a second symbol group, a third symbol group, and a fourth symbol group allocated in the NPRACH. The apparatus may include a scramble component 1814 configured to apply cell-specific scrambling to the scheduling request prior to transmission. The apparatus may include a subcarrier component 1816 configured to determine the first subcarrier of the first symbol group from a group of subcarriers. The apparatus may include a spreading sequence component 1818 configured to apply an orthogonal spreading sequence to symbol groups or to symbols within the four symbol groups.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
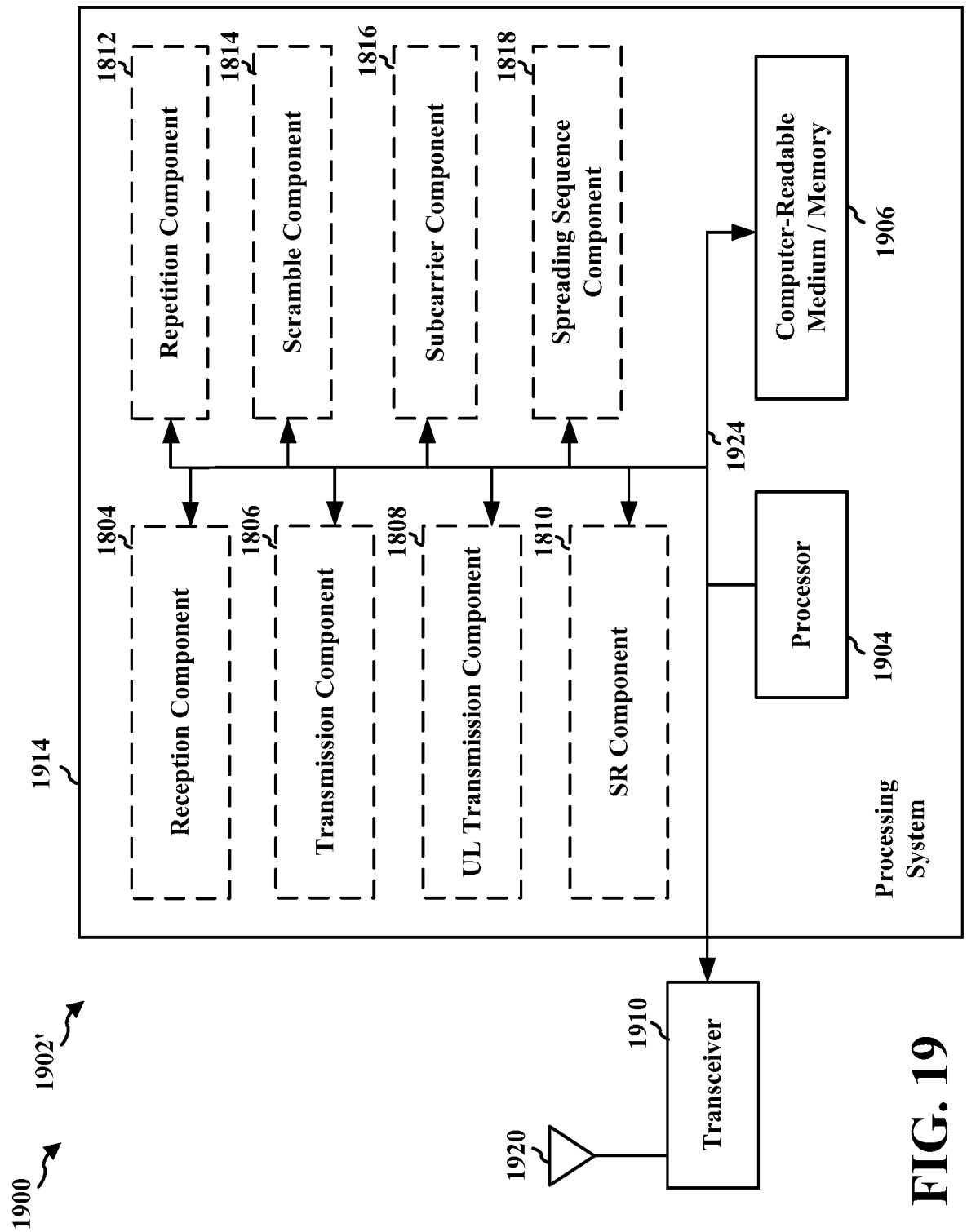
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, 1818, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described above for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, 1818. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359.

In one configuration, the apparatus 1802/1802' for wireless communication includes means for determining to transmit an uplink transmission to a base station, e.g., 1808, means for transmitting, to the base station, a scheduling request for the uplink transmission using a first symbol group allocated in an NPRACH, the first symbol group including a first number of symbols in a first subcarrier, means for repeating a transmission of the scheduling request using a second symbol group, a third symbol group, and a fourth symbol group allocated in the NPRACH, means for applying an orthogonal spreading sequence to symbol groups or to symbols within the four symbol groups, means for applying cell-specific scrambling to the scheduling request prior to transmission, and means for determining the first subcarrier of the first symbol group from a group of subcarriers. The aforementioned means may be one or more of the aforementioned components of the apparatus 1802 and/or the processing system 1914 of the apparatus 1802' configured to perform the functions recited by the aforementioned means. As described above, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
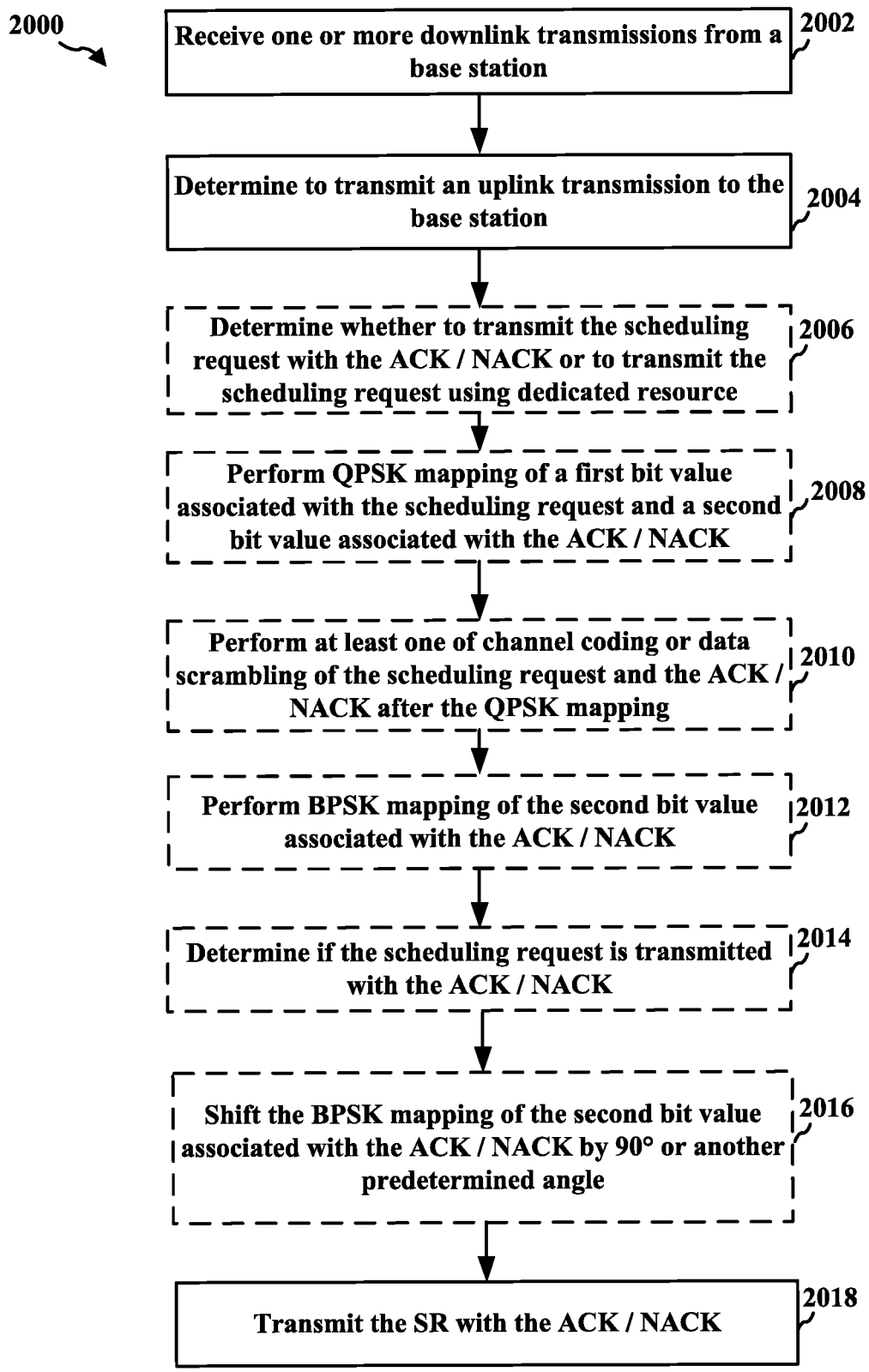
FIG. 20 is a flowchart of a method of wireless communication.

FIG. 20 is a flowchart 2000 of a method of wireless communication. The method may be performed by a UE (e.g., the UE 104, 350, 404, 504, 604, 704, 804, 904, 1004, 1104, 1204, 1304, the apparatus 2102/2102') wirelessly communicating with a base station (e.g., base station 102, 180, 402, 502, 602, 702, 802, 902, 1002, 1102, 1202, 1302, 1850, eNB 310). In FIG. 20, optional operations are indicated with dashed lines.

At 2002, the UE may receive one or more downlink transmissions from a base station.

For example, referring to FIG. 6A, the UE 604 may receive one or more downlink transmissions 601 from the base station 602. For example, the downlink transmissions 601 may include NPDCCH transmissions and/or NPDSCH transmissions.

At 2004, the UE may determine to transmit an uplink transmission to the base station. For example, referring to FIG. 6A, the UE 604 may determine 603 to transmit an uplink transmission to the base station 602. For example, the UE 604 may determine 603 to transmit the uplink transmission while the UE 604 is in connected-mode.

At 2006, the UE may determine whether to transmit the scheduling request with the ACK/NACK or to transmit the scheduling request using dedicated resource. For example, referring to FIG. 6A, the UE 604 may determine 607 whether to transmit the scheduling request with the ACK/NACK when the first signaling 605 is received. For example, the UE 604 may determine 607 to transmit the scheduling request for the uplink transmission with the ACK/NACK associated with the one or more downlink transmissions after the first signaling 605 is received and a counter at the UE 604 reaches a threshold number. In one configuration, information associated with the threshold number may be included in the first signaling 605. In another configuration, information associated with the threshold number may be preconfigured at the UE 604. The base station 602 may reset the counter at the UE 604 at any time. When the base station 602 resets the counter to a specific value (e.g., signaling not illustrated in FIGS. 6A-6C may be used by the base station 602 to indicate to the UE 604 that the counter has been reset), the UE 604 may determine to not transmit scheduling request(s) with ACK/NACK transmissions. In addition, the UE 604 may increment the counter by a predetermined number (e.g., "1") whenever an ACK/NACK is transmitted without a scheduling request and reset to an initial value (e.g., "0") whenever a scheduling request is appended to an ACK/NACK. In addition, the UE 604 may determine to not transmit scheduling request(s) with ACK/NACK transmissions when a downlink transmission has not been received within a threshold period (e.g., when a timer at the UE 604 expires). In another aspect, the UE 604 may receive first signaling 605 from the base station 602 that configures the UE 604 to transmit a scheduling request for the uplink transmission with an ACK/NACK associated with the one or more downlink transmissions 601. For example, the first signaling 605 may configure the UE 604 to append (e.g., piggyback) the scheduling request to an ACK/NACK transmission associated with the one or more downlink transmissions 601. In one configuration, the UE 604 may receive the first signaling 605 in a MAC command or RRC reconfiguration signaling. In one aspect, any dedicated scheduling request resources (e.g., in NPUSCH format 2 or NPRACH) may be release (e.g., no longer allocated to UE 604) when the first signal 605 is received by the UE 604. In certain configurations, the first signaling 605 or different signaling (e.g., not illustrated in FIGS. 6A-6C) may be used configure an increase in a first number of repeated transmissions of the scheduling request transmitted by the UE 604.

At 2008, the UE may perform QPSK mapping of a first bit value associated with the scheduling request and a second bit value associated with the ACK/NACK. For example, referring to FIG. 6B, the UE 604 may perform 609 QPSK mapping of a first bit value associated with the scheduling request and a second bit value associated with the ACK/NACK.

At 2010, the UE may perform at least one of channel coding or data scrambling of the scheduling request and the ACK/NACK after the QPSK mapping. For example, referring to FIG. 6B, in a first scenario in which the repetition level of the scheduling request is not increased, a predetermined number of bit(s) associated with ACK/NACK (e.g., 1 bit) and a predetermined number of bit(s) associated with the scheduling request (e.g., 1 bit) may be mapped together onto a QPSK constellation before the UE 604 may perform 611 at least one of channel coding or data scrambling of the scheduling request and the ACK/NACK.

At 2012, the UE may perform BPSK mapping of the second bit value associated with the ACK/NACK. For example, referring to FIG. 6B, the UE 604 may perform 613 BPSK mapping of the second bit value associated with the ACK/NACK.

At 2014, the UE may determine if the scheduling request is transmitted with the ACK/NACK. For example, referring to FIG. 6C, the UE may determine 615 if the scheduling request is transmitted with the ACK/NACK.

At 2016, the UE may shift the BPSK mapping of the second bit value associated with the ACK/NACK by 90° or another predetermined angle. For example, referring to FIG. 6C, when it is determined that the scheduling request is transmitted with the ACK/NACK, the UE 604 may shift 617 the BPSK mapping of the second bit value associated with the ACK/NACK by 90° or any other predetermined angle.

At 2018, the UE may transmit the SR with the ACK/NACK. For example, referring to FIG. 6C, the UE 604 may transmit the scheduling request 619 for the uplink transmission with the ACK/NACK associated with the one or more downlink transmissions using a NPUSCH format resource structure (e.g., NPUSCH format 2 resource structure). In a second scenario in which the repetition level of the scheduling request is increased, the UE 604 may use the QPSK constellation described above. Alternatively, the UE 604 may transmit the scheduling request 619 with the ACK/NACK a multiple times (e.g., a second number of transmissions). In one aspect, the second number of transmissions may be associated with a number of repetitions for the NPUSCH format resource structure. Further, the UE 604 may transmit the scheduling request 619 using allocated resources without the ACK/NACK a third number of transmissions. For example, the third number of transmissions of the scheduling request may be sent using the NPUSCH format 2 resource structure 440 described above and illustrated in FIG. 4C. In one aspect, the third number of transmissions may be the difference between the first number of repeated transmissions and the second number of transmissions associated with the NPUSCH format resource structure.

Figure 21:
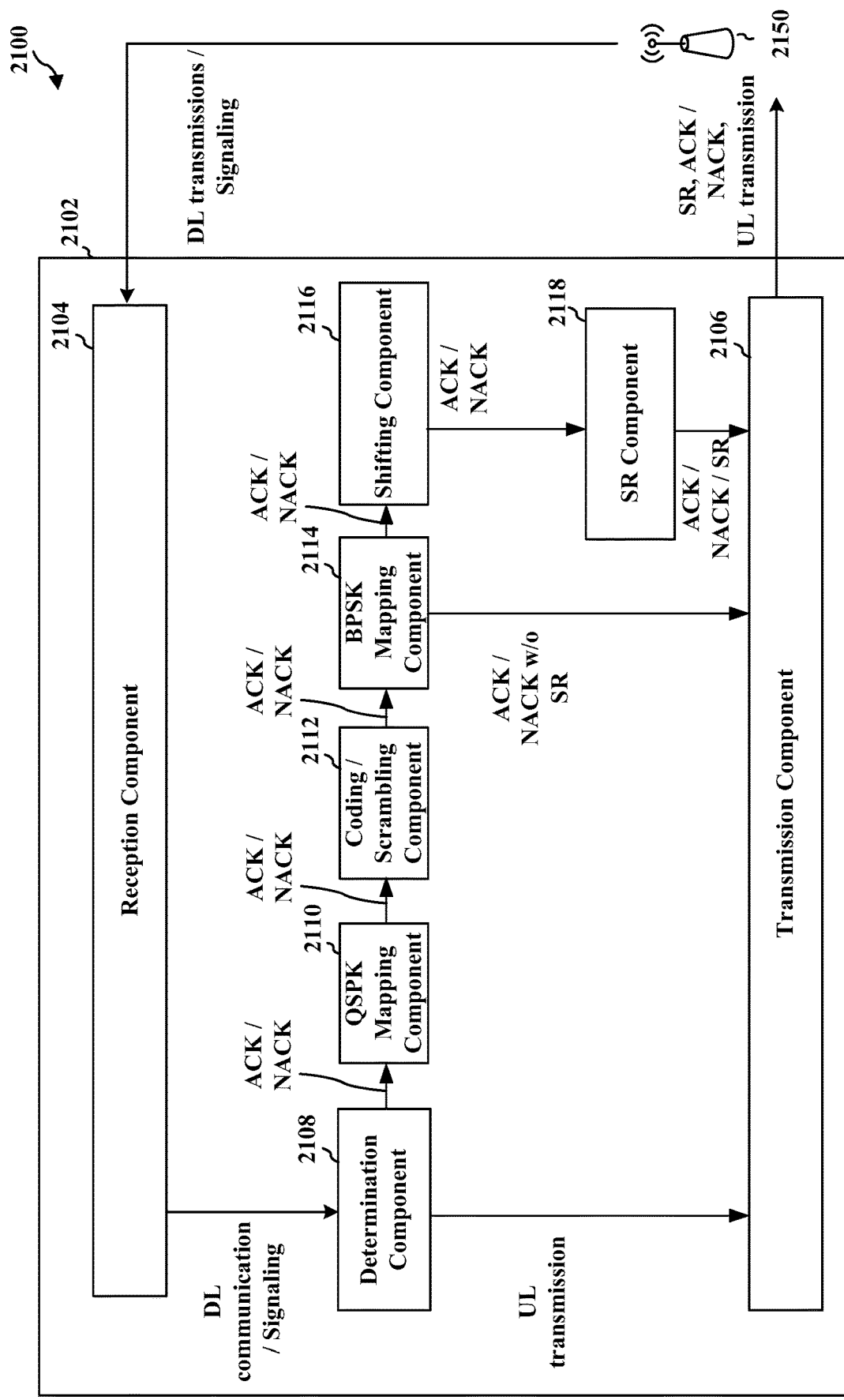
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a UE (e.g., the UE 104, 350, 404, 504, 604, 704, 804, 904, 1004, 1104, 1204, 1304, the apparatus 2102') wirelessly communicating with a base station 2150 (e.g., base station 102, 180, 402, 502, 602, 702, 802, 902, 1002, 1102, 1202, 1302, eNB 310). The apparatus includes a reception component 2104 that receives DL communication from base station 2150 including signaling information for an SR. The apparatus includes a transmission component 2106 configured to transmit UL communication with base station 2150, including an SR and an UL transmission. The apparatus may include determination component 2108 configured to determine to transmit an uplink transmission to a base station and/or to determine whether to transmit the scheduling request with the ACK/NACK or to transmit the scheduling request using dedicated resource. The apparatus may include an SR component 2118 configured to transmit, to the base station 2150 via transmission component 2106, a scheduling request for the uplink transmission that may be appended with an ACK/NACK transmission (e.g., in an NPUSCH format 2 resource structure) associated with the DL communication.

The apparatus may include a QSPK mapping component 2110 configured to perform QPSK mapping of a first bit value associated with the scheduling request and a second bit value associated with the ACK/NACK. The apparatus may include a coding/scrambling component 2112 configured to perform at least one of channel coding or data scrambling of the scheduling request and the ACK/NACK after the QPSK mapping. The apparatus may include a BPSK mapping component 2114 configured to perform BPSK mapping of the second bit value associated with the ACK/NACK. The apparatus may include a shifting component 2116 configured to shift the BPSK mapping of the second bit value associated with the ACK/NACK by 90° or another predetermined angle.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
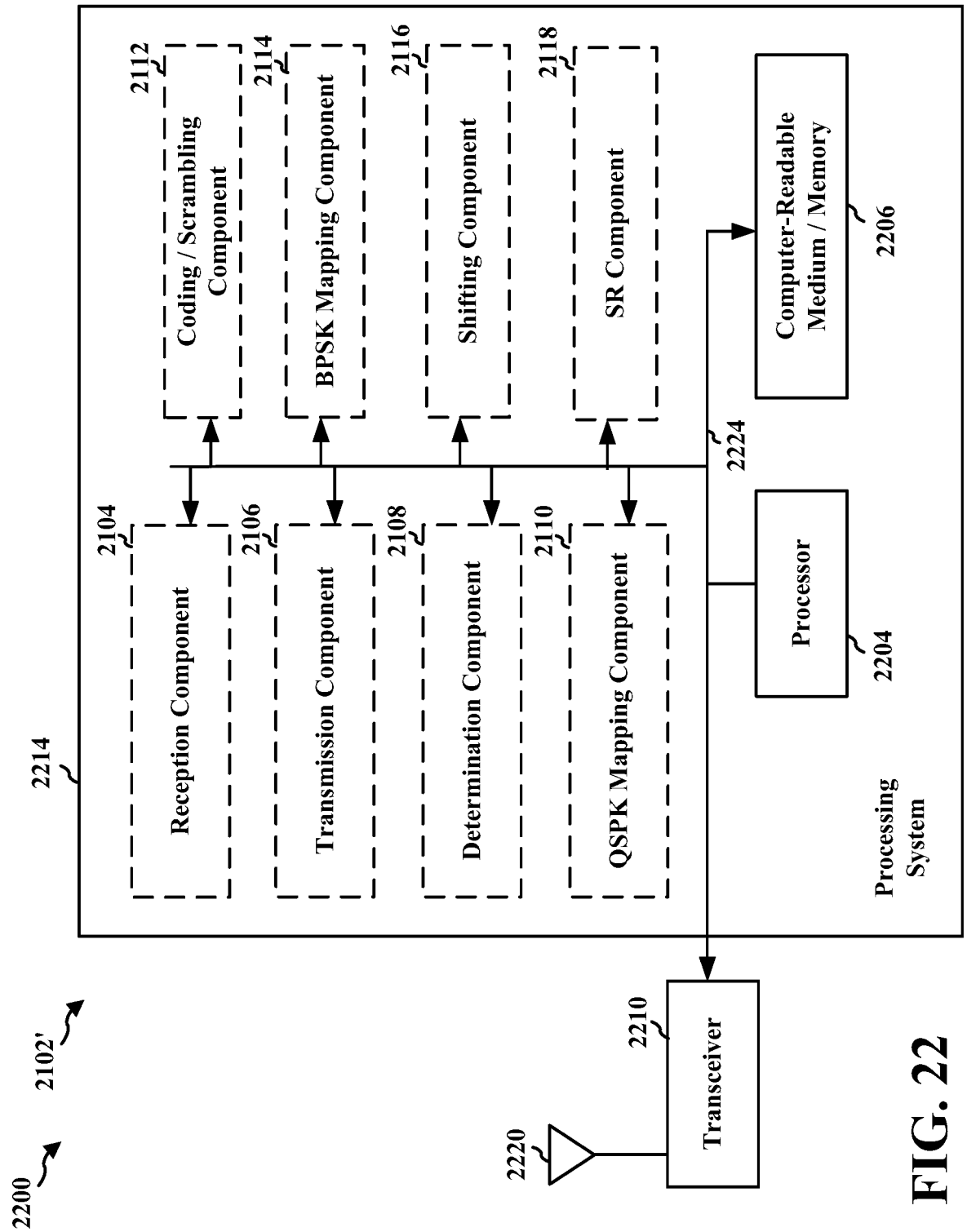
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, 2114, 2116, 2118 and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described above for any particular apparatus. The computer-readable medium/memory 2206 may also be used for storing data that is manipulated by the processor 2204 when executing software. The processing system 2214 further includes at least one of the components 2104, 2106, 2108, 2110, 2112, 2114, 2116, 2118. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359.

In one configuration, the apparatus 2102/2102' for wireless communication may include means for receiving one or more downlink transmissions from a base station. In another configuration, the apparatus 2102/2102' for wireless communication may include means for determining to transmit an uplink transmission to the base station. In a further configuration, the apparatus 2102/2102' for wireless communication may include means for determining whether to transmit the scheduling request with the ACK/NACK or to transmit the scheduling request using dedicated resource. In one configuration, the apparatus 2102/2102' for wireless communication may include means for performing QPSK mapping of a first bit value associated with the scheduling request and a second bit value associated with the ACK/NACK. In another configuration, the apparatus 2102/2102' for wireless communication may include means for performing at least one of channel coding or data scrambling of the scheduling request and the ACK/NACK after the QPSK mapping. In a further configuration, the apparatus 2102/2102' for wireless communication may include means for performing BPSK mapping of the second bit value associated with the ACK/NACK. In one configuration, the apparatus 2102/2102' for wireless communication may include means for determining if the scheduling request is transmitted with the ACK/NACK. In another configuration, the apparatus 2102/2102' for wireless communication may include means for shifting the BPSK mapping of the second bit value associated with the ACK/NACK by 90° or another predetermined angle. In a further configuration, the apparatus 2102/2102' for wireless communication may include means for transmitting the SR with the ACK/NACK. The aforementioned means may be one or more of the aforementioned components of the apparatus 2102 and/or the processing system 2214 of the apparatus 2102' configured to perform the functions recited by the aforementioned means. As described above, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
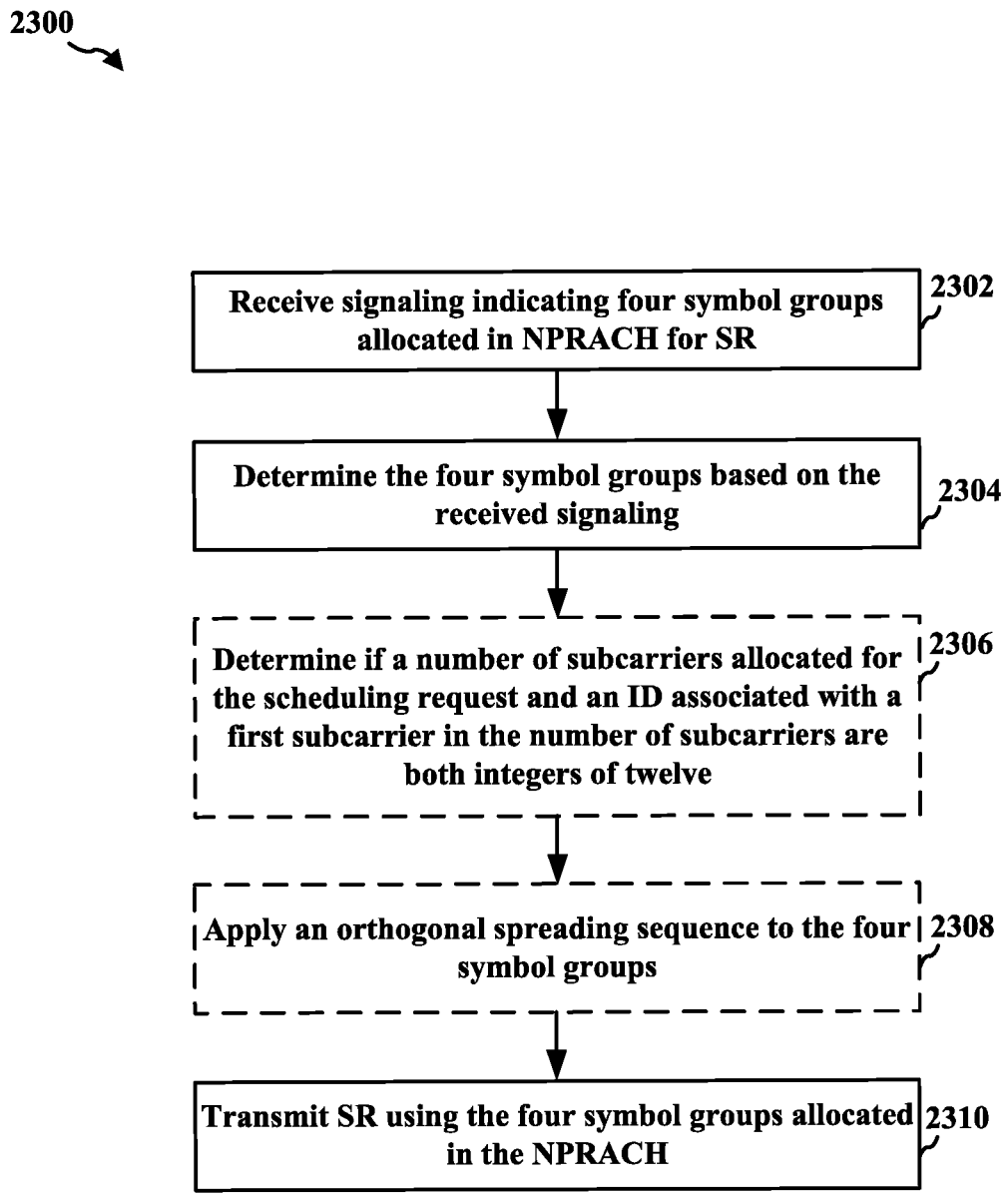
FIG. 23 is a flowchart of a method of wireless communication.

FIG. 23 is a flowchart 2300 of a method of wireless communication. The method may be performed by a UE (e.g., the UE 104, 350, 404, 504, 604, 704, 804, 904, 1004, 1104, 1204, 1304, the apparatus 2402/2402') wirelessly communicating with a base station (e.g., base station 102, 180, 402, 502, 602, 702, 802, 902, 1002, 1102, 1202, 1302, 2450, eNB 310). In FIG. 23, optional operations are indicated with dashed lines.

At 2302, the UE may receive signaling indicating four symbol groups allocated in NPRACH for SR. For example, referring to FIG. 7, the UE 704 may receive signaling 701 from the base station 702 that the UE 704 indicating four symbol groups allocated in an NPRACH for a scheduling request. For example, the scheduling request may use part or all of reserved NPRACH starting subcarriers.

At 2304, the UE may determine the four symbol groups based on the received signaling. For example, referring to FIG. 7, the UE 704 may determine 703 the four symbol groups allocated in an NPRACH for the scheduling request based on the received signaling 701.

At 2306, the UE may determine if a number of subcarriers allocated for the scheduling request and an ID associated with a first subcarrier in the number of subcarriers are both integers of twelve. For example, referring to FIG. 7, the UE 704 may determine 705 if a number of subcarriers allocated for the scheduling request and an ID associated with a first subcarrier in the number of subcarriers are both integers of twelve. In one aspect, each of the four symbol groups may be located in a same subcarrier when the number of subcarriers and the ID associated with the first subcarrier are both integers of twelve (e.g., see FIG. 5C). In another aspect, the scheduling request may be transmitted using a frequency hopping pattern between each of the four symbol groups when one or more of the number of subcarriers or the ID associated with the subcarrier are not an integer of twelve (e.g., see FIG. 5D).

At 2308, the UE may apply an orthogonal sequence to each of the four symbol groups. For example, referring to FIG. 7, the UE 704 may apply 707 an orthogonal spreading sequence to the four symbol groups. For example, the orthogonal spreading sequence may be applied but with less multiplexing gain.

At 2310, the UE may transmit the scheduling request using the four symbol groups allocated in the NPRACH. For example, referring to FIG. 7, the UE 704 may transmit the scheduling request 709 using the four symbol groups allocated in the NPRACH. In addition, the scheduling request may be retransmitted in each of the four symbol groups allocated in the NPRACH.

Figure 24:
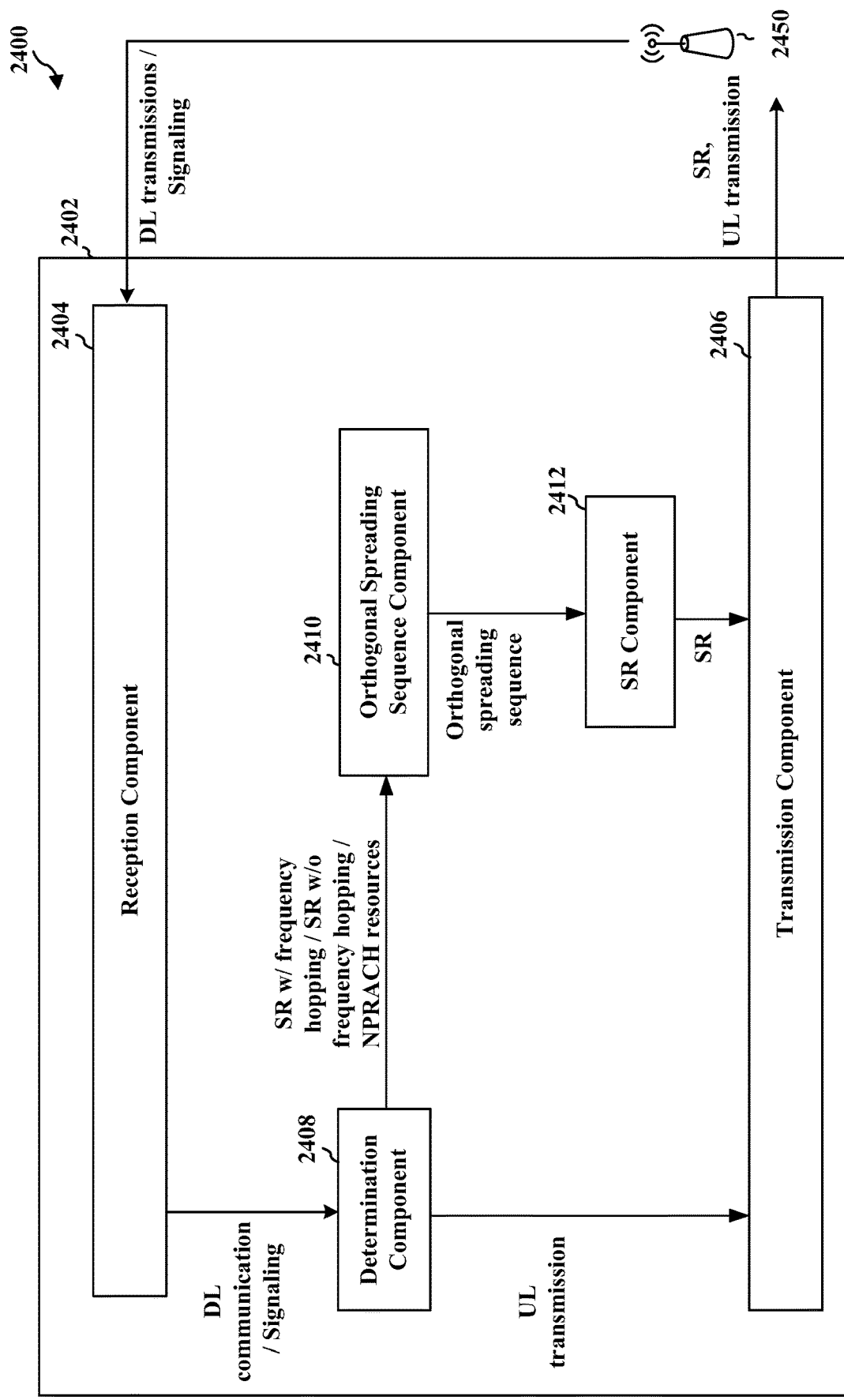
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus may be a UE (e.g., the UE 104, 350, 404, 504, 604, 704, 804, 904, 1004, 1104, 1204, 1304, the apparatus 2402') wirelessly communicating with a base station 2450 (e.g., base station 102, 180, 402, 502, 602, 702, 802, 902, 1002, 1102, 1202, 1302, eNB 310). The apparatus may include a reception component 2404 configured to receive DL communication from base station 2450 including signaling information for an SR. The apparatus may include a transmission component 2406 configured to UL communication with base station 2450, including an SR and an UL transmission. The apparatus may include an SR component 2412 configured to send an SR to the transmission component 2406. The apparatus may include determination component 2408 configured to determine the four symbol groups based on the received signaling. In addition, the determination component 2408 be configured to determine if a number of subcarriers allocated for the scheduling request and an ID associated with a first subcarrier in the number of subcarriers are both integers of twelve. Further, the apparatus may include an orthogonal spreading sequence component 2410 configured to apply an orthogonal spreading sequence to the four symbol groups.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
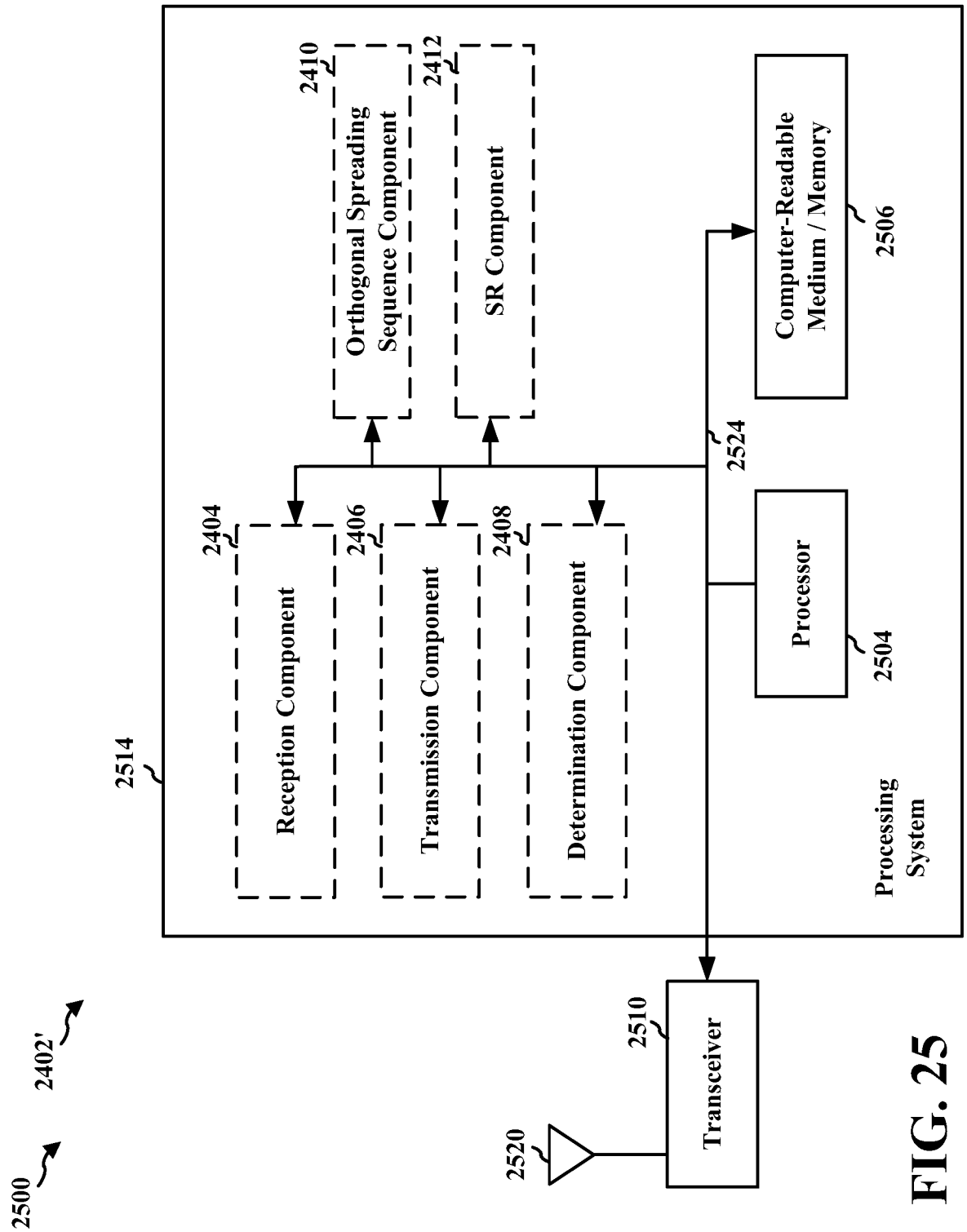
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410, 2412 and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2406, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described above for any particular apparatus. The computer-readable medium/memory 2506 may also be used for storing data that is manipulated by the processor 2504 when executing software. The processing system 2514 further includes at least one of the components 2404, 2406, 2408, 2410, 2412. The components may be software components running in the processor 2504, resident/stored in the computer readable medium/memory 2506, one or more hardware components coupled to the processor 2504, or some combination thereof. The processing system 2514 may be a component of the UE 350 and may include the memory 360 and/or at least one of the TX processor 368, the RX processor 356, and the controller/processor 359.

In one configuration, the apparatus 2402/2402' for wireless communication may include means for receiving signaling indicating four symbol groups allocated in NPRACH for SR. In another configuration, the apparatus 2402/2402' for wireless communication may include means for determining the four symbol groups based on the received signaling. In a further configuration, the apparatus 2402/2402' for wireless communication may include means for determining if a number of subcarriers allocated for the scheduling request and an ID associated with a first subcarrier in the number of subcarriers are both integers of twelve. In one configuration, the apparatus 2402/2402' for wireless communication may include means for applying an orthogonal spreading sequence to the four symbol groups. In another configuration, the apparatus 2402/2402' for wireless communication may include means for transmitting the scheduling request using the four symbol groups allocated in the NPRACH. The aforementioned means may be one or more of the aforementioned components of the apparatus 2402 and/or the processing system 2514 of the apparatus 2402' configured to perform the functions recited by the aforementioned means. As described above, the processing system 2514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 26:
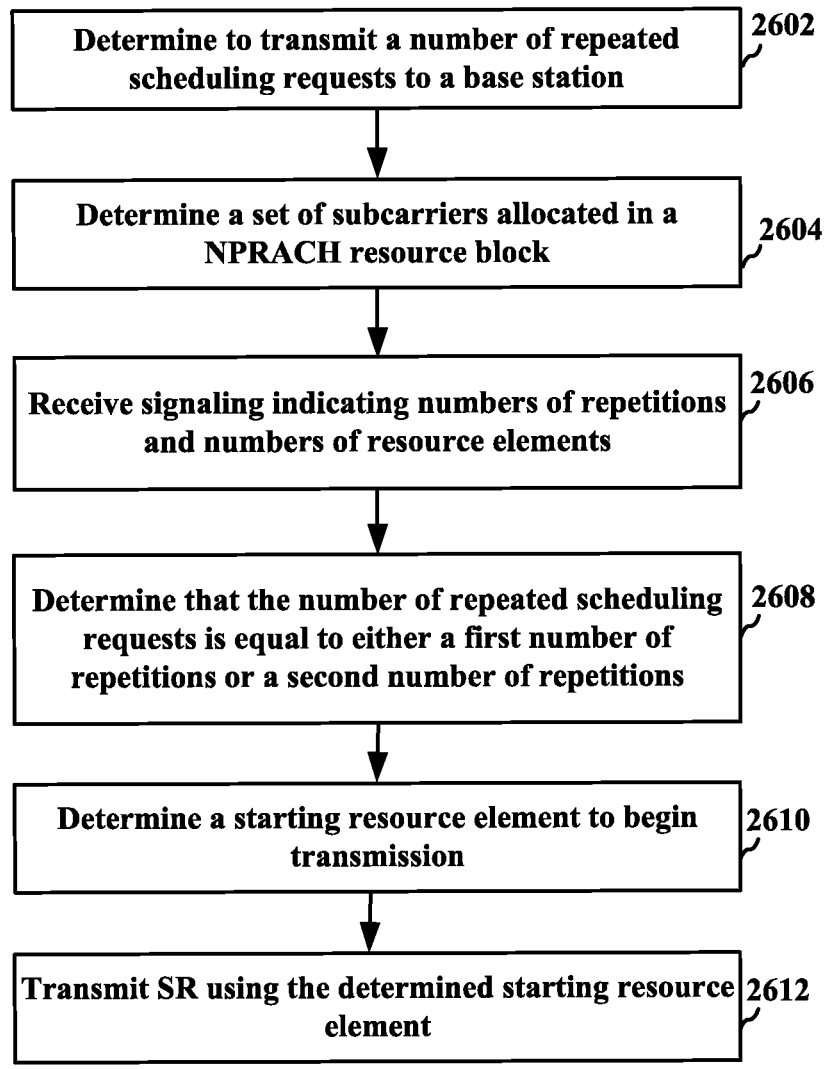
FIG. 26 is a flowchart of a method of wireless communication.

FIG. 26 is a flowchart 2600 of a method of wireless communication. The method may be performed by a UE (e.g., the UE 104, 350, 404, 504, 604, 704, 804, 904, 1004, 1104, 1204, 1304, the apparatus 2702/2702') wirelessly communicating with a base station (e.g., base station 102, 180, 402, 502, 602, 702, 802, 902, 1002, 1102, 1202, 1302, 2750, eNB 310).

At 2602, the UE may determine to transmit a number of repeated scheduling requests to a base station. For example, referring to FIG. 8A, the UE 804 may determine 801 to transmit a number of repeated scheduling requests to the base station 802.

At 2604, the UE may determine a set of subcarriers allocated in a NPRACH resource block. For example, referring to FIG. 8A, the UE 804 may determine 803 a set of subcarriers allocated in a NPRACH resource block.

At 2606, the UE may receive signaling indicating numbers of repetitions and numbers of resource elements. For example, referring to FIG. 8A, the UE 804 may receive signaling 805 indicating a first number of repetitions associated with a fourth number of resource elements in a first subcarrier in the set of subcarriers and a second number of repetitions associated with a resource elements in a second subcarrier in the set of subcarriers. For example, one NPRACH resource block (e.g., indicated by a starting subcarrier associated with a repetition level N) may be further divided into several regions, and each region may be associated with a scheduling request repetition level including one or multiple scheduling request time resource elements. Referring to FIG. 8B, if $N=n1 \cdot k1 + n2 \cdot k2$, then the N repetition level may be divided into two regions 820, 830. The first region 820 may be further divided into n1 resource elements (e.g., $n1 \geq 1$) with each element having k1 repetitions (e.g., k1=4) and the second region 830 may be further divided into n2 resource elements (e.g., $n2 \geq 1$) with each element having k2 repetitions (e.g., k2=1).

At 2608, the UE may determine that the number of repeated scheduling requests is equal to either the first number of repetitions or the second number of repetitions. For example, referring to FIG. 8A, the UE 804 may determine 807 that the number of repeated scheduling requests is equal to either the first number of repetitions or the second number of repetitions.

At 2610, the UE may determine a starting resource element to begin transmission. For example, referring to FIG. 8A, the UE 804 may determine 809 a starting resource element to begin transmission of the first number of scheduling requests based on whether the first number of scheduling requests is equal to the first number of repetitions or the second number of repetitions. As an illustrative example, assume the UE 804 determines 807 that the number of repeated scheduling requests is 1, which is equal to k2. Hence, the UE 804 may determine a starting resource element associated with the second region 830 illustrated in FIG. 8B to begin transmitting the scheduling request 811.

At 2612, the UE may transmit the scheduling request using the determined starting resource element. For example, referring to FIG. 8A, the UE 804 may begin transmitting the scheduling request 811 using the determined starting resource element.

Figure 27:
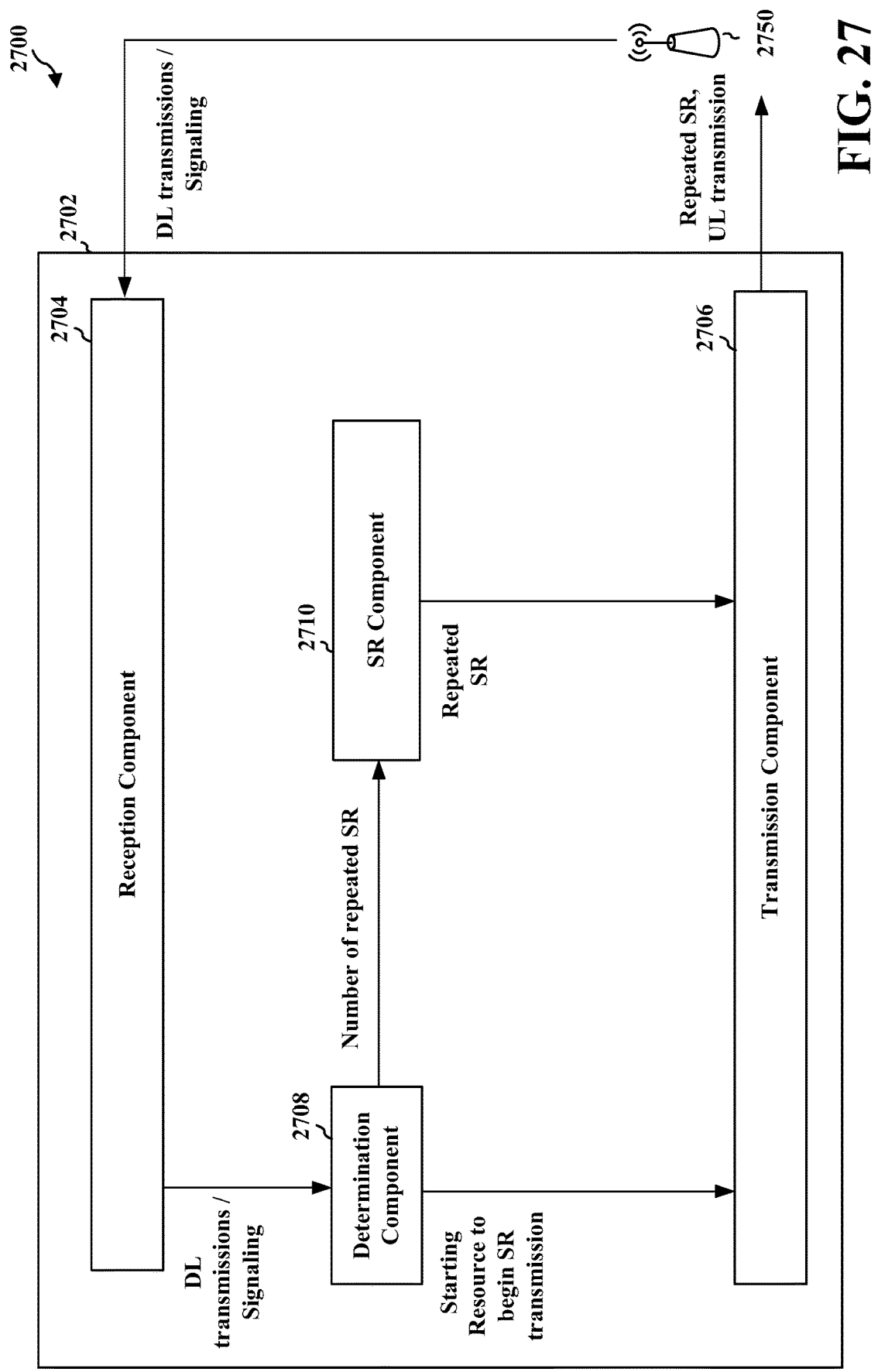
FIG. 27 is a conceptual data flow diagram illustrating the data flow between different means/components in an exemplary apparatus.

FIG. 27 is a conceptual data flow diagram 2700 illustrating the data flow between different means/components in an exemplary apparatus 2702. The apparatus may be a UE (e.g., the UE 104, 350, 404, 504, 604, 704, 804, 904, 1004, 1104, 1204, 1304, the apparatus 2702') wirelessly communicating with a base station 2750 (e.g., base station 102, 180, 402, 502, 602, 702, 802, 902, 1002, 1102, 1202, 1302, eNB 310). The apparatus may include a reception component 2704 that is configured to receive DL communication from base station 2750 including signaling information for an SR. For example, the signaling information indicating numbers of repetitions and numbers of resource elements within an NPRACH. The apparatus may include a transmission component 2706 configured to transmit UL communication to the base station 2750, including an SR and an UL transmission. The apparatus may include an SR component 2710 that is configured to send an SR to the transmission component 2706. The apparatus may include determination component 2708 configured to determine to transmit a number of repeated scheduling requests to a base station, to determine a set of subcarriers allocated in a NPRACH resource block, to determine that the number of repeated scheduling requests is equal to either the first number of repetitions or the second number of repetitions, and/or to determine a starting resource element to begin transmission.

The apparatus may include additional components that perform each of the blocks of the algorithm in the aforementioned flowchart of FIG. 26. As such, each block in the aforementioned flowchart of FIG. 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 28:
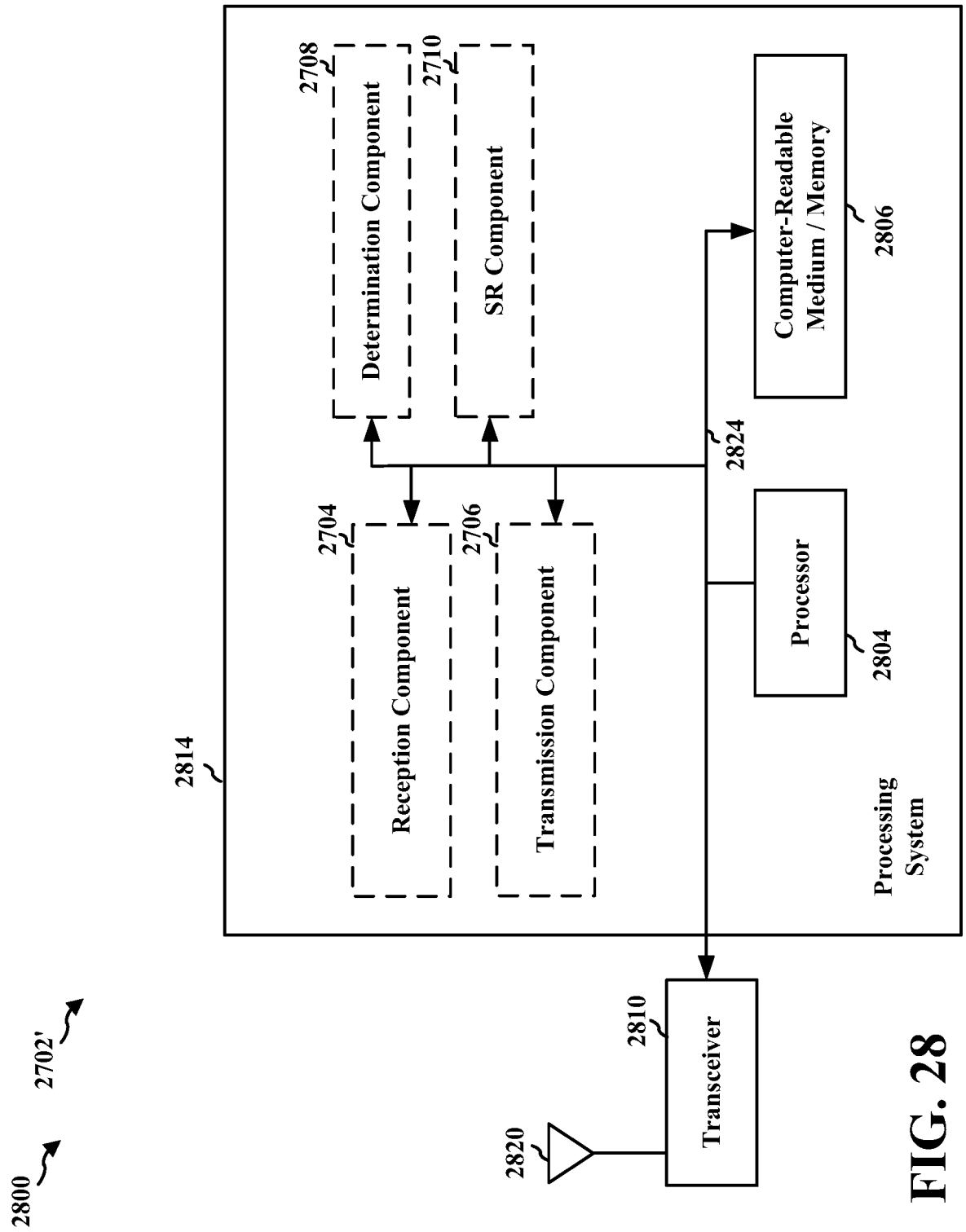
FIG. 28 is a diagram illustrating an example of a hardware implementation for an apparatus employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware components, represented by the processor 2804, the components 2704, 2706, 2708, 2710 and the computer-readable medium/memory 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The transceiver 2810 receives a signal from the one or more antennas 2820, extracts information from the received signal, and provides the extracted information to the processing system 2814, specifically the reception component 2704. In addition, the transceiver 2810 receives information from the processing system 2814, specifically the transmission component 2706, and based on the received information, generates a signal to be applied to the one or more antennas 2820. The processing system 2814 includes a processor 2804 coupled to a computer-readable medium/memory 2806. The processor 2804 is responsible for general processing, including the execution of software stored on the computer-readable medium/memory 2806. The software, when executed by the processor 2804, causes the processing system 2814 to perform the various functions described above for any particular apparatus. The computer-readable medium/memory 2806 may also be used for storing data that is manipulated by the processor 2804 when executing software. The processing system 2814 further includes at least one of the components 2704, 2706, 2708, 2710. The components may be software components running in the processor 2804, resident/stored in the computer readable medium/memory 2806, one or more hardware components coupled to the processor 2804, or some combination thereof. The processing system 2814 may be a component of the UE 350 and may include the memory 360 and/or at least one of the TX processor 368, the RX processor 356, and the controller/processor 359.

In one configuration, the apparatus 2702/2702' for wireless communication may include means for determining to transmit a number of repeated scheduling requests to a base station. In another configuration, the apparatus 2702/2702' for wireless communication may include means for determining a set of subcarriers allocated in a NPRACH resource block. In a further configuration, the apparatus 2702/2702' for wireless communication may include means for receiving signaling indicating numbers of repetitions and numbers of resource elements. In one configuration, the apparatus 2702/2702' for wireless communication may include means for determining that the number of repeated scheduling requests is equal to either the first number of repetitions or the second number of repetitions. In another configuration, the apparatus 2702/2702' for wireless communication may include means for determining a starting resource element to begin transmission. In a further configuration, the apparatus 2702/2702' for wireless communication may include means for transmitting the scheduling request using the determined starting resource element. The aforementioned means may be one or more of the aforementioned components of the apparatus 2702 and/or the processing system 2814 of the apparatus 2702' configured to perform the functions recited by the aforementioned means. As described above, the processing system 2814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 29:
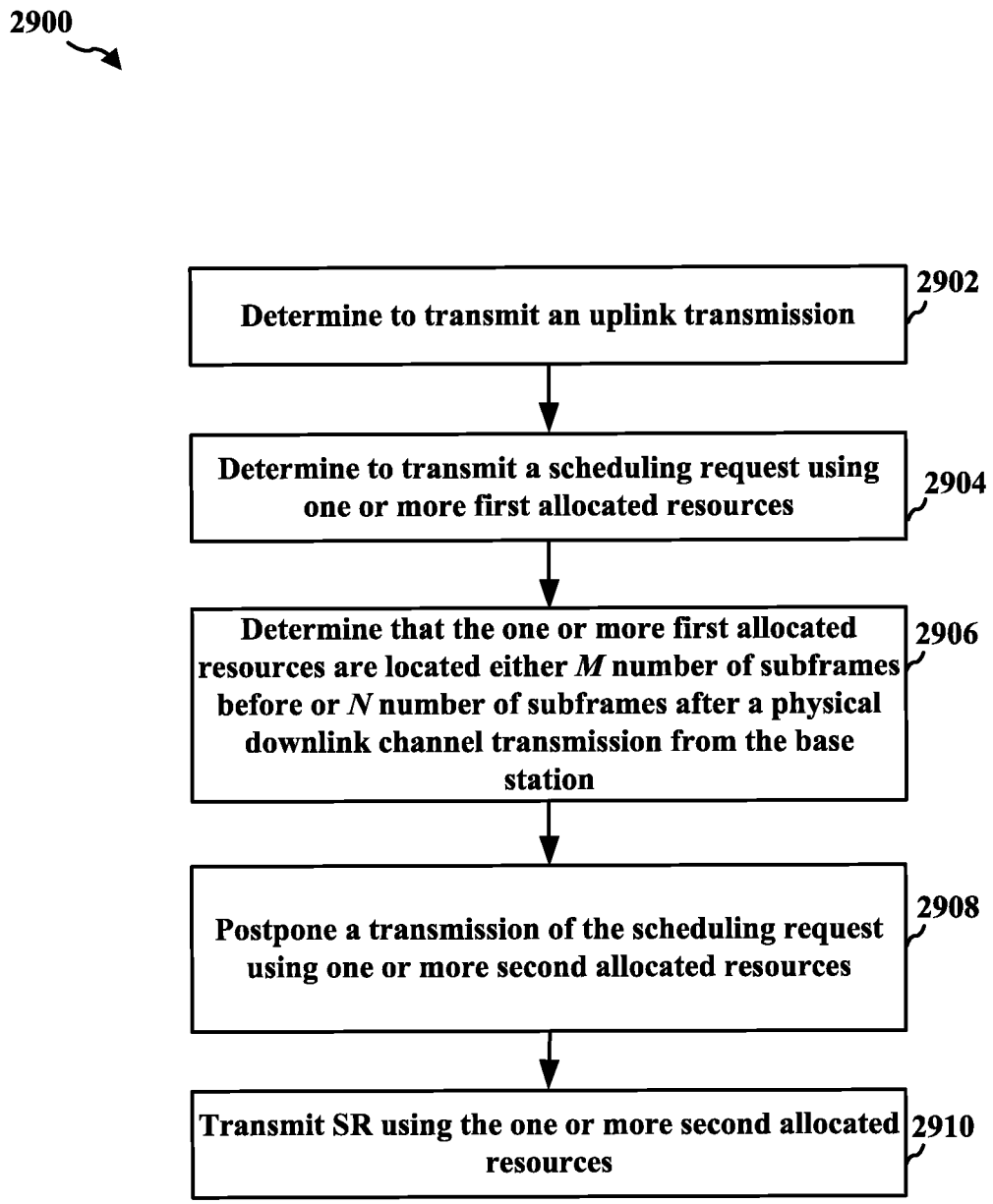
FIG. 29 is a flowchart of a method of wireless communication.

FIG. 29 is a flowchart 2900 of a method of wireless communication. The method may be performed by a UE (e.g., the UE 104, 350, 404, 504, 604, 704, 804, 904, 1004, 1104, 1204, 1304, the apparatus 3602/3602') wirelessly communicating with a base station (e.g., base station 102, 180, 402, 502, 602, 702, 802, 902, 1002, 1102, 1202, 1302, 3402, 3650, eNB 310).

At 2902, the UE may determine to transmit an uplink transmission. For example, referring to FIG. 9, the UE 904 may determine 901 to transmit an uplink transmission to the base station 902. For example, the UE 904 may determine 901 to transmit the uplink transmission while in connected-mode.

At 2904, the UE may determine to transmit a scheduling request using one or more first allocated resources. For example, referring to FIG. 9, the UE 904 may determine 903 to transmit a scheduling request using one or more first allocated resources At 2906, the UE may determine that the one or more first allocated resources are located either M number of subframes before or N number of subframes after a physical downlink channel transmission from the base station. For example, referring to FIG. 9, the UE 904 may determine 905 that the one or more first allocated resources are located within either Msubframes before or N subframes after a physical downlink channel transmission from the base station.

At 2908, the UE may postpone a transmission of the scheduling request using one or more second allocated resources. For example, referring to FIG. 9, the UE 904 may postpone 907 a transmission of the scheduling request using one or more second allocated resources. As an illustrative example, assume that M is equal to 2 and N is equal to 2. Then, if the one or more first allocated resources for the scheduling request are allocated two or fewer subframes before the start of a downlink transmission or two or fewer subframes after the completion of the downlink transmission, the UE 904 may postpone 907 the scheduling request until a subsequent set of allocated resources to avoid a potential collision with the physical channel downlink transmission.

At 2910, the UE may transmit the scheduling request using the one or more second allocated resources. For example, referring to FIG. 9, the UE 904 may transmit the scheduling request 909 using the one or more second allocated resources. In one aspect, the one or more second allocated resources may be allocated later in the time domain that the one or more first allocated resources.

Figure 30:
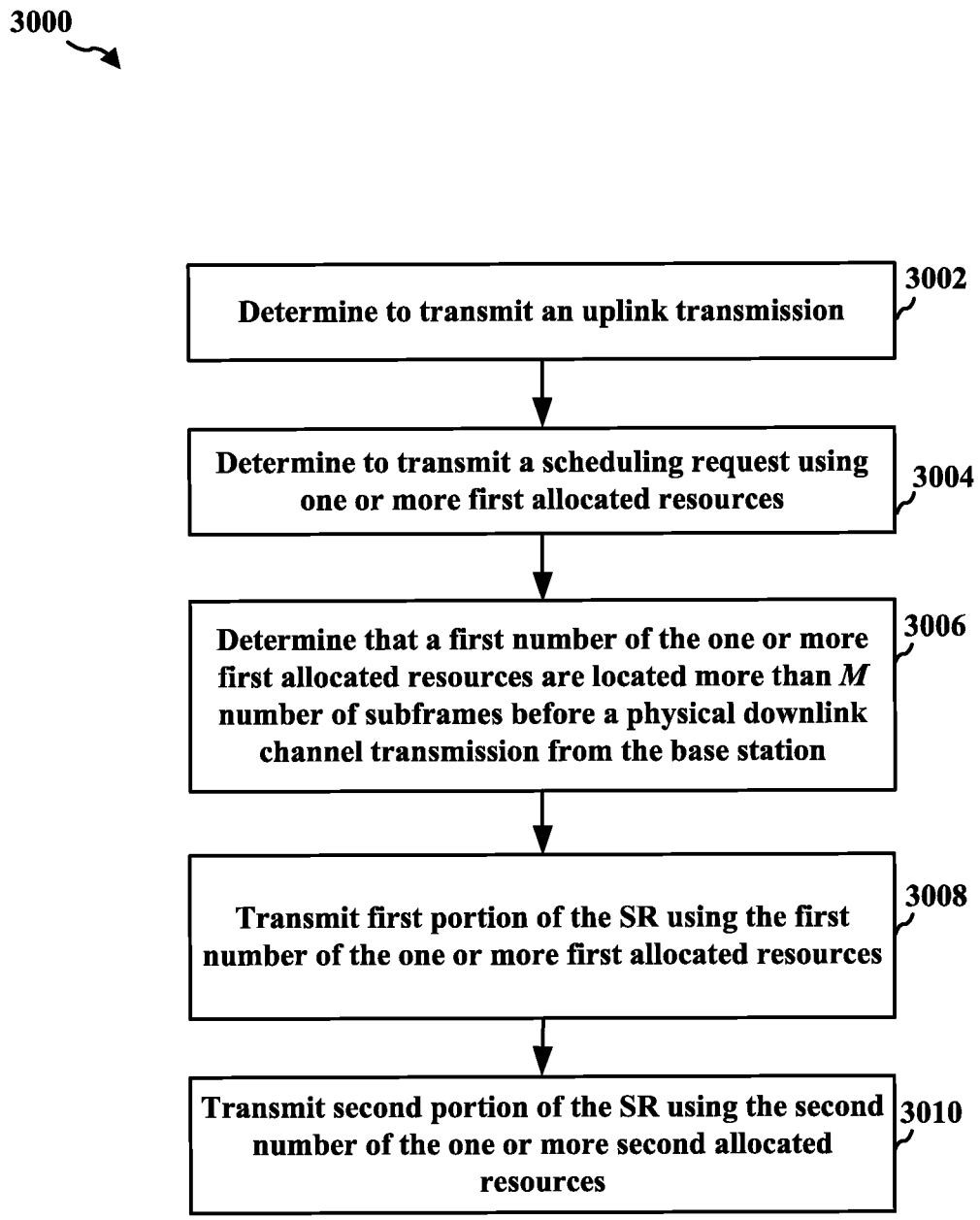
FIG. 30 is a flowchart of a method of wireless communication.

FIG. 30 is a flowchart 3000 of a method of wireless communication. The method may be performed by a UE (e.g., the UE 104, 350, 404, 504, 604, 704, 804, 904, 1004, 1104, 1204, 1304, the apparatus 3602/3602') wirelessly communicating with a base station (e.g., base station 102, 180, 402, 502, 602, 702, 802, 902, 1002, 1102, 1202, 1302, 3402, 3650, eNB 310). In FIG. 30, operations depicted with dashed lines indicate optional operations in accordance with certain aspects of the disclosure.

At 3002, the UE may determine to transmit an uplink transmission. For example, referring to FIG. 10, the UE 1004 may determine 1001 to transmit an uplink transmission to the base station 1002. For example, the UE 1004 may determine 1001 to transmit the uplink transmission while in connected-mode.

At 3004, the UE may determine to transmit a scheduling request using one or more first allocated resources. For example, referring to FIG. 10, the UE 1004 may determine 1003 to transmit a scheduling request using one or more first allocated resources.

At 3006, the UE may determine that a first number of the one or more first allocated resources are located more than M number of subframes before a physical downlink channel transmission from the base station. For example, referring to FIG. 10, the UE 1004 may determine 1005 that a first number of the one or more first allocated resources are located more than M subframes before a physical downlink channel transmission from the base station.

At 3008, the UE may transmit first portion of the scheduling request using the first number of the one or more first allocated resources. For example, referring to FIG. 10, the UE 1004 may transmit a first portion 1007 of the scheduling request using the first number of the one or more first allocated resources.

At 3010, the UE may transmit second portion of the SR using the second number of the one or more second allocated resources. For example, referring to FIG. 10, a second portion 1009 of the scheduling request using one or more second allocated resources. In a further aspect, the one or more second allocated resources may be located more than N subframes after the physical downlink channel transmission in a time domain. As an illustrative example, assume that M is equal to 2 and N is equal to 2, that the one or more first allocated resources are located in subframes 2, 3, and 4 in a radio frame, and that the physical channel downlink transmission is transmitted in subframes 6 and 7 of the same radio frame. Hence, UE 1004 may transmit the first portion 1007 of the scheduling request using the first allocated resources in subframes 2 and 3, but not the first allocated resources in subframe 4. The second portion of the scheduling request may be transmitted using the allocated resources in a subsequent radio frame.

Figure 31:
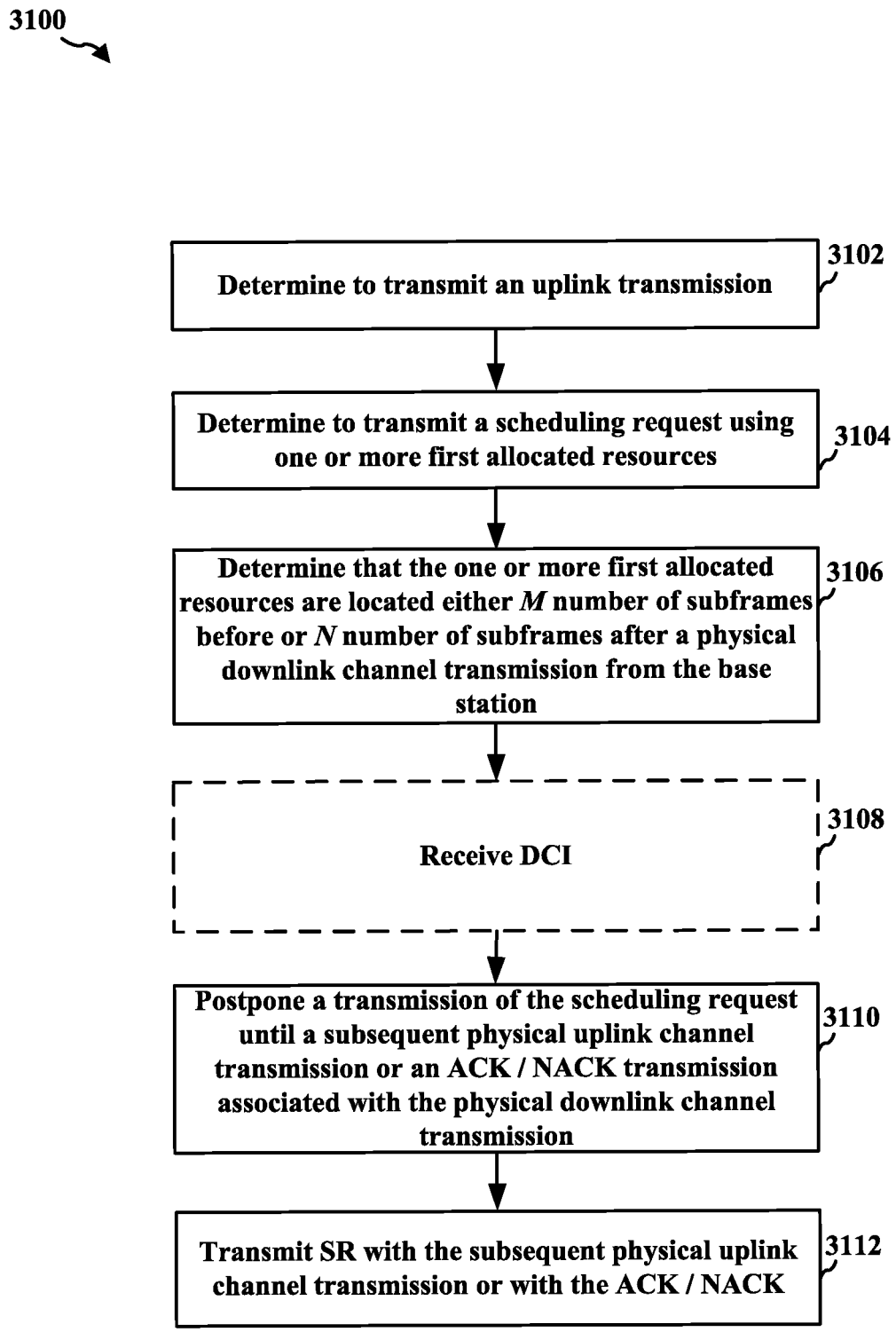
FIG. 31 is a flowchart of a method of wireless communication.

FIG. 31 is a flowchart 3100 of a method of wireless communication. The method may be performed by a UE (e.g., the UE 104, 350, 404, 504, 604, 704, 804, 904, 1004, 1104, 1204, 1304, the apparatus 3602/3602') wirelessly communicating with a base station (e.g., base station 102, 180, 402, 502, 602, 702, 802, 902, 1002, 1102, 1202, 1302, 3402, 3650, eNB 310). In FIG. 31, optional operations are indicated with dashed lines.

At 3102, the UE may determine to transmit an uplink transmission. For example, referring to FIG. 11, the UE 1104 may determine 1101 to transmit an uplink transmission to the base station 1102. For example, the UE 1104 may determine 1101 to transmit the uplink transmission while in connected-mode.

At 3104, the UE may determine to transmit a scheduling request using one or more first allocated resources. For example, referring to FIG. 11, the UE 1104 may determine 1103 to transmit a scheduling request using one or more first allocated resources.

At 3106, the UE may determine that the one or more first allocated resources are located either M number of subframes before or N number of subframes after a physical downlink channel transmission from the base station. For example, referring to FIG. 11, the UE 1104 may determine 1105 that the one or more first allocated resources are located either M subframes before or N subframes after a physical downlink channel transmission from the base station 1102.

At 3108, the UE may receive DCI. For example, referring to FIG. 11, the UE 1104 may receive DCI 1107 indicating that the transmission of the scheduling request is postponed until the subsequent physical uplink channel transmission or the ACK/NACK transmission.

At 3110, the UE may postpone a transmission of the scheduling request until a subsequent physical uplink channel transmission or an ACK/NACK transmission associated with the physical downlink channel transmission. For example, referring to FIG. 11, the UE 1104 may postpone 1109 a transmission of the scheduling request until a subsequent physical uplink channel transmission or an ACK/NACK transmission associated with the physical downlink channel transmission based on the DCI 1107. In an aspect, the subsequent physical uplink channel transmission or the ACK/NACK transmission may be located before one or more second allocated resources for the scheduling request.

At 3112, the UE may transmit the scheduling request with the subsequent physical uplink channel transmission or with the ACK/NACK. For example, referring to FIG. 11, UE 1104 may transmit the scheduling request 1111 with the subsequent physical uplink channel transmission or with the ACK/NACK transmission associated with the physical downlink channel transmission from the base station 1102. In one configuration, the scheduling request may be multiplexed with the ACK/NACK based on channel selection. In another configuration, the scheduling request may be transmitted immediately after ACK/NACK. In a further configuration, the scheduling request may transmitted immediately prior to the ACK/NACK by delaying ACK/NACK. The resources used to transmit the scheduling request with the ACK/NACK may be a) the same resources allocated for the scheduling request, b) the same resources as those allocated for the ACK/NACK, and/or c) signaled in DCI. The DCI may include one bit of information that may indicate the resources allocated for the scheduling request and another bit through the payload that indicates the repetition level corresponding to ACK/NACK and/or scheduling request. As an illustrative example, assume that M is equal to 2 and N is equal to 2. Then, if the one or more first allocated resources for the scheduling request are allocated two or fewer subframes before the start of a downlink transmission or two or fewer subframes after the completion of the downlink transmission, the UE 904 may postpone 1109 the scheduling request until the subsequent physical uplink channel transmission or with the ACK/NACK transmission associated with the physical downlink channel transmission to avoid a potential collision with the downlink transmission.

Figure 32:
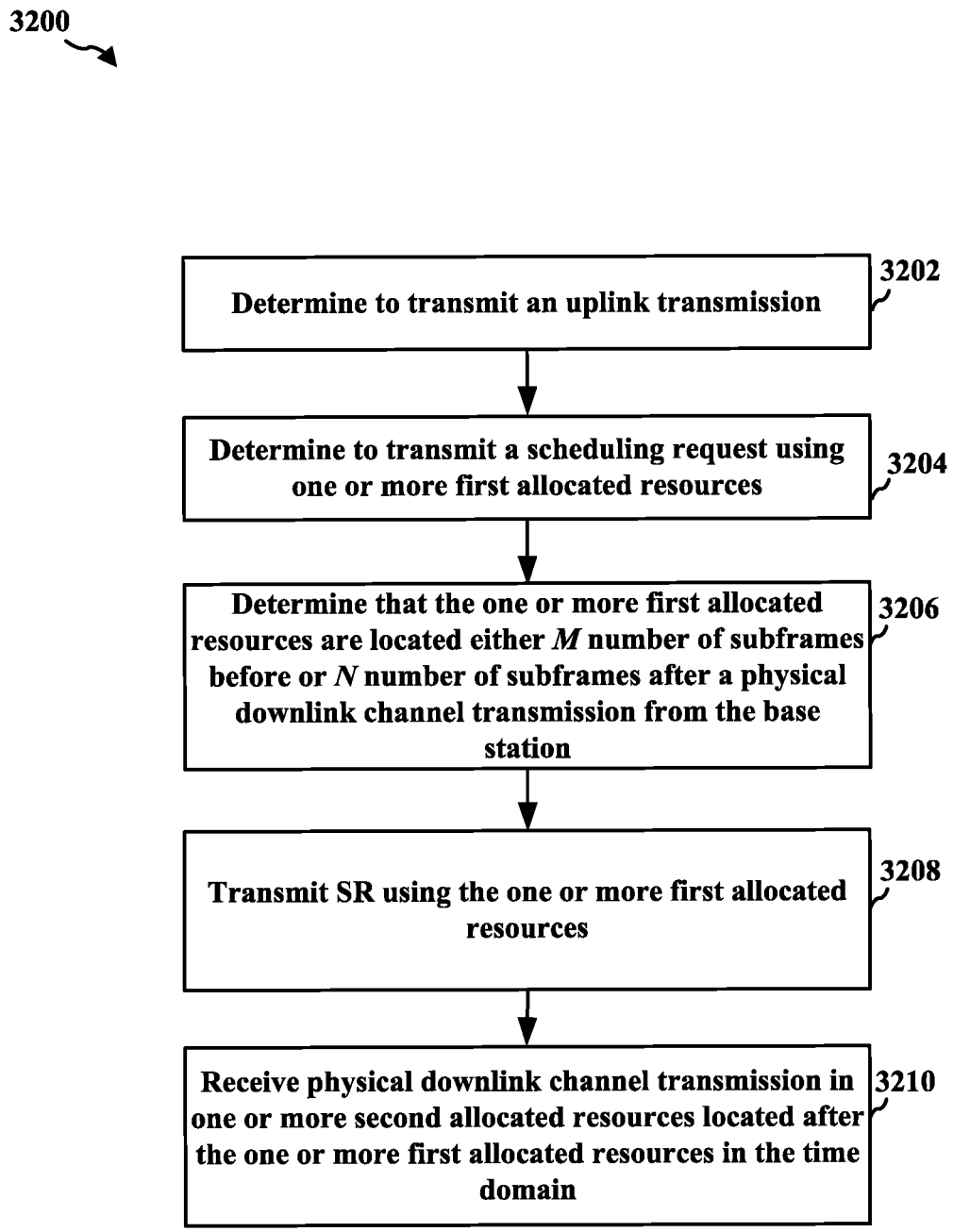
FIG. 32 is a flowchart of a method of wireless communication.

FIG. 32 is a flowchart 3200 of a method of wireless communication. The method may be performed by a UE (e.g., the UE 104, 350, 404, 504, 604, 704, 804, 904, 1004, 1104, 1204, 1304, the apparatus 3602/3602') wirelessly communicating with a base station (e.g., base station 102, 180, 402, 502, 602, 702, 802, 902, 1002, 1102, 1202, 1302, 3402, 3650, eNB 310).

At 3202, the UE may determine to transmit an uplink transmission. For example, referring to FIG. 12, the UE 1204 may determine 1201 to transmit an uplink transmission to the base station 1202. The UE 1204 may determine 1201 to transmit the uplink transmission when the UE 1204 is in connected-mode.

At 3204, the UE may determine to transmit a scheduling request using one or more first allocated resources. For example, referring to FIG. 12, the UE 1204 may determine 1203 to transmit a scheduling request using one or more first allocated resources.

At 3206, the UE may determine that the one or more first allocated resources are located either M number of subframes before or N number of subframes after a physical downlink channel transmission from the base station. For example, referring to FIG. 12, the UE 1204 may determine 1205 that the one or more first allocated resources are located within either M subframes before or N subframes after a physical downlink channel transmission from the base station 1202.

At 3208, the UE may transmit the scheduling request using the one or more first allocated resources. For example, referring to FIG. 12, the UE 1204 may transmit the scheduling request 1207 using the one or more first allocated resources.

At 3210, the UE may receive a physical downlink channel transmission in one or more second allocated resources located after the one or more first allocated resources in the time domain. For example, referring to FIG. 12, the UE 1204 may receive the physical downlink channel transmission 1209 in one or more second allocated resources located after the one or more first allocated resources in the time domain. As an illustrative example, assume that M is equal to 2 and N is equal to 2. Then, if the one or more first allocated resources for the scheduling request are allocated two or fewer subframes before the start of a downlink transmission or two or fewer subframes after the completion of the downlink transmission, the UE 1204 may transmit the scheduling request 1207 using the one or more first allocated resources, and the base station 1202 may postpone the physical downlink channel transmission 1209 until one or more second allocated resources allocated for downlink channel transmissions that are located subsequent to the one or more first allocated resources in the time domain.

Figure 33:
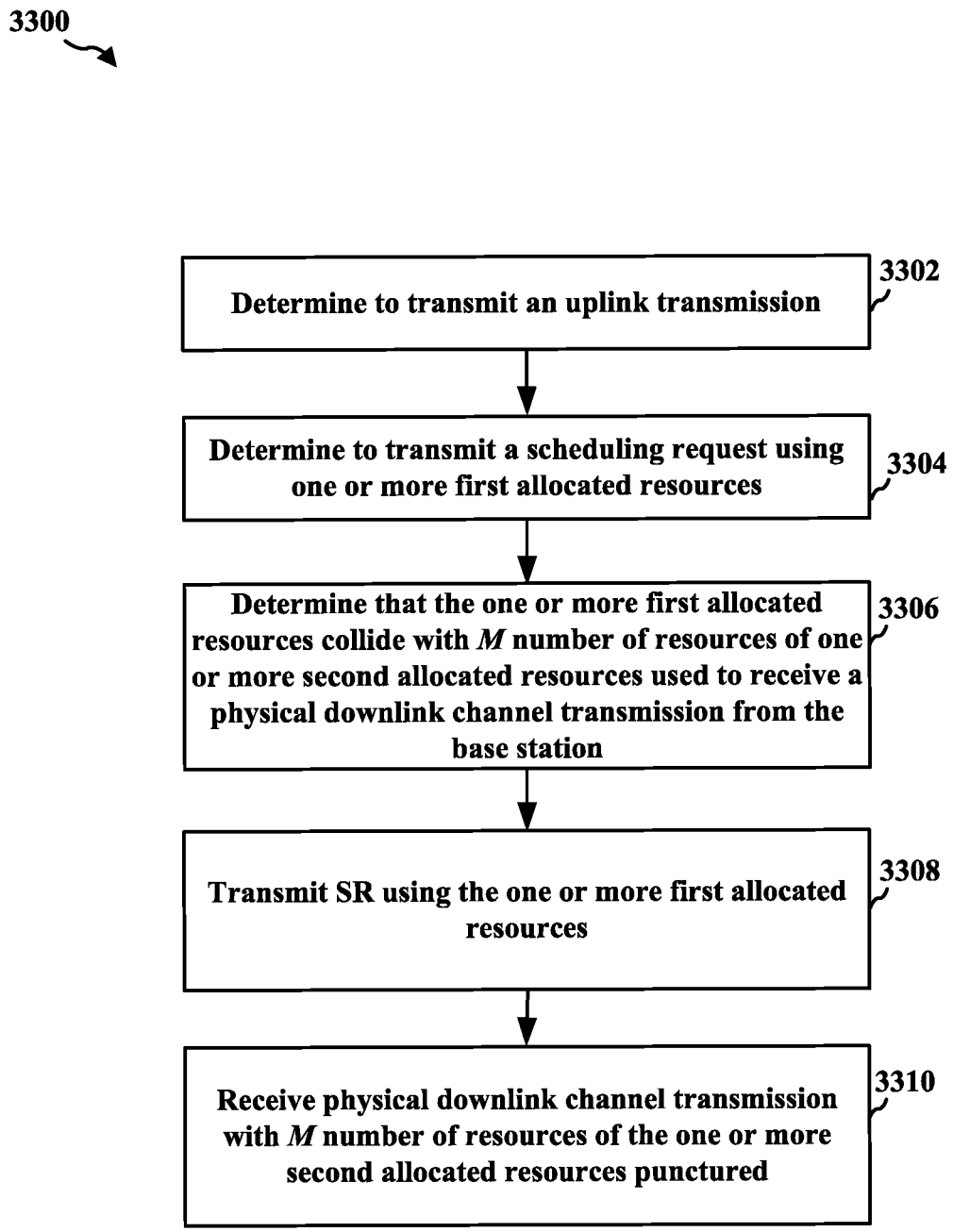
FIG. 33 is a flowchart of a method of wireless communication.

FIG. 33 is a flowchart 3300 of a method of wireless communication. The method may be performed by a UE (e.g., the UE 104, 350, 404, 504, 604, 704, 804, 904, 1004, 1104, 1204, 1304, the apparatus 3602/3602') wirelessly communicating with a base station (e.g., base station 102, 180, 402, 502, 602, 702, 802, 902, 1002, 1102, 1202, 1302, 3402, 3650, eNB 310).

At 3302, the UE may determine to transmit an uplink transmission. For example, referring to FIG. 13, the UE 1304 may determine 1301 to transmit an uplink transmission to the base station 1302. For example, the UE 1304 may determine 1301 to transmit the uplink transmission while in connected-mode.

At 3304, the UE may determine to transmit a scheduling request using one or more first allocated resources. For example, referring to FIG. 13, the UE 1304 may determine 1303 to transmit a scheduling request using one or more first allocated resources.

At 3306, the UE may determine that the one or more first allocated resources collide with M number of resources of one or more second allocated resources used to receive a physical downlink channel transmission from the base station. For example, referring to FIG. 13, the UE 1304 may determine 1305 that the one or more first allocated resources collide with M number of resources of one or more second allocated resources used to receive a physical downlink channel transmission from the base station 1302.

At 3308, the UE may transmit a SR using the one or more first allocated resources. For example, referring to FIG. 13, the UE 1304 may transmit the scheduling request 1307 using the one or more first allocated resources.

At 3310, the UE may receive a physical downlink channel transmission with M number of resources of the one or more second allocated resources punctured. For example, referring to FIG. 13, the UE 1304 may receive the physical downlink channel transmission 1309 with M number of resources of the one or more second allocated resources punctured. As an illustrative example, assume that the one or more first allocated resources collide with the first three (e.g., M=3) of ten resources used to receive the physical downlink channel transmission. Hence, the UE 1304 may receive the physical downlink channel transmission in the ten resources with the first three resources punctured.

Figure 34:
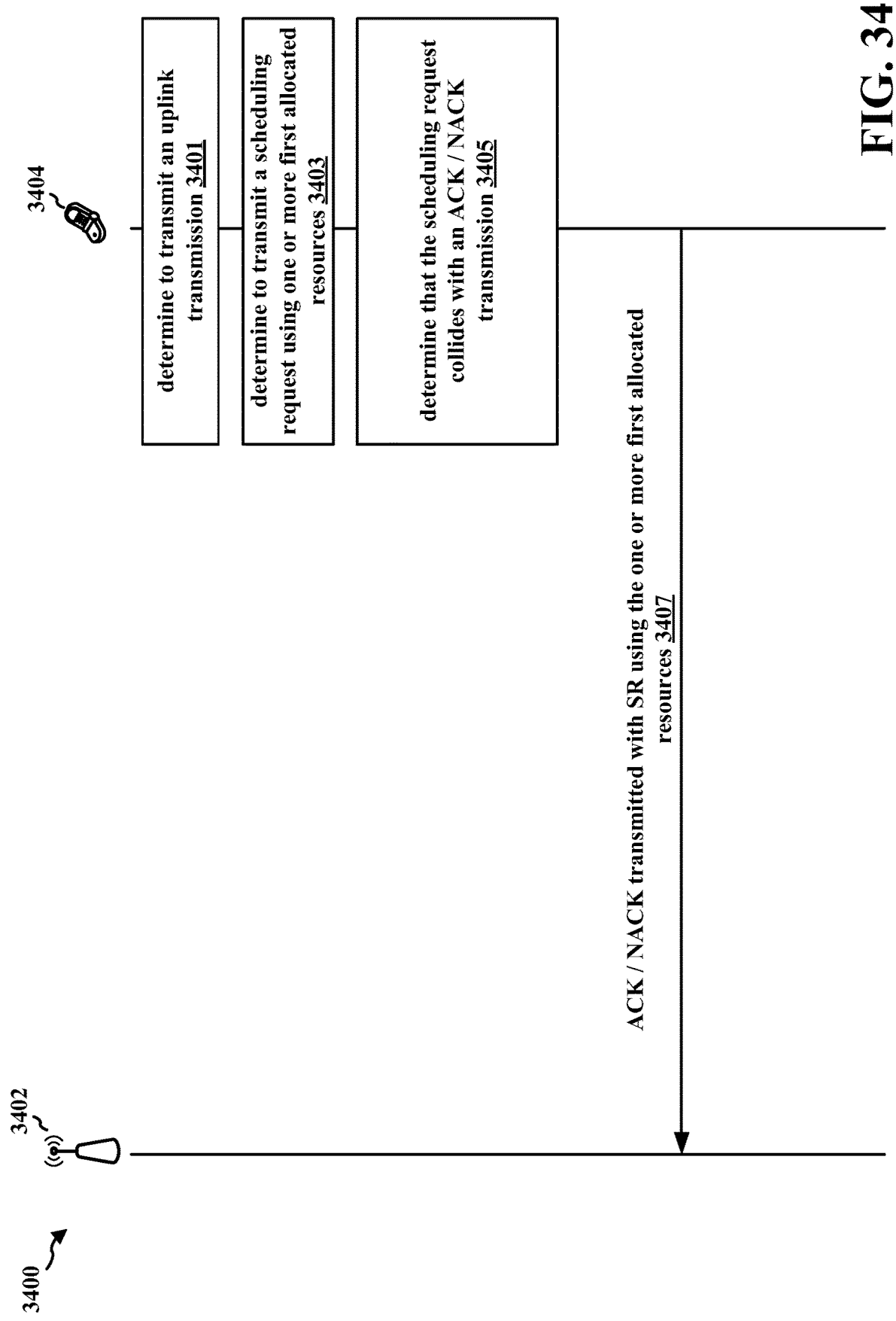
FIG. 34 is a diagram illustrating a data flow for a narrowband communication system(s) that may provide dedicated scheduling request resources in accordance with certain aspects of the present disclosure.

FIG. 34 is a diagram illustrating a flow diagram 3400 for a UE 3404 to send a scheduling request to a base station 3402 for an uplink grant in accordance with certain aspects of the disclosure. Base station 3402 may correspond to, e.g., base station 102, 180, 1550, 1850, 2150, 2450, 2750, 3450, eNB 310. UE 3404 may correspond to, e.g., UE 104, 350, apparatus 1502/1502', 1802/1802', 2102/2102', 2402/2402', 2702/2702', 3602/3602'. In addition, the base station 3402 and the UE 3404 may be configured to communicate using narrowband communications (e.g., NB-IoT and/or eMTC). For example, the UE 3404 may be an NB-IoT device and/or an eMTC device.

In one aspect, the UE 3404 may determine 3401 to transmit an uplink transmission to the base station 3402. For example, the UE 3404 may determine 3401 to transmit the uplink transmission while in connected-mode. In another aspect, the UE 3404 may determine 3403 to transmit a scheduling request using one or more first allocated resources.

In a further aspect, the UE 3404 may determine 3405 that the scheduling request will collide with an ACK/NACK transmission (e.g., in response to one or more downlink transmission received from the base station 3402). In another aspect, the UE 3404 may transmit the ACK/NACK transmission 3407 with the scheduling request using the one or more first allocated resources.

Additionally and/or alternatively, the UE 3404 may transmit ACK/NACK using the one or more first allocated resources with or without a scheduling request (e.g., scheduling request resources) if the ACK/NACK does not interfere with a different UE's scheduling request.

The base station 3402 may expect an ACK/NACK and determine if the scheduling request resources include a scheduling request or an ACK/NACK. For example, the base station 3402 may check if there is ACK/NACK sent at an ACK/NACK resource. If not, the base station 3402 may check scheduling request resources for ACK/NACK. If there is an ACK/NACK in the scheduling request resources, then the base station 3402 may determine that both ACK/NACK and SR are sent in scheduling request resources.

In another configuration, the scheduling request waveform may be modified to deliver the 1 bit information of ACK/NACK in addition to the scheduling request in order to alternate the signal (e.g., negative of the signal) between repetitions if NACK is to be sent, i.e., s(t), −s(t), s(t), . . . . With s(t) being the waveform of one repetition of a scheduling request.

Figure 35:
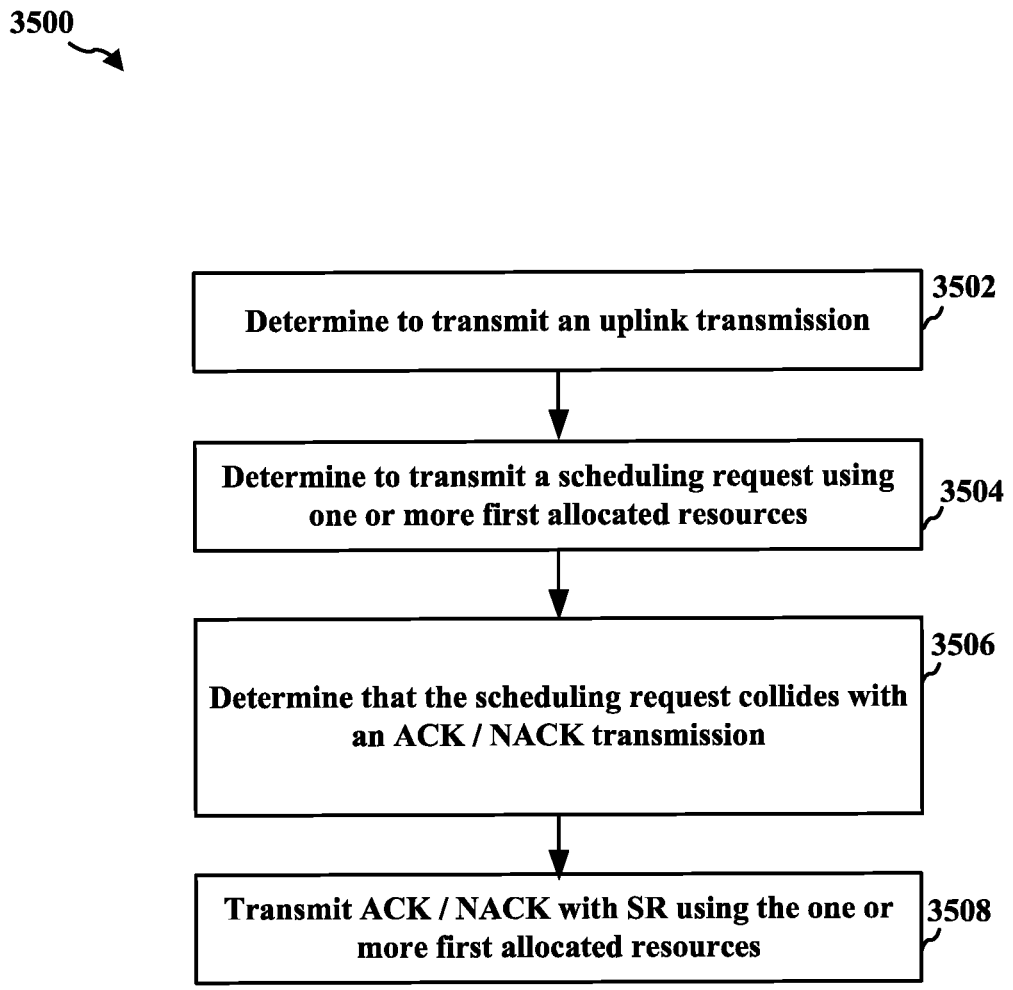
FIG. 35 is a flowchart of a method of wireless communication.

FIG. 35 is a flowchart 3500 of a method of wireless communication. The method may be performed by a UE (e.g., the UE 104, 350, 404, 504, 604, 704, 804, 904, 1004, 1104, 1204, 1304, 3404, the apparatus 3602/3602') wirelessly communicating with a base station (e.g., base station 102, 180, 402, 502, 602, 702, 802, 902, 1002, 1102, 1202, 1302, 3402, 3650, eNB 310).

At 3502, the UE may determine to transmit an uplink transmission. For example, referring to FIG. 34, the UE 3404 may determine 3401 to transmit an uplink transmission to the base station 3402. For example, the UE 3404 may determine 3401 to transmit the uplink transmission while in connected-mode.

At 3504, the UE may determine to transmit a scheduling request using one or more first allocated resources. For example, referring to FIG. 34, the UE 3404 may determine 3405 that the scheduling request will collide with an ACK/NACK transmission (e.g., in response to one or more downlink transmission received from the base station 3402).

At 3506, the UE may determine that the scheduling request collides with an ACK/NACK transmission. For example, referring to FIG. 34, the UE 3404 may determine 3405 that the scheduling request will collide with an ACK/NACK transmission (e.g., in response to one or more downlink transmission received from the base station 3402).

At 3508, the UE may the UE may transmit the ACK/NACK transmission with the scheduling request using the one or more first allocated resources. For example, referring to FIG. 34, the UE 3404 may transmit the ACK/NACK transmission 3407 with the scheduling request using the one or more first allocated resources. For example, referring to FIG. 34, the UE 3404 may postpone a transmission of the scheduling request using one or more second allocated resources. In one aspect, the one or more second allocated resources may be allocated later in the time domain that the one or more first allocated resources.

Figure 36:
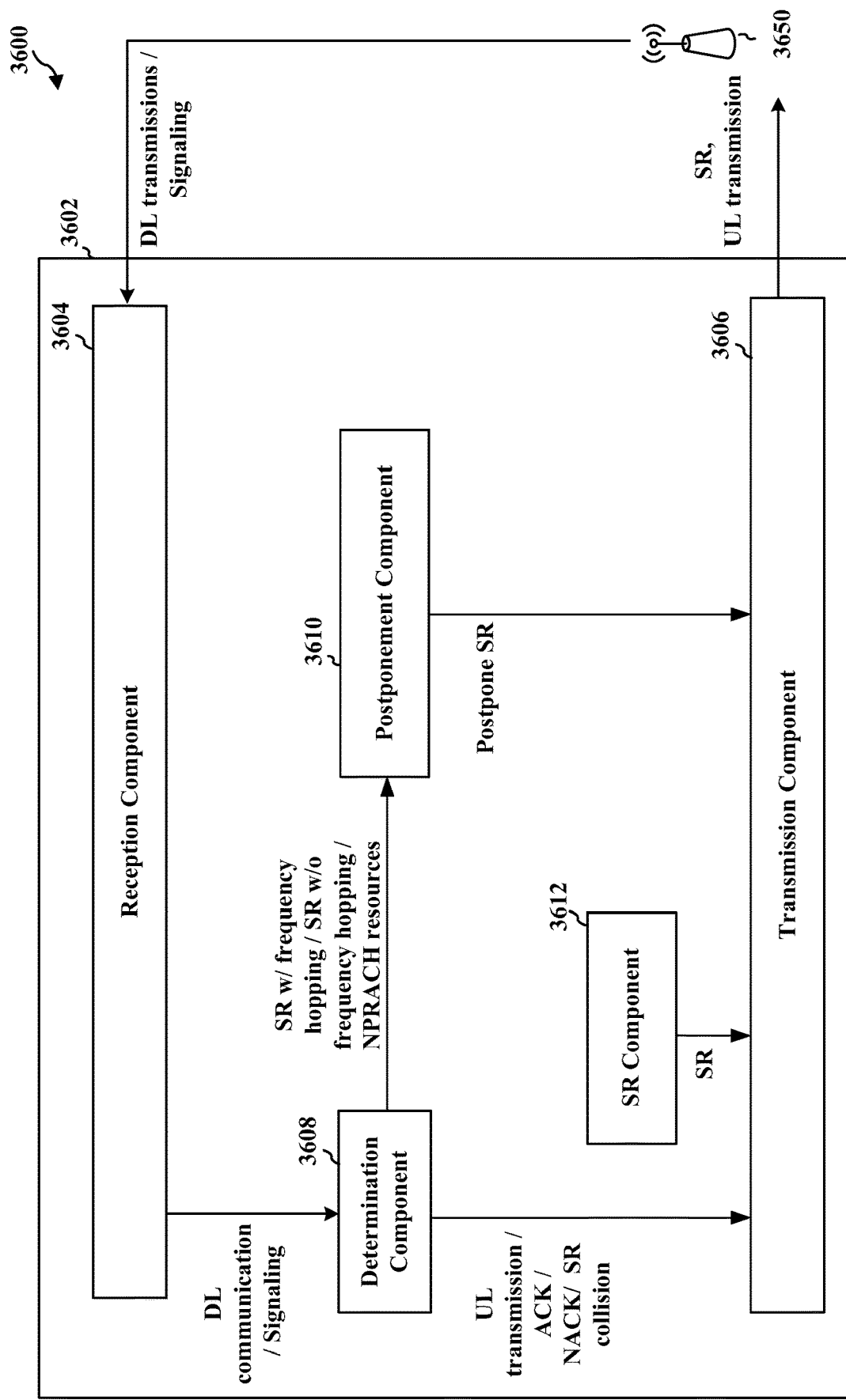
FIG. 36 is a conceptual data flow diagram illustrating the data flow between different means/components in an exemplary apparatus.

FIG. 36 is a conceptual data flow diagram 3600 illustrating the data flow between different means/components in an exemplary apparatus 3602. The apparatus may be a UE (e.g., the UE 104, 350, 404, 504, 604, 704, 804, 904, 1004, 1104, 1204, 1304, the apparatus 3602') wirelessly communicating with a base station 3650 (e.g., base station 102, 180, 402, 502, 602, 702, 802, 902, 1002, 1102, 1202, 1302, eNB 310). The apparatus may include a reception component 3604 configured to receive at least one DL communication from base station 3650 including DCI, a physical downlink channel transmission in one or more second allocated resources located after the one or more first allocated resources in the time domain used to transmit a scheduling request, a physical downlink channel transmission with Mnumber of resources of the one or more second allocated resources punctured. The Mnumber of resources may collide with a scheduling request transmission.

The apparatus may include a transmission component 3606 for configured to transmit at least one UL communication to the base station 3650, including an SR and an UL transmission. The apparatus may include an SR component 3612 that is configured to send an SR to the transmission component 3606. The transmission component 3606 may be configured to transmit the scheduling request using the one or more second allocated resources, to transmit a first portion of the scheduling request using the first number of the one or more first allocated resources, to transmit a second portion of the scheduling request using the second number of the one or more second allocated resources, to transmit the scheduling request with the subsequent physical uplink channel transmission or with the ACK/NACK, and/or to transmit the ACK/NACK with the scheduling request using the one or more first allocated resources. The apparatus may include determination component 3608 configured to determine that the one or more first allocated resources are located eitherMnumber of subframes before or Nnumber of subframes after a physical downlink channel transmission from the base station, for determining that a first number of the one or more first allocated resources are located more than M number of subframes before a physical downlink channel transmission from the base station, for determining that the one or more first allocated resources collide with M number of resources of one or more second allocated resources used to receive a physical downlink channel transmission from the base station, and/or for determining that the scheduling request collides with an ACK/NACK transmission. In addition, the apparatus may include a postponement component 3610 configured to postpone a transmission of the scheduling request using one or more second allocated resources, and/or postpone a transmission of the scheduling request until a subsequent physical uplink channel transmission or an ACK/NACK transmission associated with the physical downlink channel transmission.

The apparatus may include additional components that perform each of the blocks of the algorithm in the aforementioned flowcharts of FIGS. 29-33 and 35. As such, each block in the aforementioned flowcharts of FIGS. 29-33 and 35 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 37:
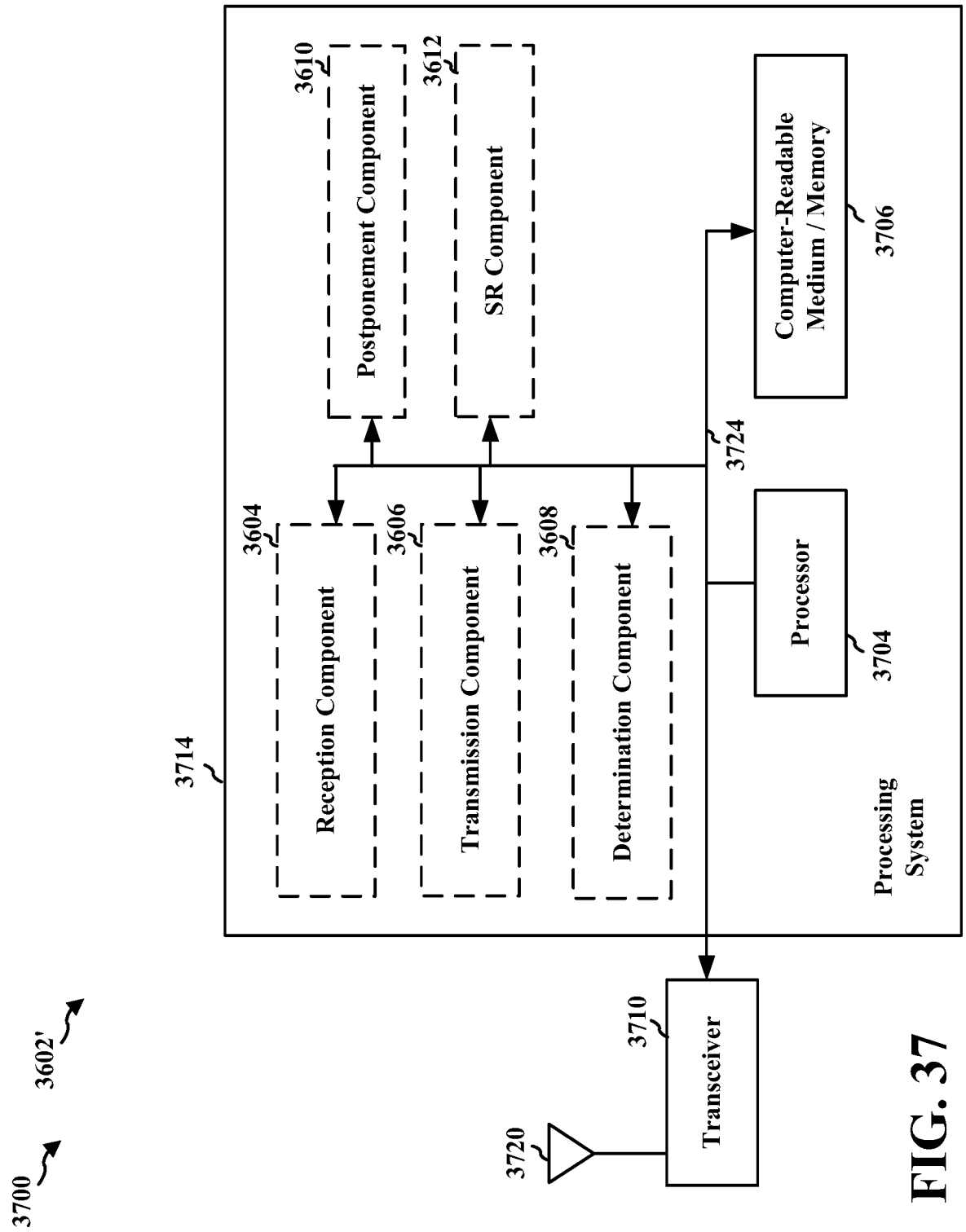
FIG. 37 is a diagram illustrating an example of a hardware implementation for an apparatus employing a processing system.

FIG. 37 is a diagram 3700 illustrating an example of a hardware implementation for an apparatus 3602' employing a processing system 3714. The processing system 3714 may be implemented with a bus architecture, represented generally by the bus 3724. The bus 3724 may include any number of interconnecting buses and bridges depending on the specific application of the processing system 3714 and the overall design constraints. The bus 3724 links together various circuits including one or more processors and/or hardware components, represented by the processor 3704, the components 3604, 3606, 3608, 3610, 3612 and the computer-readable medium/memory 3706. The bus 3724 may also link various other circuits such as timing sources, peripherals, voltage regulators, and power management circuits, which are well known in the art, and therefore, will not be described any further.

The processing system 3714 may be coupled to a transceiver 3710. The transceiver 3710 is coupled to one or more antennas 3720. The transceiver 3710 provides a means for communicating with various other apparatus over a transmission medium. The transceiver 3710 receives a signal from the one or more antennas 3720, extracts information from the received signal, and provides the extracted information to the processing system 3714, specifically the reception component 3604. In addition, the transceiver 3710 receives information from the processing system 3714, specifically the transmission component 3606, and based on the received information, generates a signal to be applied to the one or more antennas 3720. The processing system 3714 includes a processor 3704 coupled to a computer-readable medium/memory 3706. The processor 3704 is responsible for general processing, including the execution of software stored on the computer-readable medium/memory 3706. The software, when executed by the processor 3704, causes the processing system 3714 to perform the various functions described above for any particular apparatus. The computer-readable medium/memory 3706 may also be used for storing data that is manipulated by the processor 3704 when executing software. The processing system 3714 further includes at least one of the components 3604, 3606, 3608, 3610, 3612. The components may be software components running in the processor 3704, resident/stored in the computer readable medium/memory 3706, one or more hardware components coupled to the processor 3704, or some combination thereof. The processing system 3714 may be a component of the UE 350 and may include the memory 360 and/or at least one of the TX processor 368, the RX processor 356, and the controller/processor 359.

In one configuration, the apparatus 3602/3602' for wireless communication may include means for determining to transmit an uplink transmission. In another configuration, the apparatus 3602/3602' for wireless communication may include means for determining to transmit a scheduling request using one or more first allocated resources. In a further configuration, the apparatus 3602/3602' for wireless communication may include means for determining that the one or more first allocated resources are located either M number of subframes before or N number of subframes after a physical downlink channel transmission from the base station. In one configuration, the apparatus 3602/3602' for wireless communication may include means for postponing a transmission of the scheduling request using one or more second allocated resources. In another configuration, the apparatus 3602/3602' for wireless communication may include means for transmitting the scheduling request using the one or more second allocated resources. In a further configuration, the apparatus 3602/3602' for wireless communication may include means for determining that a first number of the one or more first allocated resources are located more than M number of subframes before a physical downlink channel transmission from the base station. In one configuration, the apparatus 3602/3602' for wireless communication may include means for transmitting a first portion of the SR using the first number of the one or more first allocated resources. In another configuration, the apparatus 3602/3602' for wireless communication may include means for transmitting a second portion of the scheduling request using the second number of the one or more second allocated resources. In a further configuration, the apparatus 3602/3602' for wireless communication may include means for receiving DCI. In one configuration, the apparatus 3602/3602' for wireless communication may include means for postponing a transmission of the scheduling request until a subsequent physical uplink channel transmission or an ACK/NACK transmission associated with the physical downlink channel transmission. In another configuration, the apparatus 3602/3602' for wireless communication may include means for transmitting the scheduling request with the subsequent physical uplink channel transmission or with the ACK/NACK. In a further configuration, the apparatus 3602/3602' for wireless communication may include means for receiving a physical downlink channel transmission in one or more second allocated resources located after the one or more first allocated resources in the time domain. In one configuration, the apparatus 3602/3602' for wireless communication may include means for determining that the one or more first allocated resources collide with M number of resources of one or more second allocated resources used to receive a physical downlink channel transmission from the base station. In another configuration, the apparatus 3602/3602' for wireless communication may include means for receiving a physical downlink channel transmission with M number of resources of the one or more second allocated resources punctured. In a further configuration, the apparatus 3602/3602' for wireless communication may include means for determining that the scheduling request collides with an ACK/NACK transmission. In a further configuration, the apparatus 3602/3602' for wireless communication may include means for transmitting the ACK/NACK with the scheduling request using the one or more first allocated resources. The aforementioned means may be one or more of the aforementioned components of the apparatus 3602 and/or the processing system 3714 of the apparatus 3502' configured to perform the functions recited by the aforementioned means. As described above, the processing system 3714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving one or more downlink transmissions from a base station;
   determining to transmit an uplink transmission to the base station; and
   transmitting, to the base station, a scheduling request for the uplink transmission with an acknowledgement (ACK)/negative ACK (NACK) associated with the one or more downlink transmissions using a narrowband physical uplink shared channel (NPUSCH) format resource structure, wherein the UE is configured to increase a first number of repeated transmissions of the scheduling request based on third signaling received from the base station.

2. The method of claim 1, wherein the UE is configured to transmit the scheduling request for the uplink transmission with the ACK/NACK associated with the one or more downlink transmissions based on first signaling received from the base station.

3. The method of claim 2, wherein the first signaling is included in a media access control (MAC) command or a radio resource control (RRC) reconfiguration signaling.

4. The method of claim 2, wherein the UE transmits the scheduling request for the uplink transmission with the ACK/NACK associated with the one or more downlink transmissions after the first signaling is received and a counter at the UE reaches a threshold number.

5. The method of claim 4, wherein the threshold number is determined based on information included in the first signaling or based on preconfigured information at the UE.

6. The method of claim 1, wherein the UE is configured to not transmit the scheduling request for the uplink transmission with the ACK/NACK associated with the one or more downlink transmissions based on second signaling received from the base station.

7. The method of claim 6, wherein the UE determines to not transmit the scheduling request for the uplink transmission with the ACK/NACK associated with the one or more downlink transmissions when a timer at the UE expires.

8. The method of claim 1, wherein the transmitting the scheduling request for the uplink transmission with the ACK/NACK associated with the one or more downlink transmissions using the NPUSCH format resource structure comprises:
   transmitting the scheduling request with the ACK/NACK a second number of transmissions, the second number of transmissions being associated with a number of repetitions for the NPUSCH format resource structure; and
   transmitting the scheduling request using allocated resources without the ACK/NACK a third number of transmissions, the third number of transmissions being a difference between the first number of repeated transmissions and the second number of transmissions associated with the NPUSCH format resource structure.

9. The method of claim 1, further comprising:
   performing quadrature phase-shift keying (QPSK) mapping of a first bit value associated with the scheduling request and a second bit value associated with the ACK/NACK; and
   performing at least one of channel coding or data scrambling of the scheduling request and the ACK/NACK after the QPSK mapping.

10. The method of claim 9, further comprising:
    performing binary phase-shift keying (BPSK) mapping of the second bit value associated with the ACK/NACK;
    determining if the scheduling request is transmitted with the ACK/NACK; and
    shifting the BPSK mapping of the second bit value associated with the ACK/NACK by 90° or another angle predetermined or configured by the network.

11. An apparatus for wireless communication for a user equipment (UE), comprising:
    means for receiving one or more downlink transmissions from a base station;
    means for determining to transmit an uplink transmission to the base station; and
    means for transmitting, to the base station, a scheduling request for the uplink transmission with an acknowledgement (ACK)/negative ACK (NACK) associated with the one or more downlink transmissions using a narrowband physical uplink shared channel (NPUSCH) format resource structure, wherein the UE is configured to increase a first number of repeated transmissions of the scheduling request based on third signaling received from the base station.

12. The apparatus of claim 11, wherein the UE is configured to transmit the scheduling request for the uplink transmission with the ACK/NACK associated with the one or more downlink transmissions based on first signaling received from the base station.

13. The apparatus of claim 12, wherein the first signaling is included in a media access control (MAC) command or a radio resource control (RRC) reconfiguration signaling.

14. The apparatus of claim 12, wherein the UE transmits the scheduling request for the uplink transmission with the ACK/NACK associated with the one or more downlink transmissions after the first signaling is received and a counter at the UE reaches a threshold number.

15. The apparatus of claim 14, wherein the threshold number is determined based on information included in the first signaling or based on preconfigured information at the UE.

16. The apparatus of claim 11, wherein the UE is configured to not transmit the scheduling request for the uplink transmission with the ACK/NACK associated with the one or more downlink transmissions based on second signaling received from the base station.

17. The apparatus of claim 16, wherein the UE determines to not transmit the scheduling request for the uplink transmission with the ACK/NACK associated with the one or more downlink transmissions when a timer at the UE expires.

18. The apparatus of claim 11, wherein the means for transmitting the scheduling request for the uplink transmission with the ACK/NACK associated with the one or more downlink transmissions using the NPUSCH format resource structure is configured to:
transmit the scheduling request with the ACK/NACK a second number of transmissions, the second number of transmissions being associated with a number of repetitions for the NPUSCH format resource structure; and
transmit the scheduling request using allocated resources without the ACK/NACK a third number of transmissions, the third number of transmissions being a difference between the first number of repeated transmissions and the second number of transmissions associated with the NPUSCH format resource structure.

19. The apparatus of claim 11, further comprising:
means for performing quadrature phase-shift keying (QPSK) mapping of a first bit value associated with the scheduling request and a second bit value associated with the ACK/NACK; and
means for performing at least one of channel coding or data scrambling of the scheduling request and the ACK/NACK after the QPSK mapping.

20. The apparatus of claim 19, further comprising:
means for performing binary phase-shift keying (BPSK) mapping of the second bit value associated with the ACK/NACK;
means for determining if the scheduling request is transmitted with the ACK/NACK; and
means for shifting the BPSK mapping of the second bit value associated with the ACK/NACK by 90° or another angle predetermined or configured by the network.

21. An apparatus for wireless communication for a user equipment (UE), comprising:
a memory; and
at least one processor coupled to the memory and configured to:
receive one or more downlink transmissions from a base station;
determine to transmit an uplink transmission to the base station; and
transmit, to the base station, a scheduling request for the uplink transmission with an acknowledgement (ACK)/negative ACK (NACK) associated with the one or more downlink transmissions using a narrowband physical uplink shared channel (NPUSCH) format resource structure, wherein the UE is configured to increase a first number of repeated transmissions of the scheduling request based on third signaling received from the base station.

22. The apparatus of claim 21, wherein the UE is configured to transmit the scheduling request for the uplink transmission with the ACK/NACK associated with the one or more downlink transmissions based on first signaling received from the base station.

23. The apparatus of claim 22, wherein the first signaling is included in a media access control (MAC) command or a radio resource control (RRC) reconfiguration signaling.

24. The apparatus of claim 22, wherein the UE transmits the scheduling request for the uplink transmission with the ACK/NACK associated with the one or more downlink transmissions after the first signaling is received and a counter at the UE reaches a threshold number.

25. The apparatus of claim 24, wherein the threshold number is determined based on information included in the first signaling or based on preconfigured information at the UE.

26. The apparatus of claim 21, wherein the UE is configured to not transmit the scheduling request for the uplink transmission with the ACK/NACK associated with the one or more downlink transmissions based on second signaling received from the base station.

27. The apparatus of claim 26, wherein the UE determines to not transmit the scheduling request for the uplink transmission with the ACK/NACK associated with the one or more downlink transmissions when a timer at the UE expires.

28. The apparatus of claim 21, wherein the at least one processor is configured to transmit the scheduling request for the uplink transmission with the ACK/NACK associated with the one or more downlink transmissions using the NPUSCH format resource structure by:
transmitting the scheduling request with the ACK/NACK a second number of transmissions, the second number of transmissions being associated with a number of repetitions for the NPUSCH format resource structure; and
transmitting the scheduling request using allocated resources without the ACK/NACK a third number of transmissions, the third number of transmissions being a difference between the first number of repeated transmissions and the second number of transmissions associated with the NPUSCH format resource structure.

29. The apparatus of claim 21, wherein the at least one processor is further configured to:
perform quadrature phase-shift keying (QPSK) mapping of a first bit value associated with the scheduling request and a second bit value associated with the ACK/NACK; and
perform at least one of channel coding or data scrambling of the scheduling request and the ACK/NACK after the QPSK mapping.

30. The apparatus of claim 29, wherein the at least one processor is further configured to:
perform binary phase-shift keying (BPSK) mapping of the second bit value associated with the ACK/NACK;
determine if the scheduling request is transmitted with the ACK/NACK; and
shift the BPSK mapping of the second bit value associated with the ACK/NACK by 90° or another angle predetermined or configured by the network.

31. A computer-readable non-transitory medium storing computer executable code for a user equipment (UE), comprising code to:
receive one or more downlink transmissions from a base station;
determine to transmit an uplink transmission to the base station; and
transmit, to the base station, a scheduling request for the uplink transmission with an acknowledgement (ACK)/negative ACK (NACK) associated with the one or more downlink transmissions using a narrowband physical uplink shared channel (NPUSCH) format resource structure, wherein the UE is configured to increase a first number of repeated transmissions of the scheduling request based on third signaling received from the base station.

32. The computer-readable non-transitory medium of claim 31, wherein the UE is configured to transmit the scheduling request for the uplink transmission with the ACK/NACK associated with the one or more downlink transmissions based on first signaling received from the base station.

33. The computer-readable non-transitory medium of claim 32, wherein the first signaling is included in a media access control (MAC) command or a radio resource control (RRC) reconfiguration signaling.

34. The computer-readable non-transitory medium of claim 32, wherein the UE transmits the scheduling request for the uplink transmission with the ACK/NACK associated with the one or more downlink transmissions after the first signaling is received and a counter at the UE reaches a threshold number.

35. The computer-readable non-transitory medium of claim 34, wherein the threshold number is determined based on information included in the first signaling or based on preconfigured information at the UE.

36. The computer-readable non-transitory medium of claim 31, wherein the UE is configured to not transmit the scheduling request for the uplink transmission with the ACK/NACK associated with the one or more downlink transmissions based on second signaling received from the base station.

37. The computer-readable non-transitory medium of claim 36, wherein the UE determines to not transmit the scheduling request for the uplink transmission with the ACK/NACK associated with the one or more downlink transmissions when a timer at the UE expires.

38. The computer-readable non-transitory medium of claim 31, wherein the code to transmit the scheduling request for the uplink transmission with the ACK/NACK associated with the one or more downlink transmissions using the NPUSCH format resource structure is configured to:
 transmit the scheduling request with the ACK/NACK a second number of transmissions, the second number of transmissions being associated with a number of repetitions for the NPUSCH format resource structure; and
 transmit the scheduling request using allocated resources without the ACK/NACK a third number of transmissions, the third number of transmissions being a difference between the first number of repeated transmissions and the second number of transmissions associated with the NPUSCH format resource structure.

39. The computer-readable medium of claim 31, further comprising code to:
 perform quadrature phase-shift keying (QPSK) mapping of a first bit value associated with the scheduling request and a second bit value associated with the ACK/NACK; and
 perform at least one of channel coding or data scrambling of the scheduling request and the ACK/NACK after the QPSK mapping.

40. The computer-readable medium of claim 39, further comprising code to:
 perform binary phase-shift keying (BPSK) mapping of the second bit value associated with the ACK/NACK;
 determine if the scheduling request is transmitted with the ACK/NACK; and
 shift the BPSK mapping of the second bit value associated with the ACK/NACK by 90° or another angle predetermined or configured by the network.

\* \* \* \* \*